(12) United States Patent
Yamagata et al.

(10) Patent No.: US 11,076,072 B2
(45) Date of Patent: Jul. 27, 2021

(54) IMAGE CAPTURING APPARATUS IMPROVED IN HEAT DISSIPATION EFFICIENCY WHILE AVOIDING INCREASE IN SIZE

(71) Applicant: CANON KABUSHIKI KAISHA, Tokyo (JP)

(72) Inventors: Kenji Yamagata, Kanagawa (JP); Yoshinobu Shibayama, Kanagawa (JP); Manabu Abe, Tokyo (JP); Koichi Shigeta, Kanagawa (JP); Masato Ito, Kanagawa (JP); Yuya Nagata, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/101,042

(22) Filed: Nov. 23, 2020

(65) Prior Publication Data

US 2021/0160411 A1 May 27, 2021

(30) Foreign Application Priority Data

Nov. 26, 2019 (JP) .............................. JP2019-213303

(51) Int. Cl.
*H04N 5/225* (2006.01)
*G03B 17/55* (2021.01)

(52) U.S. Cl.
CPC ......... *H04N 5/22521* (2018.08); *G03B 17/55* (2013.01)

(58) Field of Classification Search
CPC ................................................ H04N 5/22521
See application file for complete search history.

(56) References Cited

U.S. PATENT DOCUMENTS

| | | | | |
|---|---|---|---|---|
| 8,011,423 | B2 * | 9/2011 | Uchimura | H01L 23/467 |
| | | | | 165/122 |
| 2014/0055671 | A1 * | 2/2014 | Kawamura | H04N 5/2252 |
| | | | | 348/374 |
| 2017/0261840 | A1 * | 9/2017 | Yoneda | G03B 17/55 |
| 2018/0263104 | A1 * | 9/2018 | Hamada | H04N 5/2253 |
| 2018/0376037 | A1 * | 12/2018 | Arai | H05K 7/20172 |
| 2019/0174030 | A1 * | 6/2019 | Kojima | H04N 5/22521 |

(Continued)

FOREIGN PATENT DOCUMENTS

JP 2015186255 A 10/2015

*Primary Examiner* — Cynthia Segura
(74) *Attorney, Agent, or Firm* — Rossi, Kimms & McDowell LLP

(57) ABSTRACT

An image capturing apparatus improved in heat dissipation efficiency while avoiding increase in size. A rotary fan is rotated to draw air from a suction port and discharge air from a discharge port. A heat dissipation duct includes an intake opening, a discharge opening, intake-side fins, an intake-side duct portion, and an exhaust-side duct portion. Projected shadows of at least part of the intake-side fins and at least part of the rotary fan overlap each other, as viewed from a direction of a rotational axis of the rotary fan. Ends of the intake-side fins toward the intake opening and the exhaust opening are closer thereto than ends of the rotary fan toward the same, respectively. The intake opening and the suction port of the rotary fan communicate with each other via a space adjacent to the end of the intake-side fins toward the discharge opening.

13 Claims, 45 Drawing Sheets

(56) References Cited

U.S. PATENT DOCUMENTS

| | | | |
|---|---|---|---|
| 2019/0285970 A1* | 9/2019 | Mano | H04N 5/2252 |
| 2020/0272037 A1* | 8/2020 | Yen | H04N 9/3144 |
| 2020/0288048 A1* | 9/2020 | Makara | H05K 7/20209 |
| 2021/0055631 A1* | 2/2021 | Mano | H04N 5/22521 |

* cited by examiner

IMAGE CAPTURING APPARATUS IMPROVED IN HEAT DISSIPATION EFFICIENCY WHILE AVOIDING INCREASE IN SIZE

BACKGROUND OF THE INVENTION

Field of the Invention

The present invention relates to an image capturing apparatus provided with a heat dissipation structure using a fan.

Description of the Related Art

In an image capturing apparatus, such as a digital video camera, a distance between circuit boards has been reduced due to size reduction, and further, the mounting density of electronic components has become higher due to progress in a mounting technique for a printed circuit board.

On the other hand, the amount of heat generation has become larger, and in recent years, an image capturing apparatus has been productized which is configured to dissipate heat by forced cooling using a fan and a duct. However, in the forced cooling using the fan and the duct, in a case where a sufficient distance from an air inlet port to the fan cannot be secured, drawn-in outside air is discharged before being sufficiently warmed within the duct, which lowers heat discharging efficiency.

As a countermeasure to this problem, in an image capturing apparatus described in Japanese Laid-Open Patent Publication (Kokai) No. 2015-186255, there has been disclosed a technique in which a fan is arranged rearward of an image capturing optical system and a duct is extended rearward and upward, whereby air is discharged sideward from a root of a handle portion, so as to improve the heat dissipation performance.

However, in a case where the technique described in Japanese Laid-Open Patent Publication (Kokai) No. 2015-186255 is applied to an image capturing apparatus, such as a video camera for business use, e.g. for news reporting, which is configured such that a gripping portion protrudes sideward from a body having an image capturing optical system, it is impossible to arrange built-in components within the gripping portion. This brings about a problem that the image capturing apparatus as a product is increased in size due to dead space. Therefore, there is room for improvement from a viewpoint of achieving both of size reduction and improvement in the heat dissipation efficiency.

SUMMARY OF THE INVENTION

The present invention provides an image capturing apparatus improved in heat dissipation efficiency while avoiding increase in size.

The present invention provides an image capturing apparatus comprising a rotary fan that includes a suction port and a discharge port and is rotated to draw air from the suction port and discharge air from the discharge port, a processing circuit board on which heat generating elements are mounted, and a heat dissipation duct for cooling the processing circuit board, the heat dissipation duct including an intake opening, an exhaust opening, and intake-side fins, and including an intake-side duct portion which communicates between the intake opening and the rotary fan and an exhaust-side duct portion that communicates between the exhaust opening and the rotary fan, wherein projected shadows of at least part of the intake-side fins and at least part of the rotary fan overlap each other, as viewed from a direction of a rotational axis of the rotary fan, wherein in a discharge direction of air from the discharge port, a first end position of the intake-side fins toward the intake opening is located closer to the intake opening than an end position of the rotary fan toward the intake opening is, and in the discharge direction, a second end position of the intake-side fins toward the exhaust opening is located closer to the exhaust opening than an end position of the rotary fan toward the exhaust opening is, and wherein the intake-side duct portion has a predetermined space adjacent to the second end position of the intake-side fins, and the intake opening and the suction port of the rotary fan communicate with each other via the predetermined space.

According to the present invention, it is possible to improve the heat dissipation efficiency while avoiding increase in size.

Further features of the present invention will become apparent from the following description of exemplary embodiments (with reference to the attached drawings).

DESCRIPTION OF THE EMBODIMENTS

The present invention will now be described in detail below with reference to the accompanying drawings showing embodiments thereof.

Figure 1:
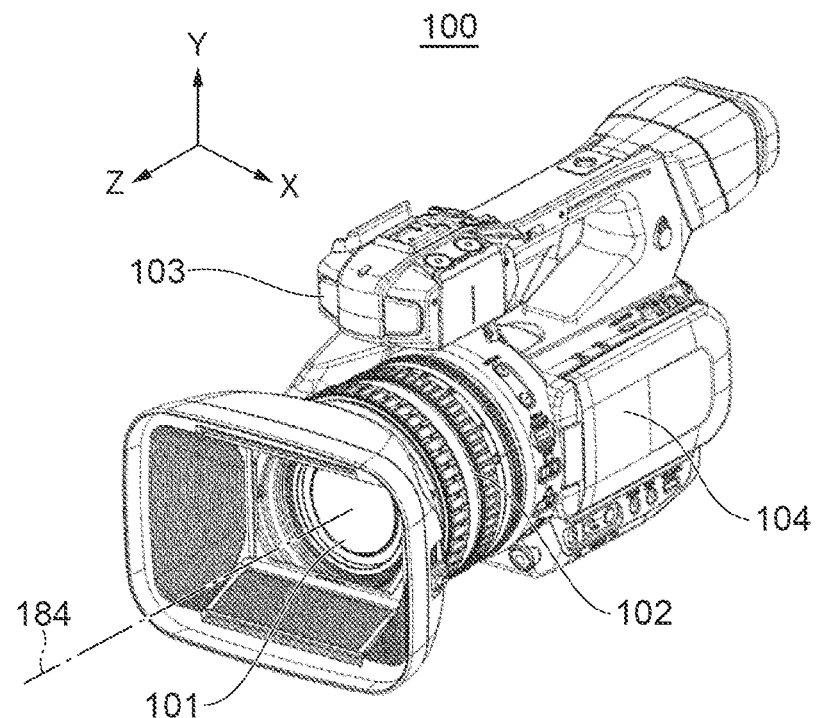
FIG. 1 is a perspective view of an image capturing apparatus according to an embodiment of the present invention.
Figure 2:
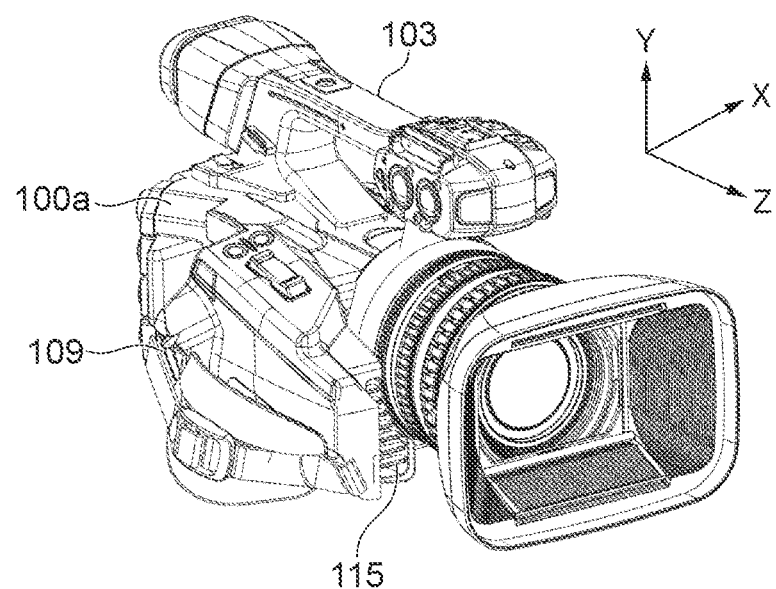
FIG. 2 is a perspective view of the image capturing apparatus.
Figure 3:
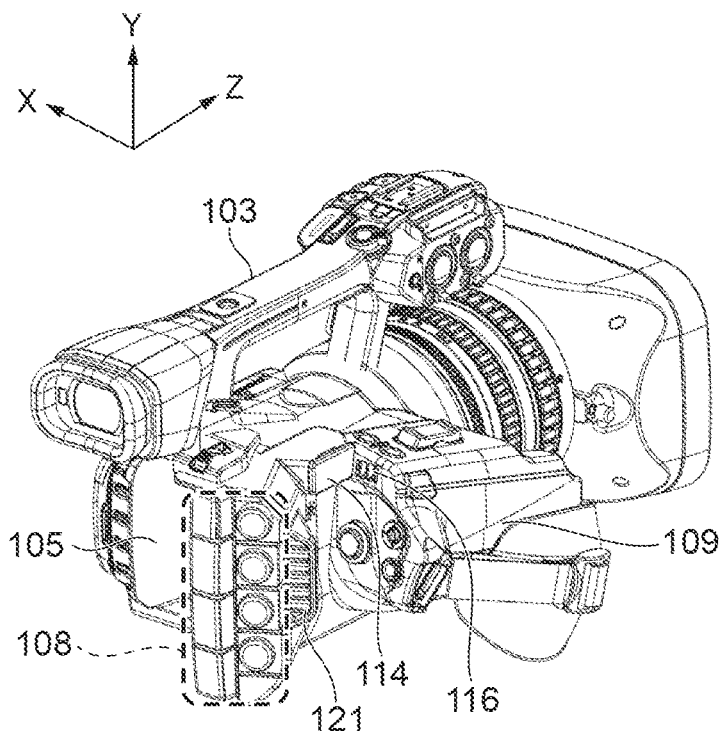
FIG. 3 is a perspective view of the image capturing apparatus.
Figure 4:
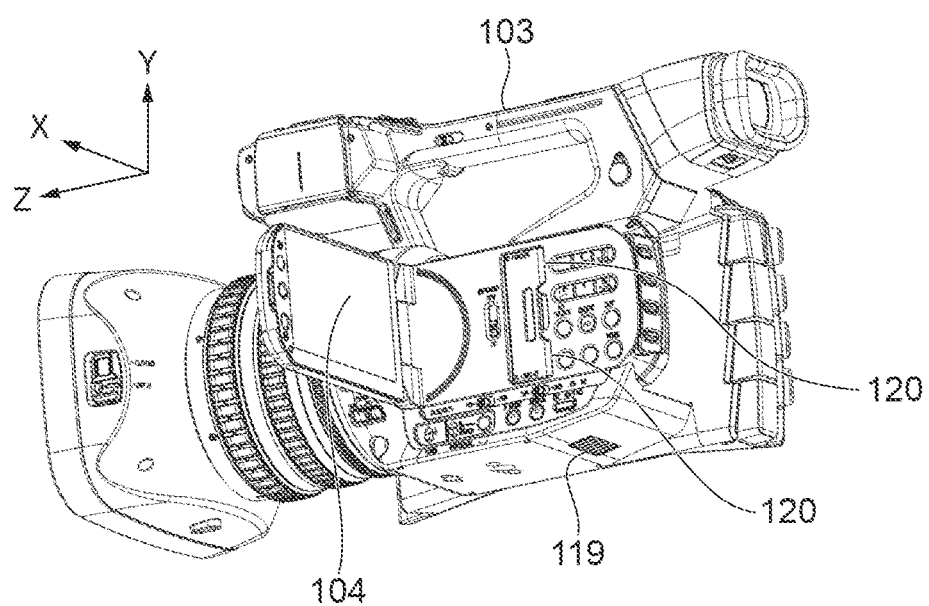
FIG. 4 is a perspective view of the image capturing apparatus.

FIGS. 1 to 4 are perspective views of an image capturing apparatus according to an embodiment of the present invention. Particularly, FIGS. 1, 2, 3, and 4 show the image capturing apparatus, denoted by reference numeral 100, as viewed from the front right side, the front left side, the rear left side, and the rear right side, respectively. Further, FIG. 4 shows the image capturing apparatus 100 in a state in which a display section 104 is opened.

Note that in the following description, top-bottom, right-left, and front-rear directions of the image capturing apparatus 100 are defined by using the XYZ coordinate system indicated in drawings. The Z-axis indicates a direction of an image capturing optical axis of the image capturing apparatus 100, and a positive direction of the Z-axis (+Z) is a direction toward the front. Therefore, an object side is referred to as the front side. Further, a negative direction of the Z-axis (−Z) is a direction toward the rear. Therefore, a photographer side is referred to as the rear side. On an X-Y plane which is orthogonal to the Z-axis, the X-axis indicates a width direction (right-left direction) of the image capturing apparatus 100 and the Y-axis indicates a vertical direction of the same. A positive direction of the Y-axis (+Y) is an upward direction and a negative direction of the Y-axis (−Y) is a downward direction. Further, a positive direction of the X-axis (+X) is a rightward direction and a negative direction of the X-axis (−X) is a leftward direction. Therefore, the right-left direction is a direction as viewed from the object side.

The image capturing apparatus 100 includes a body 100a, an image capturing lens 101, a handle portion 103, the display section 104, and a gripping portion 109. The body 100a of the image capturing apparatus 100 may be configured such that at least one of the image capturing lens 101, the handle portion 103, the display section 104, and the gripping portion 109 can be removably attached to the body 100a. The body 100a having at least one of the removably attachable components attached thereto may be referred to as an image capturing apparatus system, and the body 100a having the at least one of the removably attachable components removed therefrom may be referred to as the image capturing apparatus.

As shown in FIGS. 1 to 4, the image capturing lens 101 is arranged in a state in which an objective surface thereof is exposed toward an object. An operation ring section 102 is arranged around the image capturing lens 101. The image capturing lens 101 has a plurality of lens groups, a plurality of movable optical elements, such as a diaphragm, and actuators that drive the optical elements. By driving the actuators, the image capturing apparatus 100 can perform zooming for changing a photographic view angle by moving a predetermined lens group, focusing for adjusting the focus on an object, adjustment of the amount of light received by the image capturing apparatus using a diaphragm mechanism, and so forth.

The operation ring section 102 is a ring-shaped operation member configured to be rotatable about the optical axis, denoted by reference numeral 184, of the image capturing lens 101 and is formed by three operation rings. These operation rings are operation portions associated with zoom adjustment, focus adjustment, and aperture adjustment of the image capturing apparatus 100, respectively, and a photographer can adjust the zoom, the focus, and the aperture by rotating each associated operation portion.

The top of the image capturing apparatus 100 is provided with the handle portion 103. The handle portion 103 has an annular shape and is formed integrally with an upper portion of the image capturing apparatus 100. The handle portion 103 is gripped by a photographer when low-angle shooting is performed by positioning the image capturing apparatus 100 at a height lower than the photographer's line of sight, more specifically, e.g. at a position of the photographer's belly portion, or at a position close to a floor, which is set by the photographer having bent his/her body, or is gripped by the photographer when he/she carries the image capturing apparatus 100.

The right side of the image capturing apparatus 100 is provided with the display section 104 which is rotatable with respect to the image capturing apparatus 100. The display section 104 is a flat monitor, such as a liquid crystal display device, and displays a shot image and an object image being captured, a menu for confirming various settings of the image capturing apparatus 100, etc. The rear side of the image capturing apparatus 100 is provided with a battery chamber 105 in the form of a recess opening rearward (see FIG. 3). The battery chamber 105 is configured to have a battery 106 (see FIG. 6) removably attached thereto which supplies electric power to the image capturing apparatus 100.

Figure 5:
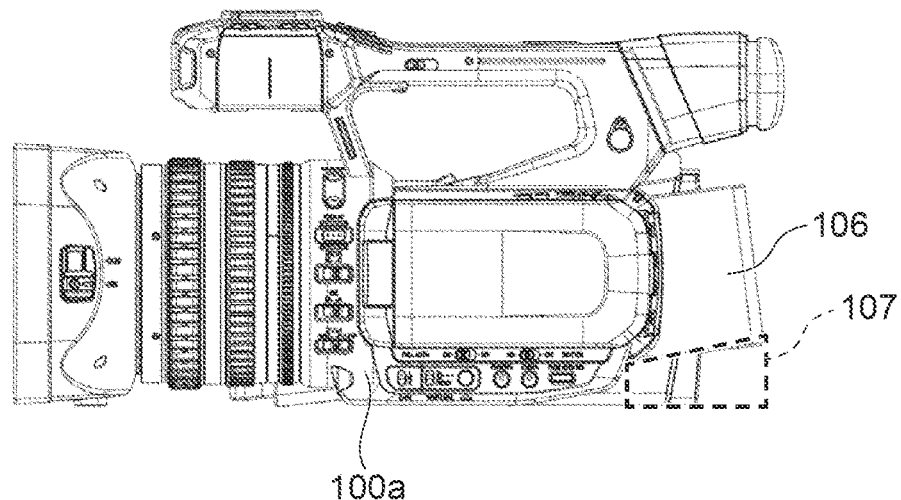
FIG. 5 is a right side view of the image capturing apparatus.

FIG. 5 is a right side view of the image capturing apparatus 100 in a state in which the battery 106 is attached to the battery chamber 105. The battery chamber 105 is formed such that the upper side thereof is inclined toward the front side through a predetermined angle with respect to the optical axis 184. Therefore, in a state in which the battery 106 is attached, a position on the lower surface and a position on the upper surface of the battery 106 gradually become higher as the positions shift toward the rear side. Therefore, under the battery 106, an under-battery space 107 is formed which progressively becomes wider as it extends rearward. With this, even when the image capturing apparatus 100 is used e.g. in a state placed on a tripod or a floor, a photographer can easily slide the battery 106 in the vertical direction to attach/detach the same, by inserting his/her fingers into the under-battery space 107. In other words, the battery 106 can be replaced by another even in a situation where there is an obstacle under the image capturing apparatus 100, providing excellent usability.

An external connection terminal section 108 is arranged on a left side of the battery chamber 105 (see FIG. 3). Terminals of the external connection terminal section 108 are arranged such that they protrude rearward and leftward. The gripping portion 109 is provided approximately in the center of the left side of the image capturing apparatus 100. The gripping portion 109 is gripped by the photographer when he/she performs shooting by holding the image capturing apparatus 100 at a height of the photographer's line of sight with a single hand. Note that when using the image capturing apparatus 100 while holding it with a single hand, the stability is higher when the image capturing apparatus 100 is held by a dominant hand. The gripping portion 109 is integrally formed with the left side of the image capturing apparatus 100 so as to enable a right-handed photographer belonging to the majority group to easily hold the image capturing apparatus 100 with his/her right hand.

Figure 6:
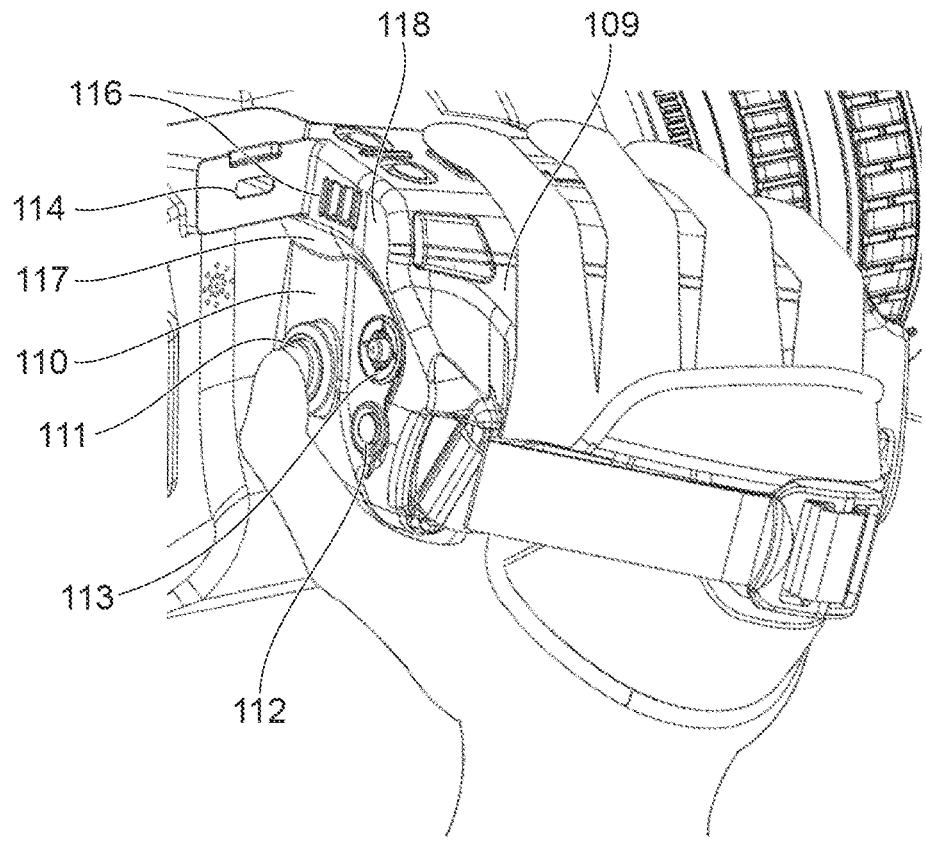
FIG. 6 is a perspective view of a gripping portion and components therearound.

FIG. 6 is a perspective view of the gripping portion 109 and components therearound. FIG. 6 shows how a photographer grips the gripping portion 109. A rear side of the gripping portion 109 is provided with a second air inlet port 116 (see FIGS. 3 and 6). A rear surface of the gripping portion 109 is provided with an operation section arrangement surface 110 on which various operation portions are arranged, and an air inlet port arrangement surface 118 is provided at a location above the operation section arrangement surface 110.

The operation section arrangement surface 110 is provided with a shooting start button 111, an enlarged display button 112 for displaying a shot image in an enlarged state, and a cross key 113. The photographer can start shooting by pressing the shooting start button 111 when desiring to start shooting and terminate the shooting by pressing the shooting start button 111 again when desiring to terminate the shooting. The photographer can display a video displayed on the display section 104 in an enlarged state by pressing the enlarged display button 112. By displaying a video displayed on the display section 104 in an enlarged state before or during shooting, the photographer can closely check a focus state of the video.

Further, the photographer can select one of items displayed on the display section 104 by moving a cursor displayed on the same in a desired one of the upward, downward, leftward, and rightward directions by tilting the cross key 113 and then depressing the same. This enables the photographer to change the settings of the image capturing apparatus 100, including those of an exposure state and a photosensitivity, as desired. The operation section arrangement surface 110 is arranged in a lower portion of the rear surface of the gripping portion 109 so as to enable the photographer to operate each button arranged on the operation section arrangement surface 110 with his/her thumb while gripping the gripping portion 109 with his/her right hand.

The left side of the image capturing apparatus 100 is provided with a USB connector 114 in a recessed area thereof between the gripping portion 109 and the external connection terminal section 108. The USB connector 114 is mounted on a USB circuit board 257 (see FIGS. 49A and 49B), described hereinafter. The USB connector 114 is a USB-Type-C connector conforming to the USB standard and is one of external interface connectors of the image capturing apparatus 100. The USB connector 114 is configured to be electrically connectable to an external device capable of performing USB communication conforming to the USB standard. Therefore, the image capturing apparatus 100 can be connected e.g. to a mobile communication device capable of operating at a communication speed not lower than a speed defined by LTE (Long Term Evolution) via the USB connector 114, whereby the image capturing apparatus 100 is capable of transmitting data to a remote location using a public communication network.

To efficiently dissipate heat generated in the apparatus, the image capturing apparatus 100 has a forced cooling structure using a fan and ducts. The image capturing apparatus 100 is provided with a first air inlet port 115 (see FIG. 2) at a location forward of the gripping portion 109 and rearward of the operation ring section 102. The location where the first air inlet port 115 is provided is where the first air inlet port 115 is prevented from being covered with a photographer's left hand even when the photographer operates the operation ring section 102 with the left hand while gripping the gripping portion 109 with his/her right hand, and hence, air can be stably drawn in.

The air inlet port arrangement surface 118 (see FIG. 6) is arranged such that it projects rearward of the image capturing apparatus 100 more than the operation section arrangement surface 110 and is connected to the operation section arrangement surface 110 via a wall surface 117. In other words, the air inlet port arrangement surface 118 is formed, on the rear surface of the gripping portion 109, as a step portion having a predetermined height from the operation section arrangement surface 110. The air inlet port arrangement surface 118 is formed with the second air inlet port 116 having an opening facing rearward. With this, even when the photographer grips the gripping portion 109 with his/her right hand and operates each operation portion with his/her right-hand thumb, the range within which the right-hand thumb can move can be limited to the operation section arrangement surface 110 by the wall surface 117. For this reason, the right-hand thumb does not climb onto the air inlet port arrangement surface 118, and hence the second air inlet port 116 is prevented from being covered by the photographer's hand.

An intermediate portion of an inclined surface of the bottom of the image capturing apparatus 100 which extends along the slope of the battery chamber 105 is provided with a third air inlet port 119 (see FIG. 4). An opening of the third air inlet port 119 is arranged at a location higher than the bottom surface of the image capturing apparatus 100, and hence even when the image capturing apparatus 100 is placed e.g. on a floor, a space is secured between the third air inlet port 119 and the floor. This makes it possible to prevent the third air inlet port 119 from being blocked, and stably draw air into the same.

Further, a right side surface of the body 100a, exposed when the display section 104 is opened, is provided with fourth air inlet ports 120 vertically arranged at respective two locations (see FIG. 4). Further, a left side wall of the external connection terminal section 108 is provided with an air outlet port 121 which is open obliquely rearward and leftward (see FIG. 3). The air outlet port 121 is arranged at a location rearward of the gripping portion 109 and opens substantially in an intermediate direction between the rearward direction and the leftward direction. Therefore, exhaust wind is prevented from blowing against a photographer's right hand or face when the image capturing apparatus 100 is in use.

Figure 7:
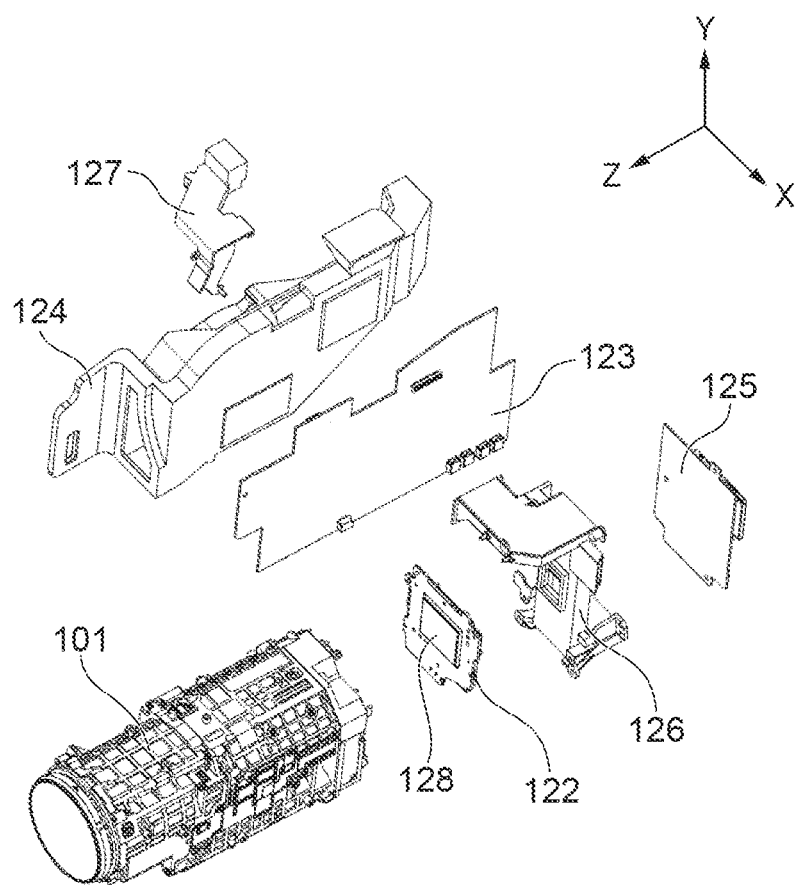
FIG. 7 is an exploded perspective view of a forced cooling structure.

FIG. 7 is an exploded perspective view of the forced cooling structure of the image capturing apparatus 100. Inside the image capturing apparatus 100, there are arranged the image capturing lens 101, a sensor circuit board 122, a main control circuit board 123, a main duct 124, a card circuit board 125, a sensor duct 126, and a gripping portion intake duct 127. The optical system of the image capturing lens 101 is configured to form an optical image of an object on an image capturing device 128, mounted on the sensor circuit board 122. The sensor circuit board 122, the main control circuit board 123, and the card circuit board 125 each have devices mounted thereon which generate heat to such an extent that cooling is required.

Figure 8A:
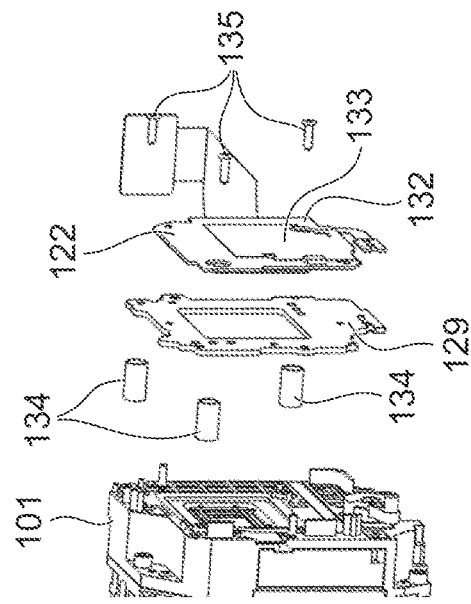
FIGS. 8A and 8B are exploded perspective views of a sensor circuit board and components therearound.
Figure 8B:
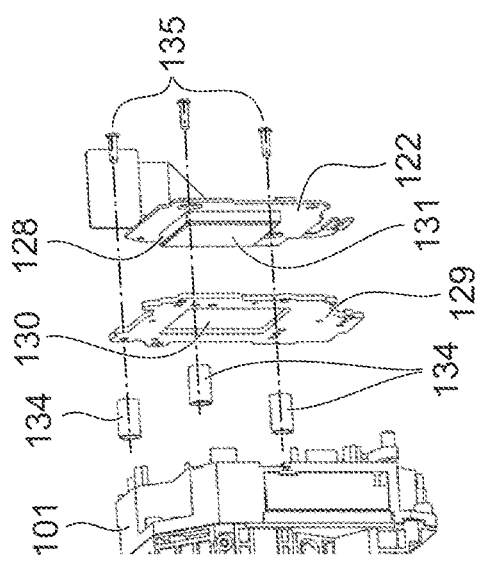

FIGS. 8A and 8B are exploded perspective views of the sensor circuit board 122 and components therearound. More specifically, FIGS. 8A and 8B show the sensor circuit board 122, as viewed from the front right side and the rear right side, respectively. The image capturing device 128 is mounted on the front side of the sensor circuit board 122. The image capturing device 128 generates heat when generating digital video signals by photoelectric conversion, which increases the temperature of the sensor circuit board 122. A sensor fixing sheet metal 129 is arranged in front of the sensor circuit board 122. An image capturing surface-protecting member 131 of the image capturing device 128 is exposed from a rectangular opening 130 formed in the sensor fixing sheet metal 129.

The sensor fixing sheet metal 129 is fixed to the image capturing device 128 with high accuracy with an adhesive, not shown, after adjusting its relative position. In an area of a projected shadow of the image capturing device 128 on a non-mounting surface 132 (surface opposite to the surface on which the image capturing device 128 is mounted), a sensor heat dissipation surface 133 is arranged. The sensor heat dissipation surface 133 is formed by removing an insulating protective film from the surface of the sensor circuit board 122 so as to cause conductors of the sensor circuit board 122 to be exposed and no other electrical components are arranged thereon.

Incidentally, the focus position of the image capturing lens 101 and the inclination of the optical axis 184 include individual product-dependent variations (individuality variations), and hence it is necessary to arrange the image capturing device 128 at a proper position and a proper inclination according to the individuality variation of the image capturing lens 101. The sensor fixing sheet metal 129 is floatingly supported by coil springs 134 which generate an urging force for separating the sensor fixing sheet metal 129 and the image capturing lens 101 from each other and position adjustment screws 135. By properly fastening the position adjustment screws 135, it is possible to adjust the position of the image capturing device 128 in a front-rear direction and the inclination with respect to the optical axis 184, and thereby arrange the image capturing device 128 at a desired position. The sensor circuit board 122 on which the image capturing device 128 is mounted is thus adjusted and fixed on an individual product basis, and hence the position and the inclination of the sensor circuit board 122 with respect to the image capturing lens 101 are different for each individual product of the image capturing apparatus 100.

Figure 9:
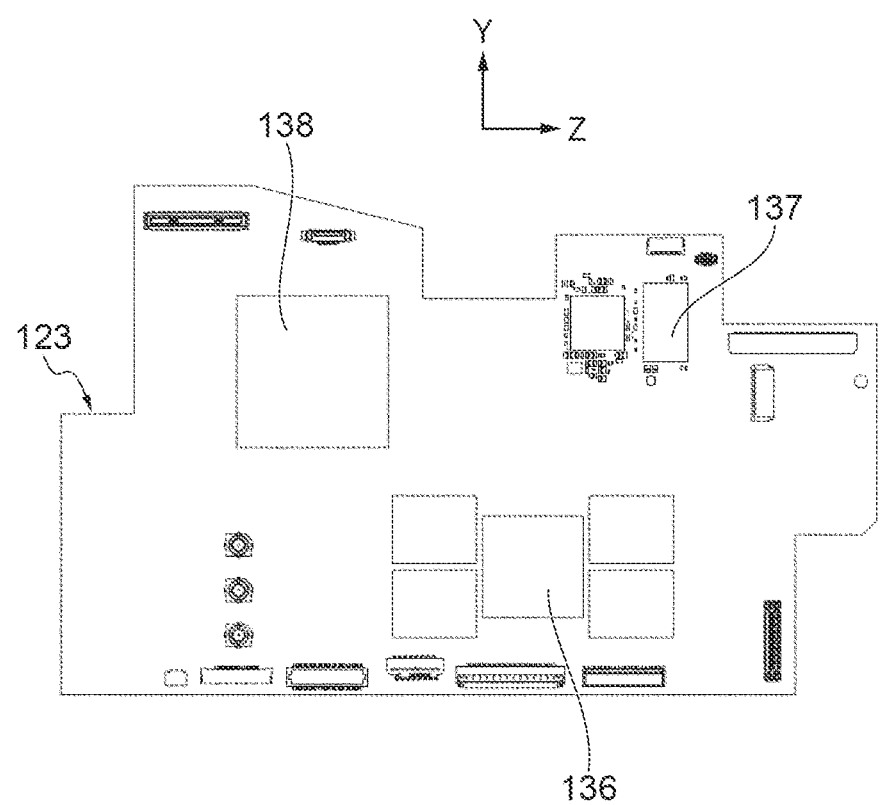
FIG. 9 is a view of a main control circuit board.

FIG. 9 is a view of the main control circuit board 123, and particularly shows a surface on which heat generating elements are mounted. The main control circuit board 123 has a lot of ICs mounted thereon and controls the overall operation of the image capturing apparatus 100.

On the same surface of the main control circuit board 123, there are mounted the ICs that consume large power and generate heat, including a video signal processor 146, referred to hereinafter, for processes signals output from the image capturing device 128. Specifically, ones of the ICs which mainly generate heat are three heat generating elements 136, 137, and 138. The main duct 124 is a member having a cavity therein and incorporates a rotary fan 148 (see FIG. 13), described hereinafter. The main duct 124 is a heat dissipation duct for dissipating heat generated in the image capturing apparatus 100 by performing forced cooling using the rotary fan 148.

Figure 10B:
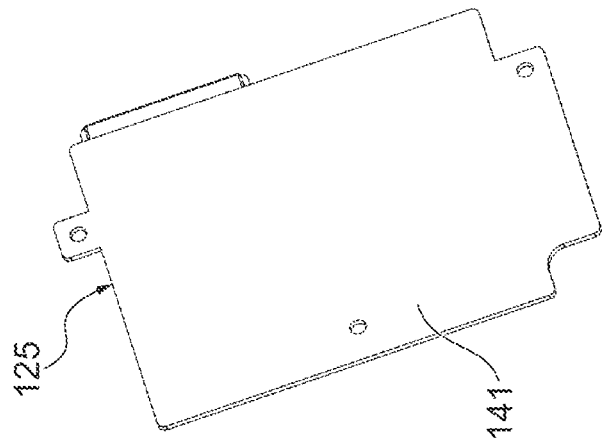
FIGS. 10A and 10B are perspective views of a card circuit board, as viewed from the front side and the rear side, respectively.
Figure 10A:
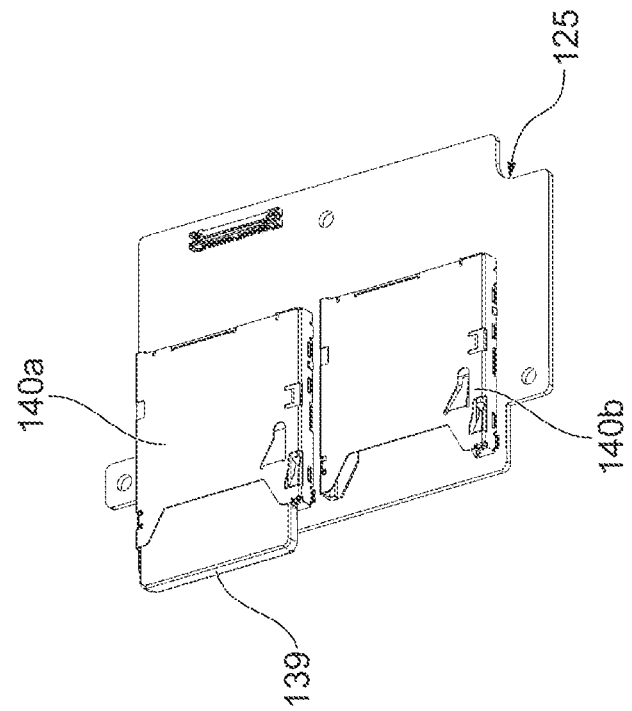

FIGS. 10A and 10B are perspective views of the card circuit board 125, as viewed from the front side and the rear side, respectively. The card circuit board 125 has two card holders 140a and 140b mounted thereon in each of which a recording medium 139 can be removably attached. The recording medium 139 is a removable flash memory, such as an SD card, for recording images and sound. On a non-mounting surface 141 which is opposite to the surface on which the card holders 140a and 140b are mounted, signal trances are exposed to the outside so as to improve heat diffusion efficiency.

Figure 11A:
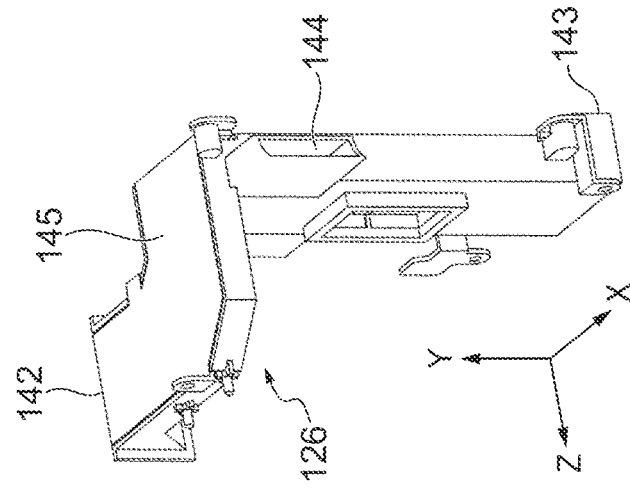
FIGS. 11A and 11B are perspective views of a sensor duct.
Figure 11B:
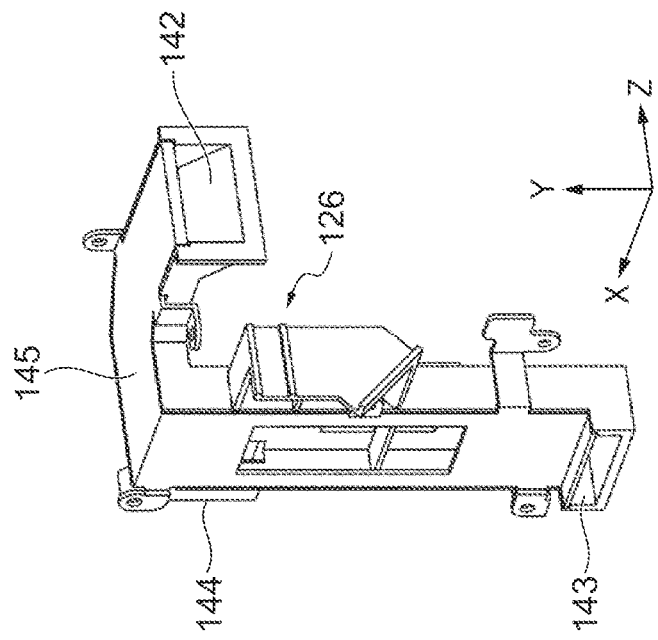

FIGS. 11A and 11B are perspective views of the sensor duct 126. The sensor duct 126 is a component having a cavity formed therein, and has a first opening 142 in an upper side, a second opening 143 in a lower side, and a third opening 144 in a right side thereof. The first opening 142 communicates with the main duct 124 without any gap. The second opening 143 communicates with the third air inlet port 119 (see FIG. 4) formed in the bottom surface of the image capturing apparatus 100 without any gap. The third opening 144 communicates with the fourth air inlet ports 120 (see FIG. 4) formed in the right side surface of the image capturing apparatus 100 without any gap. When the forced cooling using the rotary fan 148 (see FIG. 13) is performed, air flows are generated from the third air inlet port 119 and the fourth air inlet ports 120 to the first opening 142 by the air-drawing action of the rotary fan 148.

The sensor duct 126 is arranged between the sensor circuit board 122 and the card circuit board 125 (see FIG. 7) to cool the sensor circuit board 122 and the card circuit board 125. Further, the sensor duct 126 is connected to the handle portion 103 (see FIG. 4) such that heat can be exchanged via a sensor duct flat portion 145 which is exposed upward in the vicinity of the first opening 142. Note that details of the cooling structure using the sensor duct 126 will be described hereinafter.

The gripping portion intake duct 127 (see FIG. 7) is a tubular component having a cavity and disposed inside the gripping portion 109. The gripping portion intake duct 127 has one end communicating with the main duct 124 without any gap and the other end communicating with the second air inlet port 116 (see FIG. 3) without any gap. When the forced cooling using the rotary fan 148 is performed, an air flow is generated from the second air inlet port 116 to the main duct 124 by the air-drawing action of the rotary fan 148. Note that the details of the generation of the air flow will be described hereinafter.

Figure 12:
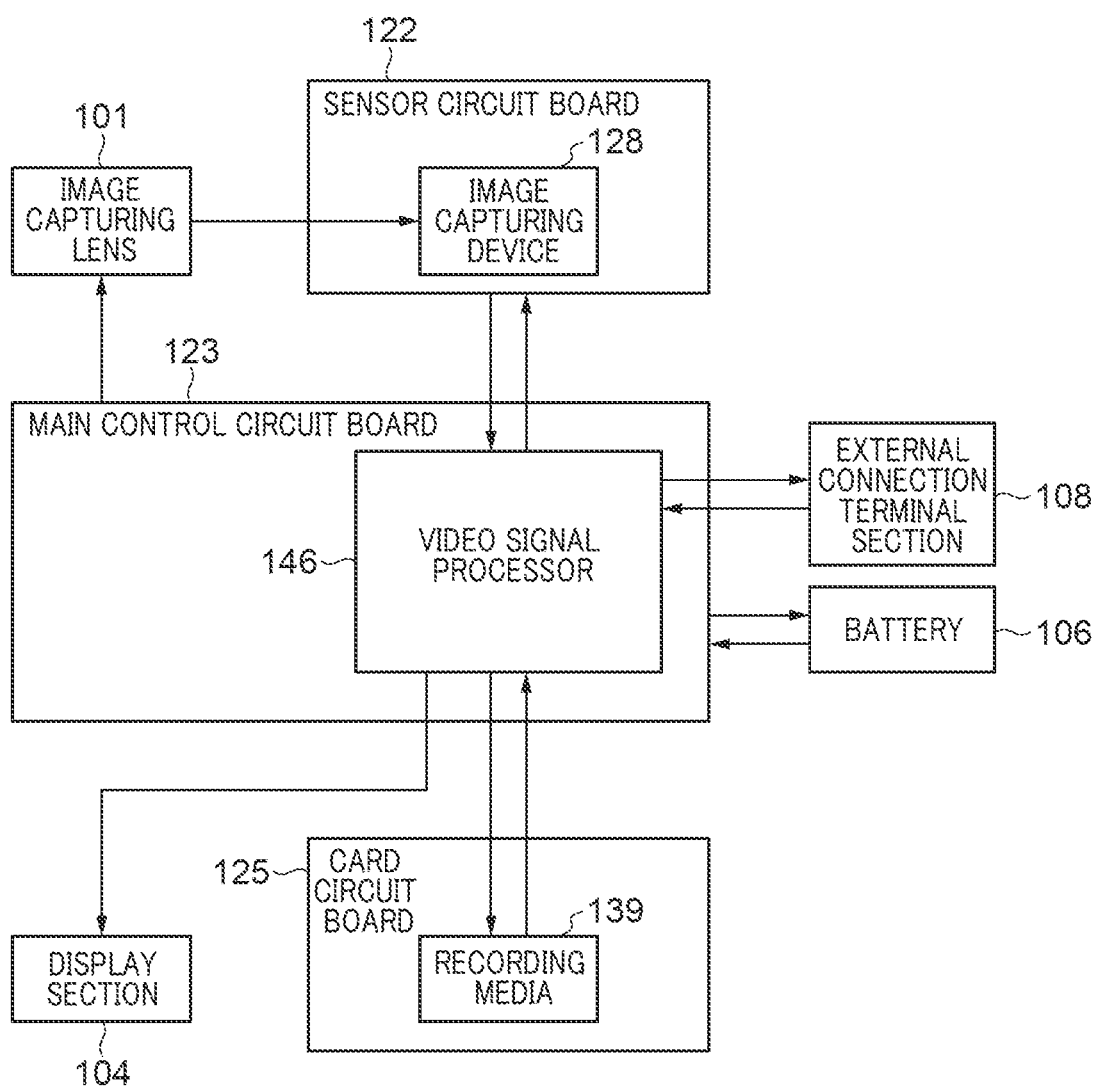
FIG. 12 is a block diagram of components of the image capturing apparatus, which are related to video processing performed by the image capturing apparatus.

FIG. 12 is a block diagram of components of the image capturing apparatus 100, which are related to video processing performed by the image capturing apparatus 100. The flow of the video processing performed by the image capturing apparatus 100 will be described with reference to FIG. 12. The image capturing apparatus 100 is operated by electric power supplied from the battery 106. When image capturing is started, incident light through the image capturing lens 101 forms an optical image on the image capturing device 128. The sensor circuit board 122 generates digital video signals corresponding to signals output by the image capture device 128. The generated digital video signals are output to the video signal processor 146 on the main control circuit board 123. The video signal processor 146 performs predetermined processing on the input digital video signals, and generates video data by combining audio signals, which have been separately input, and various meta data, with the processed digital video signals. For example, as the video data, data of a video having a resolution of 4K image quality at 24 fps or higher is generated. Note that the video signal processor 146 is formed by the three elements of the heat generating elements 136, 137, and 138.

The video data generated by the video signal processor 146 is sent to the display section 104 and displayed as a video. At this time, the operating status of the image capturing apparatus 100 is displayed as on-screen display information, on an as-needed basis. Further, in a case where recording of the video data is selected by a photographer, the video data generated by the video signal processor 146 is converted to one of various formats, such as RAW and WP4, by performing predetermined processing, then sent to the card circuit board 125, and stored in one of the recording media 139. Further, in a case where a predetermined connector is connected to the external connection terminal section 108, the video data can be output from the video signal processor 146 to the external connection terminal section 108 and transmitted to an external apparatus. Further, in the image capturing apparatus 100, it is possible to cause video data stored in the recording medium 139 to be read by the video signal processor 146, so as to be reproduced and displayed on the display section 104 or to be output to the external connection terminal section 108.

Figure 13:
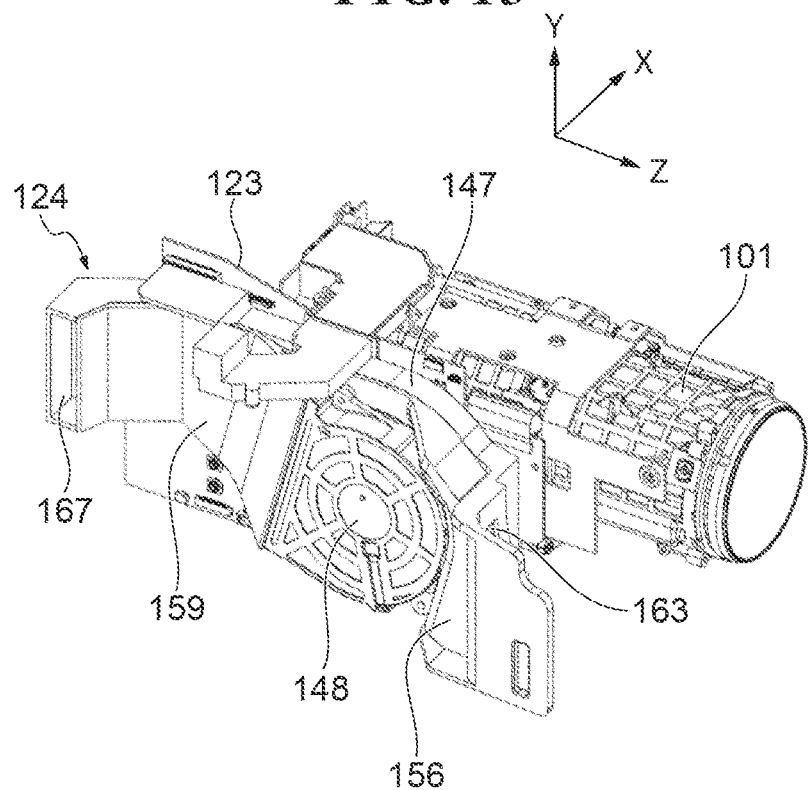
FIG. 13 is a perspective view of a main duct and components therearound.
Figure 14:
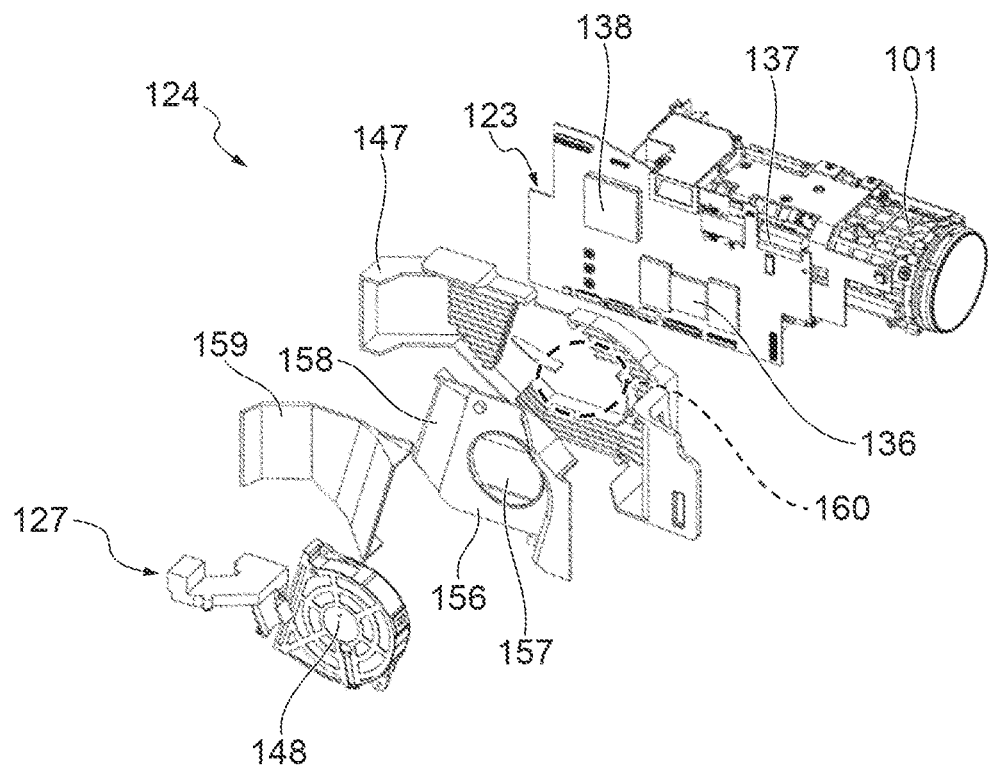
FIG. 14 is an exploded perspective view of the main duct and components therearound.

FIGS. 13 and 14 are a perspective view and an exploded perspective view of the main duct 124 and components therearound. The main duct 124 is mainly formed by a duct base 147 (base portion), the rotary fan 148, a front duct cover 156, and a rear duct cover 159. The main duct 124 is arranged on the left side of the image capturing lens 101 inside the image capturing apparatus 100 such that it is in contact with the main control circuit board 123.

The duct base 147 is formed of a die-cast aluminum material having high thermal conductivity. Heat dissipation rubbers, not shown, are sandwiched between the duct base 147 and the main control circuit board 123 adjacent thereto in a compressed state. The heat dissipation rubbers are members that are formed by a material obtained by kneading e.g. metal filler in a material which is very soft and has a high elasticity, such as a silicone rubber, and make it possible to smoothly transfer heat between components without generating a large reaction force.

All of the heat generating elements 136, 137, and 138 (see FIG. 9) are mounted on the same surface of the main control circuit board 123 toward the duct base 147, and the heat dissipation rubbers are arranged on all of these three heat generating elements, respectively. This makes it possible to efficiently transfer heat generated in the main control circuit board 123 to the duct base 147 and efficiently dissipate the heat.

The front duct cover 156 covers the duct base 147 and has a surface to which the rotary fan 148 is disposed. The front duct cover 156 has a fan opening 157 formed therethrough. Further, the front duct cover 156 is provided with an inclined wall 158 inclined with respect to the surface to which the rotary fan 148 is attached. Similar to the front duct cover 156, the rear duct cover 159 covers the duct base 147. An exhaust opening 167 is formed by the duct base 147 and the rear duct cover 159 (see FIG. 13). The exhaust opening 167 communicates with the air outlet port 121 (see FIG. 3) without any gap.

Figure 15:
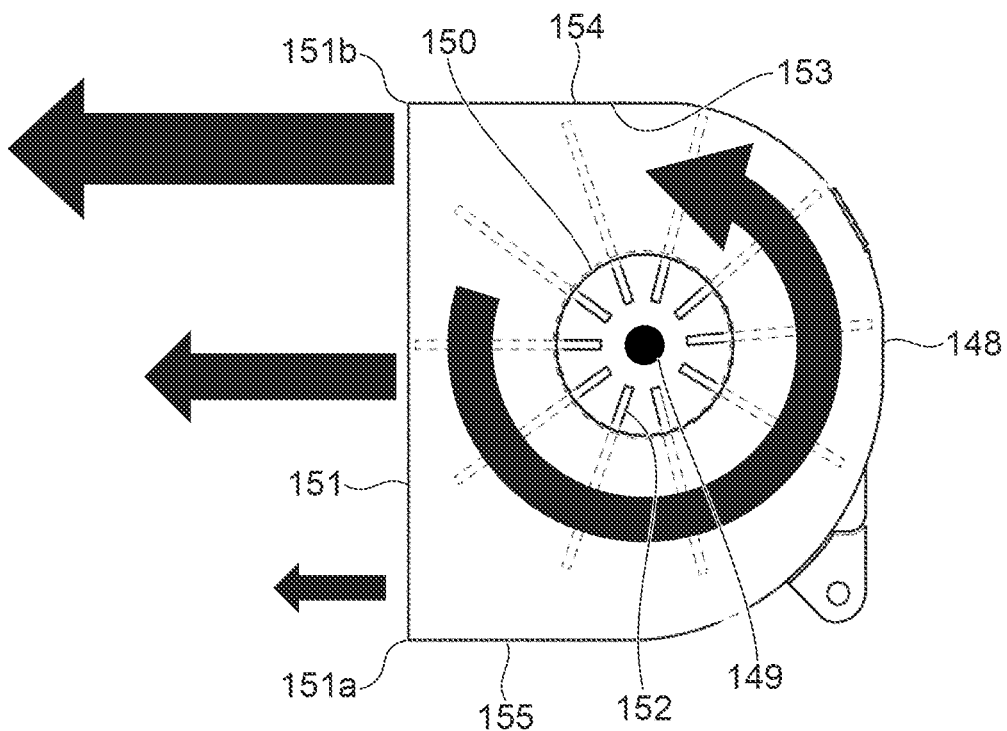
FIG. 15 is a view of a rotary fan.

FIG. 15 is a view of the rotary fan 148. In FIG. 15, rough air flow rate distribution of exhaust wind generated by driving of the rotary fan 148 is expressed by arrows. The size of each arrow appearing in FIG. 15 represents the magnitude of a flow rate of exhaust wind air discharged from the rotary fan 148. The rotary fan 148 is a centrifugal fan and has an impeller 152 having a plurality of blades arranged radially around a rotational axis 149. The impeller 152 is configured to be rotatable about the rotational axis 149 by a drive force of a motor, not shown.

Further, one surface of the outer shape of a casing of the rotary fan 148 is formed with a suction port 150 having a substantially circular shape. The center of the suction port 150 is substantially coincides with the rotational axis 149. A side wall of the casing is formed with a discharge port 151. When the impeller 152 is rotated, a negative pressure is generated in the center of the impeller 152, and air around the rotary fan 148 is drawn from the suction port 150 into the rotary fan 148. The air drawn into the rotary fan 148 is pushed outward from a central side toward a peripheral side by a centrifugal force generated by the rotating impeller 152, flows along a fan inner wall 153, and is then discharged from the discharge port 151 as exhaust wind.

Inside the rotary fan 148, air is conveyed while being pushed outward from the central side toward the peripheral side. For this reason, the flow rate of exhaust wind air flowing out of the discharge port 151 shows a biased non-uniform distribution in which the flow rate of air flowing on a side toward a first outer wall 155 of the discharge port 151 is smaller, and the flow rate of air flowing on a side toward a second outer wall 154 is larger. Therefore, the flow rate of air discharged from the discharge port 151 becomes larger from a lower end 151a (first end) of the discharge port 151 toward an upper end 151b (second end), in a direction orthogonal to the discharge direction of air from the discharge port 151.

Incidentally, the respective locations of the fan opening 157 of the front duct cover 156 and a fan intake area 160 of the duct base 147, both appearing in FIG. 14, correspond to the suction port 150 (see FIG. 15) of the rotary fan 148. Therefore, it is possible to cause air to smoothly flow from the fan intake area 160 to the rotary fan 148.

Figure 16:
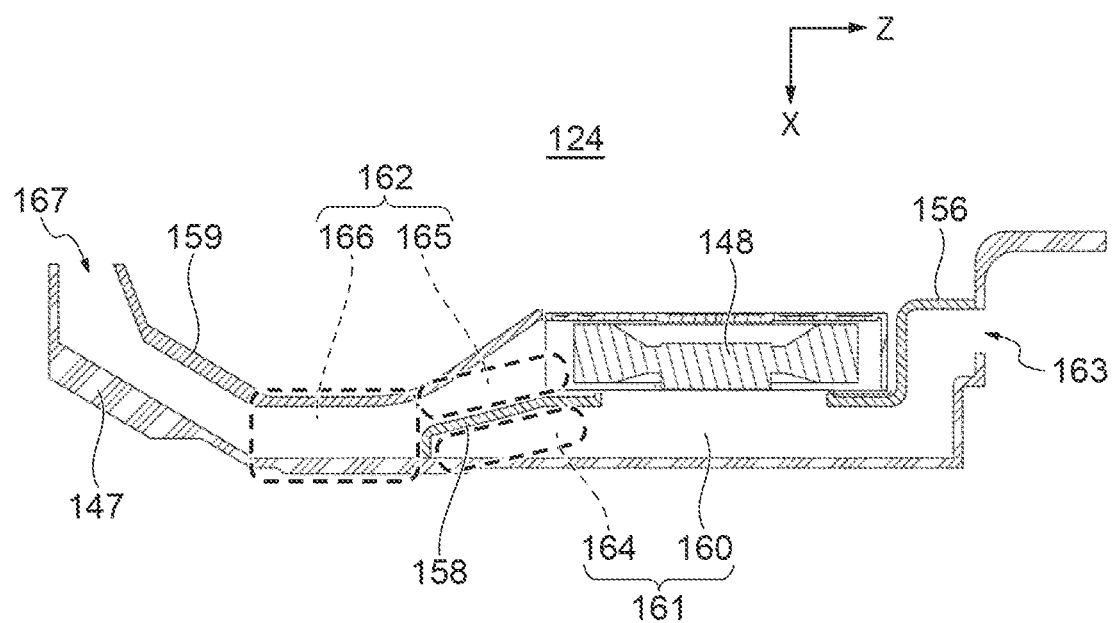
FIG. 16 is a cross-sectional view of the main duct, taken along an X-Z plane.
Figure 17:
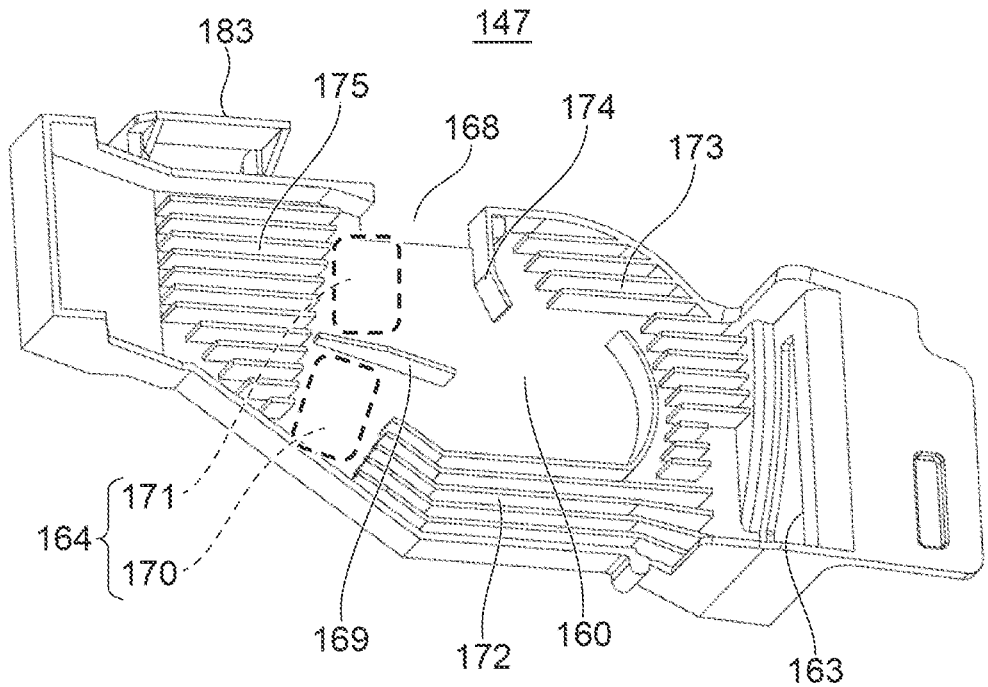
FIG. 17 is a perspective view of a duct base.

FIG. 16 is a cross-sectional view of the main duct 124, taken along an X-Z plane. FIG. 17 is a perspective view of the duct base 147. As shown in FIG. 17, the duct base 147 has an intake opening 163 in the form of a through hole in an erected wall on the front side. Further, the fan intake area 160 is provided in a central portion of the duct base 147, and a connection opening 168 formed by cutting part of the side wall and part of the bottom is provided upward of the fan intake area 160. The connection opening 168 is connected to the first opening 142 (see FIGS. 11A and 11B) of the sensor duct 126 without any gap when the main duct 124 is assembled.

A plurality of hollow portions are formed inside the main duct 124 by combining the above-described components including the duct base 147, the front duct cover 156, the rear duct cover 159, and so forth. As shown in FIG. 16, as portions forming an air flow passage, an intake duct 161 (intake-side duct portion) is formed mainly in the front half of the main duct 124 and an exhaust duct 162 (exhaust-side duct portion) is formed mainly in the rear half of the main duct 124, i.e. at a location rearward of the rotary fan 148. The intake duct 161 is an area mainly sandwiched between the duct base 147 and the front duct cover 156. The intake duct 161 has the fan intake area 160 and a detour area 164 as internal spaces.

The detour area 164 is a space surrounded by the inclined wall 158 of the front duct cover 156 and the duct base 147, for causing intake air to detour. The detour area 164 is formed in a range rearward of the rotary fan 148. Therefore, the intake duct 161 forms an air flow passage from the intake opening 163 to the suction port 150 (see FIG. 15) of the rotary fan 148 via part of the detour area 164. Note that the intake opening 163 and the first air inlet port 115 (see FIG. 2) communicate with each other without any gap.

The exhaust duct 162 is an area mainly surrounded by the duct base 147, the inclined wall 158 of the front duct cover 156, and the rear duct cover 159, and is arranged downstream of the rotary fan 148. The exhaust duct 162 has a slope portion 165 and an exhaust-side heat dissipation portion 166 as internal spaces. The exhaust duct 162 has the exhaust opening 167. The exhaust opening 167 communicates with the air outlet port 121 (see FIG. 3) without any gap.

As shown in FIG. 17, in the duct base 147, a substantially central portion of the detour area 164 in the vertical direction is provided with a first shield wall 169. The first shield wall 169 forms a boundary for partitioning the detour area 164 into an upper detour area 171 and a lower detour area 170 (predetermined space). The lower detour area 170 and the upper detour area 171 both communicate with the fan intake area 160. In the intake duct 161, the intake opening 163 and the suction port 150 of the rotary fan 148 communicate with each other via the lower detour area 170.

The duct base 147 has lower heat dissipation fins 172 (intake-side fins), upper heat dissipation fins 173, and exhaust-side heat dissipation fins 175, as heat dissipation fins, and these heat dissipation fins are integrally formed with the duct base 147. The lower heat dissipation fins 172 are a plurality of rib-shaped portions extending substantially in the front-rear direction and arranged below the fan intake area 160. The upper heat dissipation fins 173 are a plurality of rib-shaped portions extending substantially in the front-rear direction and arranged in an arear between the front side and the upper side of the fan intake area 160. The exhaust-side heat dissipation fins 175 are a plurality of rib-shaped portions extending substantially in the front-rear direction and arranged on a rear side of the detour area 164. A second shield wall 174 is provided between the connection opening 168 and the upper heat dissipation fins 173. Further, the duct base 147 is integrally formed with a USB connection wall portion 183.

Figure 18:
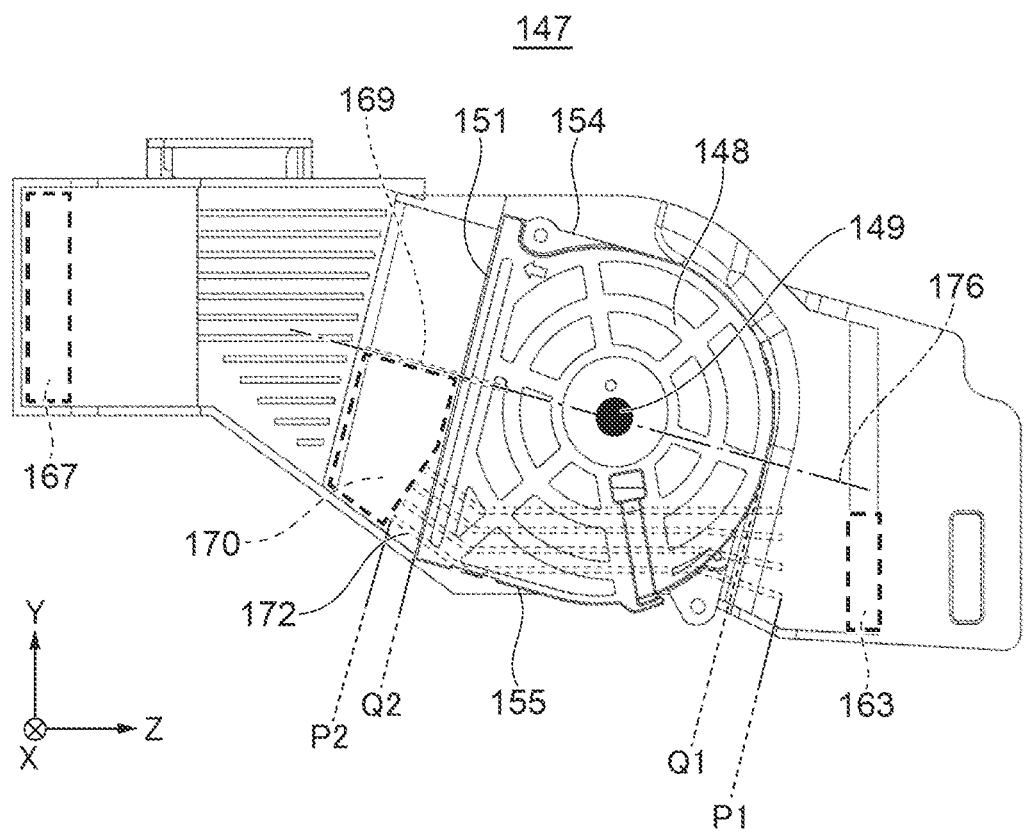
FIG. 18 is a view of the duct base, illustrating the rotary fan in a state superimposed thereon.

FIG. 18 is a view of the duct base 147, illustrating the rotary fan 148 in a superimposed state. A positional relationship between the rotary fan 148 and the lower heat dissipation fins 172 will be described. A line which passes the rotational axis 149 and is perpendicular to the discharge port 151 is defined as a center line 176. The center line 176 is parallel to the discharge direction of air from the discharge port 151. The lower heat dissipation fins 172 are arranged in an area closer in the vertical direction to the first outer wall 155 than the center line 176 is. The lower heat dissipation fins 172 are arranged such that a projected shadow thereof overlaps the rotary fan 148, as viewed from an axial direction of the rotational axis 149 (as viewed from the right-left direction).

An end position of the lower heat dissipation fins 172 toward the intake opening 163 (toward the intake opening) in a direction parallel to the center line 176 is defined as a first end position P1. Further, an end position of the lower heat dissipation fins 172 toward the exhaust opening 167 (toward the exhaust opening) in the direction parallel to the center line 176 is defined as a second end position P2. Further, an end position of the rotary fan 148 toward the intake opening 163 is defined as an end position Q1, and an end position of the rotary fan 148 toward the exhaust opening 167 is defined as an end position Q2. The first end position P1 is closer in the direction parallel to the center line 176 to the intake opening 163 than the end position Q1 is. The lower detour area 170 is adjacent to the second end position P2. That is, the lower heat dissipation fins 172 extend to the lower detour area 170 toward the exhaust opening 167. Further, the second end position P2 is at a location closer to the exhaust opening 167 than the end position Q2 is. That is, the lower heat dissipation fins 172 are formed within a range including the entire length of the rotary fan 148 in the direction parallel to the center line 176.

The end positions P1, P2, Q1, and Q2 have the above-mentioned positional relationship in the direction parallel to the center line 176. However, the end positions P1, P2, Q1, and Q2 may have the above-mentioned positional relationship in a direction of a straight line passing the intake opening 163 and the exhaust opening 167. Alternatively, the end positions P1, P2, Q1, and Q2 may have the above-mentioned positional relationship in a direction of the optical axis 184.

Figure 19:
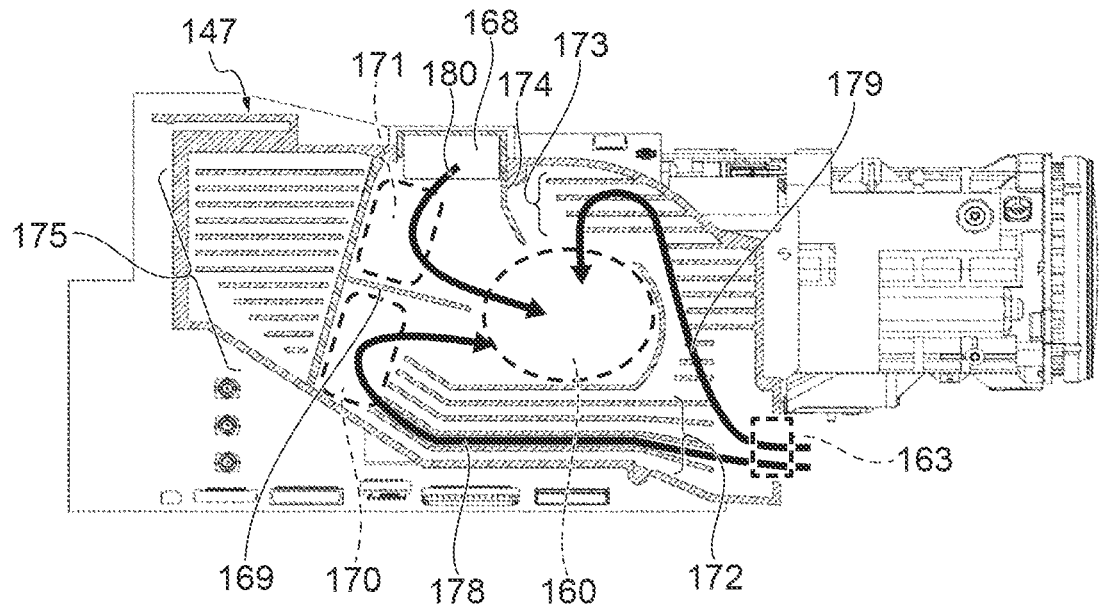
FIG. 19 is a view illustrating flows of air in the main duct.

FIG. 19 is a view illustrating flows of air in the main duct 124. A flow of air that is drawn in from the intake opening 163, flows through the lower side of the fan intake area 160 via the lower heat dissipation fins 172, and flows into the fan intake area 160 via the lower detour area 170 is referred to as a first intake air flow 178. The lower detour area 170 is located rearward of the fan intake area 160, and hence the first intake air flow 178 reaches the fan intake area 160 after making a U-turn.

Further, a flow of air that is drawn in from the intake opening 163 and flows into the fan intake area 160 from the upper side of the fan intake area 160 after flowing between the upper heat dissipation fins 173 is referred to a second intake air flow. Further, a flow of air that flows into the fan intake area 160 from the connection opening 168 after flowing through the first opening 142 (see FIGS. 11A and 11B) of the sensor duct 126 is referred to as a third intake air flow 180. Exhaust wind discharged from the rotary fan 148 necessarily passes the area where the exhaust-side heat dissipation fins 175 are provided.

Figure 20:
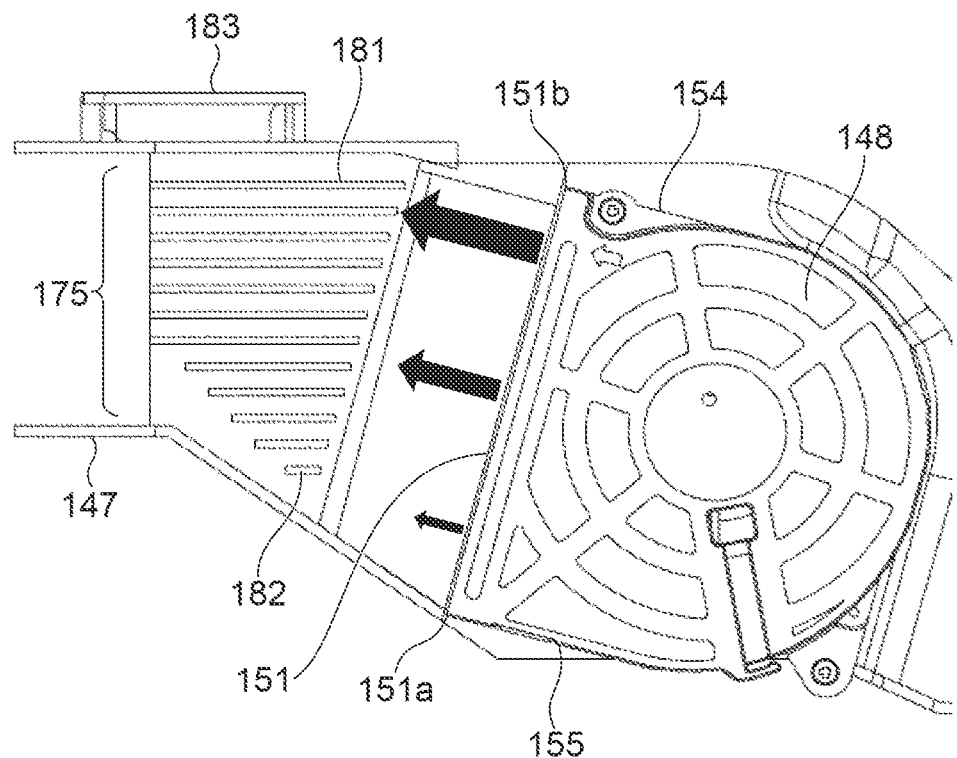
FIG. 20 is a view of exhaust-side heat dissipation fins and the rotary fan.

FIG. 20 is a view of the exhaust-side heat dissipation fins 175 and the rotary fan 148. In FIG. 20, the size of each arrow schematically represents a flow rate of exhaust wind air. A relationship between the exhaust-side heat dissipation fins 175 and the rotary fan 148 will be described. The exhaust-side heat dissipation fins 175 are provided in plurality in the exhaust duct 162 in substantially parallel to the discharge direction of air from the rotary fan 148, but are not uniform in length. The exhaust-side heat dissipation fins 175 are formed such that fins closer to the upper end 151b of the discharge port 151 are longer than fins closer to the lower end 151a.

For example, the exhaust-side heat dissipation fins 175 are formed by first heat dissipation fins 181 each having a longer entire length and arranged in the vicinity of the second outer wall 154 where the flow rate of exhaust wind air discharged from the rotary fan 148 is larger, and second heat dissipation fins 182 each having a shorter entire length and arranged in the vicinity of the first outer wall 155 where the flow rate of exhaust wind air discharged from the rotary fan 148 is smaller. By arranging the exhaust-side heat dissipation fins 175 as described above, it is possible to realize a duct which has a low ventilation resistance in an area where the air flow rate is small and has a high heat dissipation efficiency as a whole. The USB connection wall portion 183 is formed in the vicinity of the first heat dissipation fins 181. The USB connection wall portion 183 has a flat shape and is substantially parallel to the exhaust-side heat dissipation fins 175.

Figure 21:
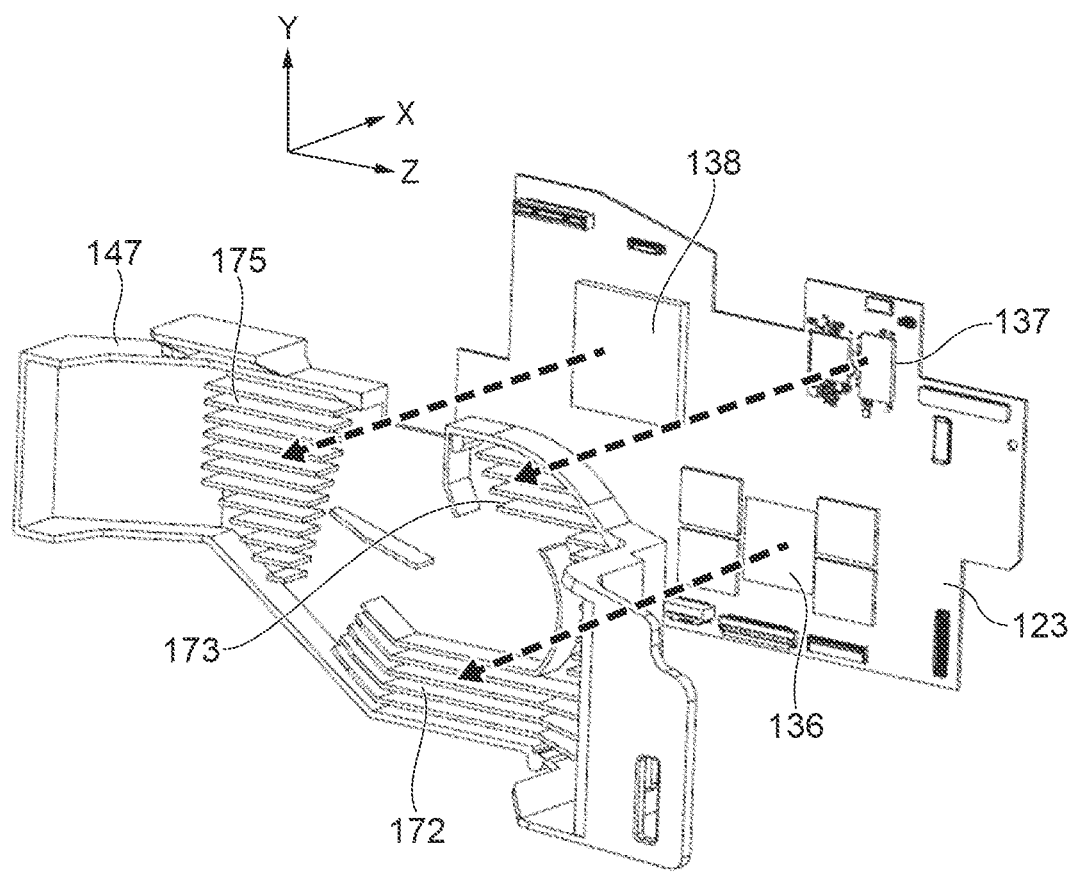
FIG. 21 is a perspective view of the duct base and the main control circuit board.

FIG. 21 is a perspective view of the duct base 147 and the main control circuit board 123. A positional relationship between the rib-shaped portions of the duct base 147 and the heat generating elements on the main control circuit board 123 will be described with reference to FIG. 21. In a direction of the thickness of the main control circuit board 123, a projected shadow of the front lower heat generating element 136 overlaps the lower heat dissipation fins 172, a projected shadow of the front upper heat generating element 137 overlaps the upper heat dissipation fins 173, and a projected shadow of the rear heat generating element 138 overlaps the exhaust-side heat dissipation fins 175. The relationship described above makes it possible to efficiently transfer heat generated in the heat generating element to the associated ones of the fins and efficiently discharge heat by forced cooling using the rotary fan 148.

Next, a relationship between the intake duct 161 and the exhaust duct 162 in a two-layer structure formed by them will be described. As shown in FIG. 16, the main duct 124 is partitioned in the thickness direction by the inclined wall 158 into the two layers of the intake duct 161 and the exhaust duct 162 on a downstream side of the discharge port 151 of the rotary fan 148. That is, the intake duct 161 and the exhaust duct 162 are arranged such that they are overlaid on each other.

With this, it is possible to arrange the detour area 164 at a location rearward (−Z side) of the rotary fan 148. As a result, the first intake air flow 178 is formed as a flow of air along a path which extends to the rear side of the rotary fan 148 and then returns to the rotary fan 148 after making a U-turn, causing air to be drawn into the rotary fan 148 (see FIG. 19). Therefore, the lower dissipation fins 172 extending to the lower detour area 170 can be made sufficiently long without increasing the size of the apparatus, which is advantageous in dissipating heat from the front lower heat generating element 136.

Note that from a viewpoint of prevention of increase in the size of the apparatus, projected shadows of at least part of the intake duct 161 and at least part of the exhaust duct 162 may overlap each other on the downstream side of the discharge port 151, as viewed from the axial direction of the rotational axis 149 (as viewed from the direction of the rotational axis). Further, from the viewpoint of prevention of increase in the size of the apparatus, projected shadows of at least part of the lower heat dissipation fins 172 and at least part of the rotary fan 148 may overlap each other, as viewed from the axial direction of the rotational axis 149.

Figure 22:
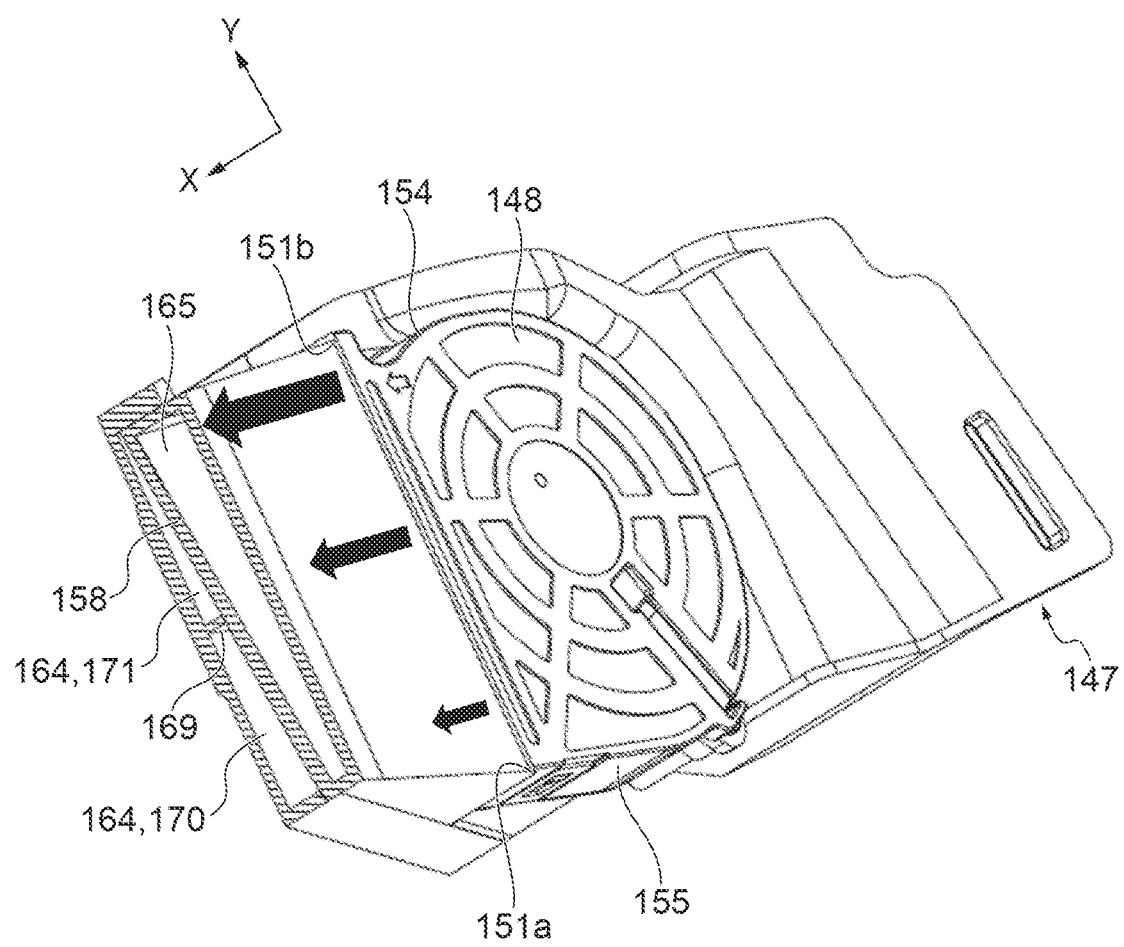
FIG. 22 is a perspective view of the rotary fan and the duct base, also illustrating a cross-section of an inclined wall of the main duct.

FIG. 22 is a perspective view of the rotary fan 148 and the duct base 47, also illustrating a cross-section of the inclined wall 158 of the main duct 124. The illustrated cross-section is that of a portion where the detour area 164 and the slope portion 165 overlap each other. The size of each arrow appearing in FIG. 22 schematically represents the magnitude of a flow rate of exhaust wind air. The inclined wall 158 has inclinations with respect to both of the Y-axis and the Z-axis (see also FIG. 16). Therefore, in a range in which projected shadows of the intake duct 161 and the exhaust duct 162 overlap each other, as viewed from the axial direction of the rotational axis 149, a cross-sectional area of the air flow passage in the intake duct 161 and a cross-sectional area of the air flow passage in the exhaust duct 162 gradually change in the vertical direction. That is, the respective cross-sectional areas of the air flow passages in the detour area 164 and the slope portion 165 gradually change in the vertical direction.

Specifically, the cross-sectional area of the air flow passage in the detour area 164 becomes smaller from the lower end 151a to the upper end 151b of the discharge port 151 and the cross-sectional area of the air flow passage in the slope portion 165 becomes larger from the lower end 151a to the upper end 151b. On the side toward the second outer wall 154 where the flow rate of exhaust wind air discharged from the rotary fan 148 is larger, the cross-sectional area of the air flow passage in the slope portion 165 is larger than that in the detour area 164, and hence it is possible to reduce the ventilation resistance and thereby efficiently discharge air. On the other hand, on the side toward the first outer wall 155 where the flow rate of exhaust wind air is smaller, the cross-sectional area of the air flow passage in the detour area 164 is larger than that in the slope portion 165, and hence it is possible to reduce the ventilation resistance and thereby efficiently draw in air. Therefore, it is possible to efficiently draw in and discharge air while maintaining constant the total thickness of the two layers.

Further, as described hereinabove, on the downstream side of the rotary fan 148, the inclined wall 158 partitions between the intake duct 161 and the exhaust duct 162, thereby forming two-layered air flow passages. With this, the third intake air flow 180 (see FIG. 19) is formed by a flow of air which enters the main duct 124 and is then guided to the rotary fan 148 by a short distance via the upper detour area 171. Thus, it is possible to efficiently guide air drawn in from the sensor duct 126 to the suction port 150.

Figure 23:
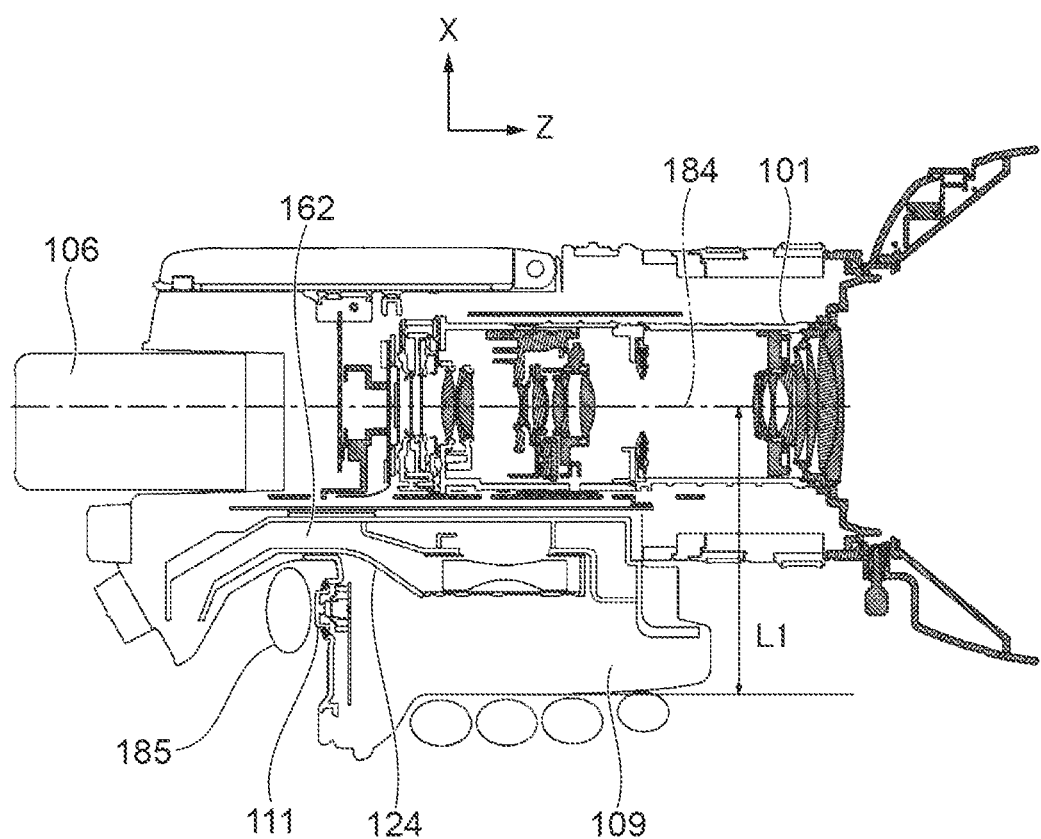
FIG. 23 is a cross-sectional view of the main duct, taken along a Y-Z plane.

FIG. 23 is a cross-sectional view of the main duct 124 taken along an X-Z plane passing the optical axis 184. The gripping characteristics of the gripping portion 109 will be described. In the exhaust duct 162, air flows along the slope portion 165, as shown in FIG. 16, and hence the exhaust heat dissipation portion 166 and the detour area 164 are substantially at the same height. As shown in FIG. 23, the air flow passage in the exhaust duct 162 is a curved passage which goes toward the optical axis 184, and then goes away from the same. The rear surface of the gripping portion 109 has a shape that does not interfere with an operation of a photographer who operates the shooting start button 111 by a right-hand thumb 185. Further, the gripping portion 109 is arranged such that the right-hand thumb 185 is positioned to a most deeply recessed position of the main duct 124 in the right-left direction.

The main duct 124 is arranged at a location closer to the body 100a (location closer to a body) than the outline (main gripping surface) of the gripping portion 109. Further, the exhaust duct 162 of the main duct 124 is made close to the image capturing optical axis 184, and part of the main duct 124 is arranged inside the gripping portion 109 to reduce a distance L1 from the optical axis 184 to the main holding surface of the gripping portion 109. This reduces the size of the image capturing apparatus 100 in the right-left direction.

Further, by arranging the lower heat dissipation fins 172 on the projected shadow of the rotary fan 148 as described above (see FIG. 18), the main duct 124 is caused to have substantially the same size in the vertical direction as the rotary fan 148. Therefore, it is possible to realize the gripping portion 109, compact in size, which can be gripped to hold the main duct 124 therein together. Since the gripping portion 109 is compact, a photographer can easily grip the gripping portion 109. Further, since the distance L1 is short, the moment of force applied to the right hand holding the gripping portion 109 due to the weight of the image capturing lens 101 and the battery 106 becomes small, which enables the photographer to hold the gripping portion 109 with excellent stability.

Figure 24:
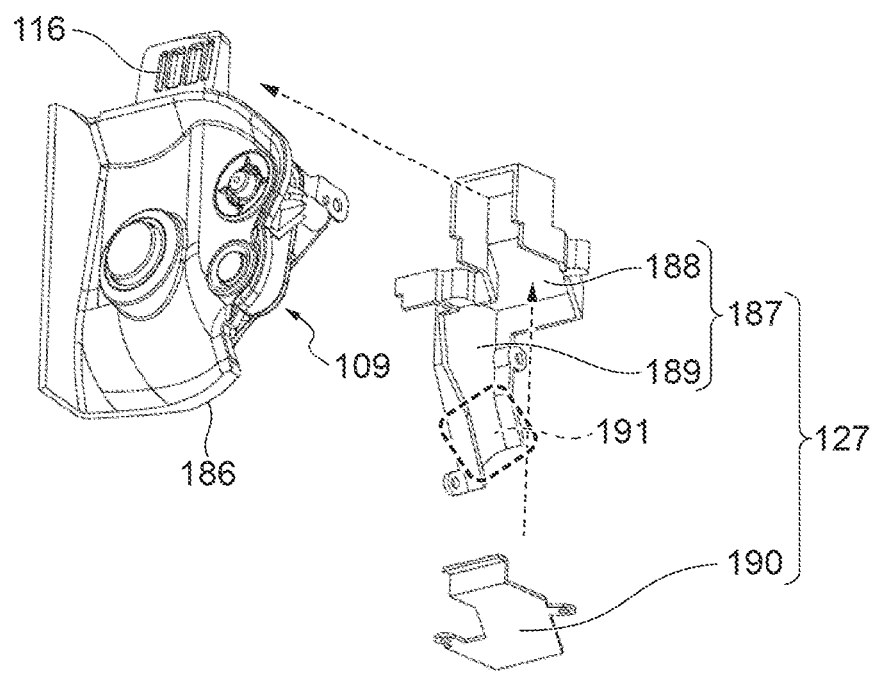
FIG. 24 is an exploded perspective view of a rear portion of the gripping portion and a gripping portion intake duct.

FIG. 24 is an exploded perspective view of a rear portion of the gripping portion 109 and the gripping portion intake duct 127. The rear side of the gripping portion 109 is covered with a grip cover 186. The second air inlet port 116 (see FIG. 6) is provided in the grip cover 186. The inside of the second air inlet port 116 is connected to the gripping portion intake duct 127. The gripping portion intake duct 127 has a grip duct base 187 and a grip duct sheet metal 190. The grip duct base 187 is formed of a material which is low in thermal conductivity, such as a plastic resin material. For example, the grip duct base 187 is formed by a member which is lower in thermal conductivity than the duct base 147. This makes heat exchange difficult to occur between the inside and the outside of the grip duct base 187.

The grip duct base 187 is formed by a grip duct-forming portion 188 and a grip duct-extending portion 189. The grip duct-forming portion 188 is formed into a substantially U-shape (channel shape) as viewed from the side of the grip cover 186, and an internal cavity is formed by covering the open side of the U-shape with the grip duct sheet metal 190. Further, an opening of the internal cavity formed by the grip duct-forming portion 188 and the grip duct sheet metal 190 is connected to the inside of the second air inlet port 116 so as to allow air drawn in from the second air inlet port 116 to flow through the gripping portion intake duct 127. The grip duct-extending portion 189 communicates with the internal cavity formed by the grip duct-forming portion 188 and the grip duct sheet metal 190. A duct opening portion 191 of the grip duct-extending portion 189 has a substantially U-shaped cross section.

Figure 25A:
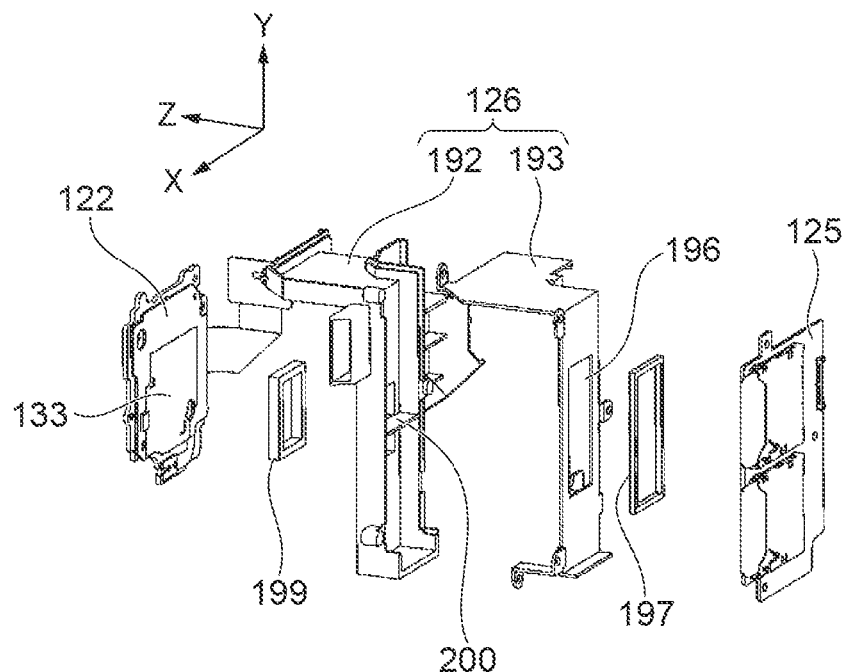
FIGS. 25A and 25B are exploded perspective views of the sensor duct and components therearound.
Figure 25B:
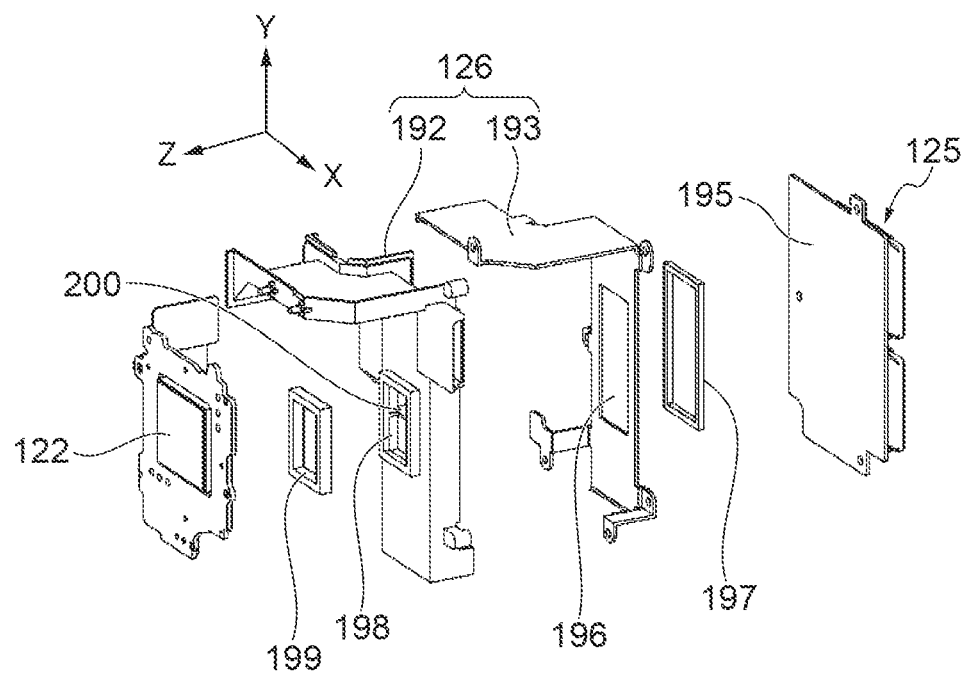
Figure 26:
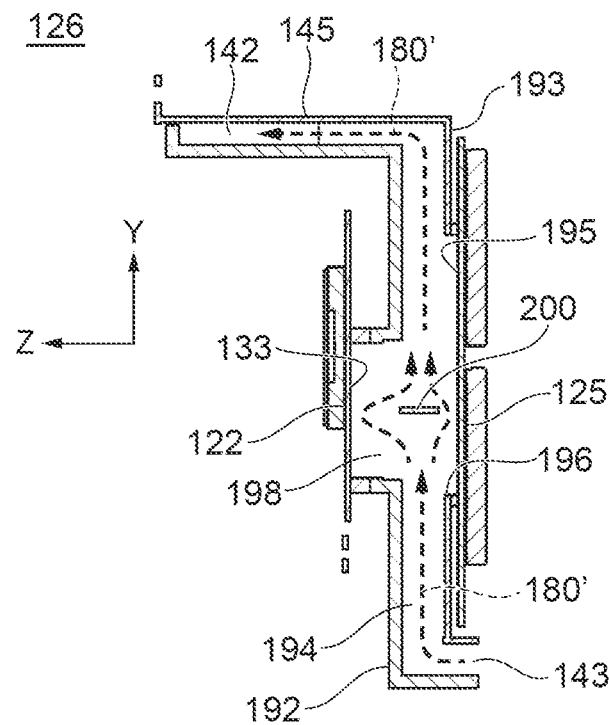
FIG. 26 is a cross-sectional view of the sensor duct and components therearound.
Figure 27:
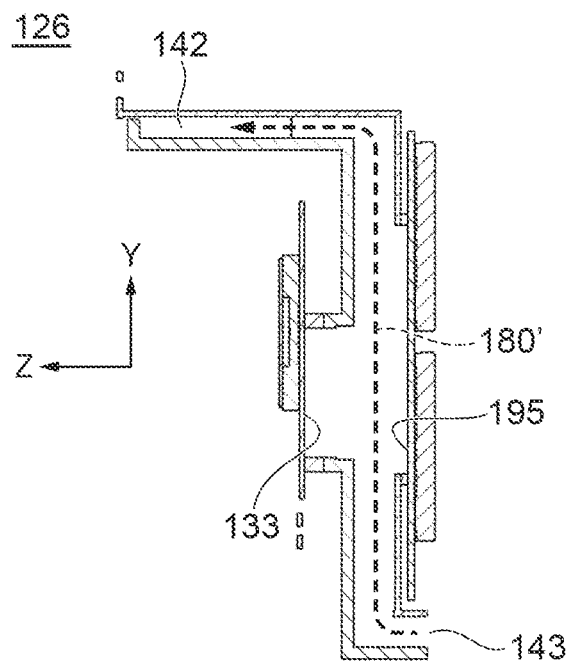
FIG. 27 is a cross-sectional view of a sensor duct according to a comparative example and components therearound.

FIGS. 25A and 25B are exploded perspective views of the sensor duct 126 and components therearound. FIGS. 26 and 27 are cross-sectional views of the sensor duct 126 and components therearound. A mechanism for cooling the sensor circuit board 122 (see FIG. 7) and the card circuit board 125 (see FIG. 7) using the sensor duct 126 (see FIGS. 11A and 11B) will be described. FIG. 27 shows a comparative example in which a plate-shaped portion 200 is not provided.

The sensor duct 126 has an internal cavity 194 formed by assembling a sensor duct base 192 and a card circuit board-fixing sheet metal 193 (see FIG. 26). The card circuit board 125 is fixed to the card circuit board-fixing sheet metal 193 such that a card slot non-mounting surface 195 of the card circuit board 125 is opposed to the card circuit board-fixing sheet metal 193. The card circuit board-fixing sheet metal 193 is formed with a sheet metal opening 196. A card-side cushion member 197 having a rectangular hollow frame shape is arranged between the card circuit board-fixing sheet metal 193 and the card slot non-mounting surface 195 (see FIGS. 25A and 25B). Part of the card slot non-mounting surface 195 is shielded from surrounding outer space by the card-side cushion member 197 and exposed from the sheet metal opening 196 into the internal cavity 194.

The sensor circuit board 122 is arranged such that the sensor heat dissipation surface 133 of the sensor circuit board 122 is opposed to the sensor duct base 192. The sensor duct base 192 has a sensor duct opening 198 formed at a location opposed to the sheet metal opening 196. A sensor-side cushion member 199 having a rectangular hollow frame shape is arranged between the sensor duct base 192 and the sensor circuit board 122 (see FIGS. 25A and 25B). Part of the sensor heat dissipation surface 133 is exposed from the sensor duct opening 198 into the internal cavity 194 in a state shielded from surrounding outer space by the sensor-side cushion member 199. Variation in position and inclination of the sensor circuit board 122, caused by individuality variation of the image capturing lens 101, is absorbed by the sensor-side cushion member 199, and the part of the sensor heat dissipation surface 133, exposed into the internal cavity 194, is maintained in the state shielded from the surrounding outer space. The sensor duct base 192 is provided with the plate-shaped portion 200 at an intermediate location between the sheet metal opening 196 and the sensor duct opening 198.

As shown in FIG. 26, an air flow 180' is formed from the second opening 143 toward the first opening 142. Note that the air flow 180' becomes the third intake air flow 180 on the downstream side of the air flow passage therefor. A main surface of the plate-shaped portion 200 is orthogonal to the air flow 180'. Air flowing in the sensor duct 126 detours around the plate-shaped portion 200, passes between the plate-shaped portion 200 and the sensor heat dissipation surface 133 and between the plate-shaped portion 200 and the card slot non-mounting surface 195, and flows toward the first opening 142. In a case where the plate-shaped portion 200 is not provided as shown in FIG. 27, the air flow 180' does not pass the vicinity of the sensor heat dissipation surface 133 and the vicinity of the card slot non-mounting surface 195, and as a result, the cooling efficiency is reduced.

In the present embodiment, as shown in FIG. 26, air warmed by receiving heat from the sensor circuit board 122 and the card circuit board 125 flows directly under the sensor duct flat portion 145 formed by the card circuit board-fixing sheet metal 193 and flows from the first opening 142 into the main duct 124. As described above, the connection opening 168 (see FIGS. 17 and 19) and the first opening 142 are connected to each other without any gap. Therefore, the air used for cooling the sensor circuit board 122 and the card circuit board 125 flows through the inside of the sensor duct 126 and then into the main duct 124 via the first opening 142 and the connection opening 168, to form the third intake air flow 180 (see FIG. 19).

As shown in FIG. 19, air of the third intake air flow 180 drawn in from the sensor duct 126, flows into the upper detour area 171. On the other hand, air of the first intake air flow 178 drawn in from the first air inlet 115 (see FIG. 2) flows into the lower detour area 170. Since the lower detour area 170 and the upper detour area 171 are separated by the first shield wall 169, the two flows do not merge before reaching the fan intake area 160.

The total passage for the third intake air flow 180 including the air flow 180' in the sensor duct 126 is long and has many curved portions, and hence air is difficult to flow. On the other hand, the air of the first intake air flow 178 is easier to flow than the air of the third intake air flow 180. By arranging the first shield wall 169, drawing of the air of the third intake air flow 180 into the suction port 150 is prevented from being obstructed due to the influence of the first intake air flow 178. Similarly, the second intake air flow 179 and the third intake air flow 180 are separated and shielded from each other by the second shield wall 174 up to immediately before air of the two flows is drawn into the suction port 150 of the rotary fan 148. This makes it possible to prevent drawing of the air of the third intake air flow 180 into the suction port 150 of the rotary fan 148 from being obstructed due to the influence of the second intake air flow 179.

Figure 28A:
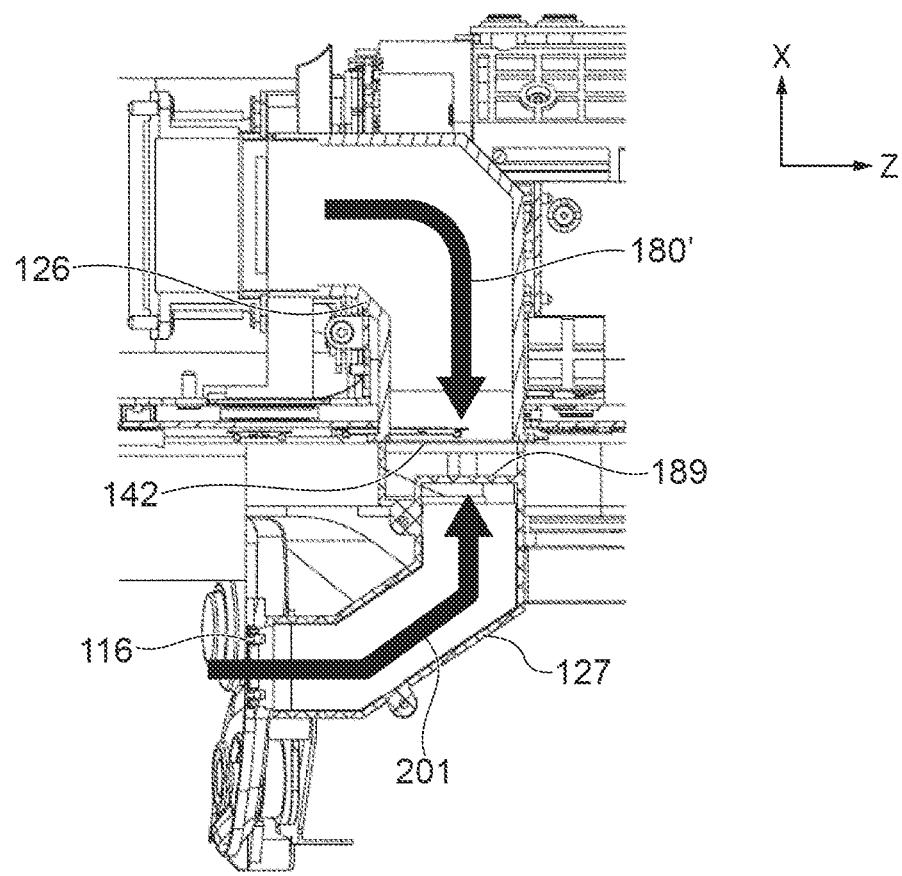
FIGS. 28A and 28B are cross-sectional views of the gripping portion intake duct and the sensor duct, taken along an X-Z plane and an X-Y plane, respectively.
Figure 28B:
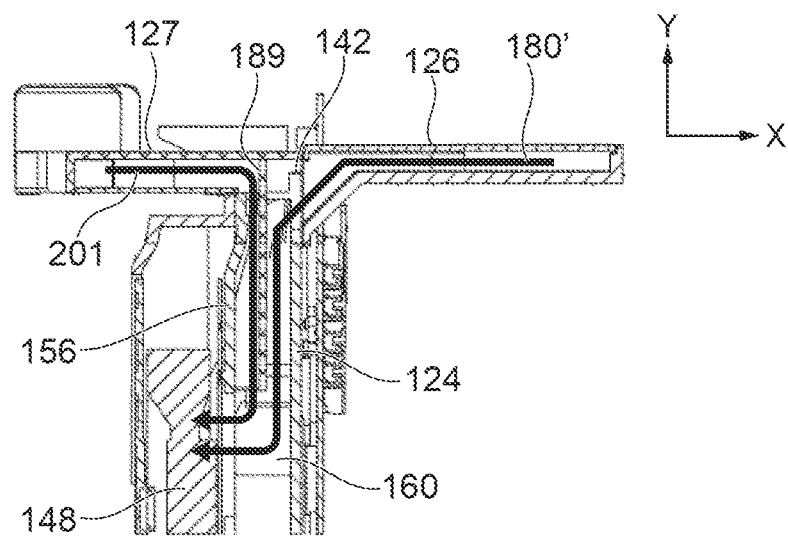

FIGS. 28A and 28B are cross-sectional views of the gripping portion intake duct 127 and the sensor duct 126, taken along an X-Z plane and an X-Y plane, respectively. Particularly, FIGS. 28A and 28B show where the third intake air flow 180 (air flow 180') and a fourth intake air flow 201 merge.

First, the fourth intake air flow 201 is a flow of intake air that is drawn in from the second air inlet port 116 and flows through the inside of the gripping portion intake duct 127, thereby flowing into the fan intake area 160 of the main duct 124 via the grip duct-extending portion 189. The grip duct-extending portion 189 is arranged such that a portion thereof meeting the main duct 124 is opposed to the first opening 142 of the sensor duct 126. The grip duct-forming portion 188 (see FIG. 24) is exposed to the outside of the main duct 124 and the grip duct-extending portion 189 is accommodated inside the main duct 124. The grip duct-extending portion 189 is combined with the front duct cover 156 (see also FIG. 14) to form a hollow space inside the main duct 124. With this, the fourth intake air flow 201 has its periphery along the whole circumference enclosed by a plastic member which is low in thermal conductivity, and reaches the fan intake area 160 (see also FIGS. 14 and 19) in a state in which almost no heat exchange with the surrounding has taken place.

An outlet of the duct-shaped portion formed by the grip duct-extending portion 189 and the front duct cover 156 is arranged at a location close to the +X side of the suction port 150 of the rotary fan 148. For this reason, air of the fourth intake air flow 201 drawn in from the second air inlet port 116 is not brought into contact with air in the main duct 124 or air of the third intake air flow 180, already subjected to heat exchange, until just before the air is drawn into the rotary fan 148. Therefore, the air of the fourth intake air flow 201 can be guided to the suction port 150 (see FIG. 15) of the rotary fan 148 without being subjected to heat exchange, in a state in which the temperature thereof is maintained at substantially the same temperature as that of the outside air.

The fourth intake air flow 201 is mixed with the first intake air flow 178, the second intake air flow 179, and the third intake air flow 180, in the fan intake area 160 located upstream of the suction port 150. Then, the resulting mixed air is drawn into the rotary fan 148 and then discharged to the exhaust duct 162 (FIGS. 19 and 20). As mentioned above, the air of the fourth intake air flow 201 reaches the rotary fan 148 in a state maintained at the outside air temperature. That is, by mixing the fourth intake air flow 201, which is relatively low in temperature compared with the other air flows, with the other air flows, it is possible to lower the temperature of exhaust wind air discharged from the rotary fan 148, and hence it is possible to increase the cooling efficiency in the exhaust duct 162.

Figure 29:
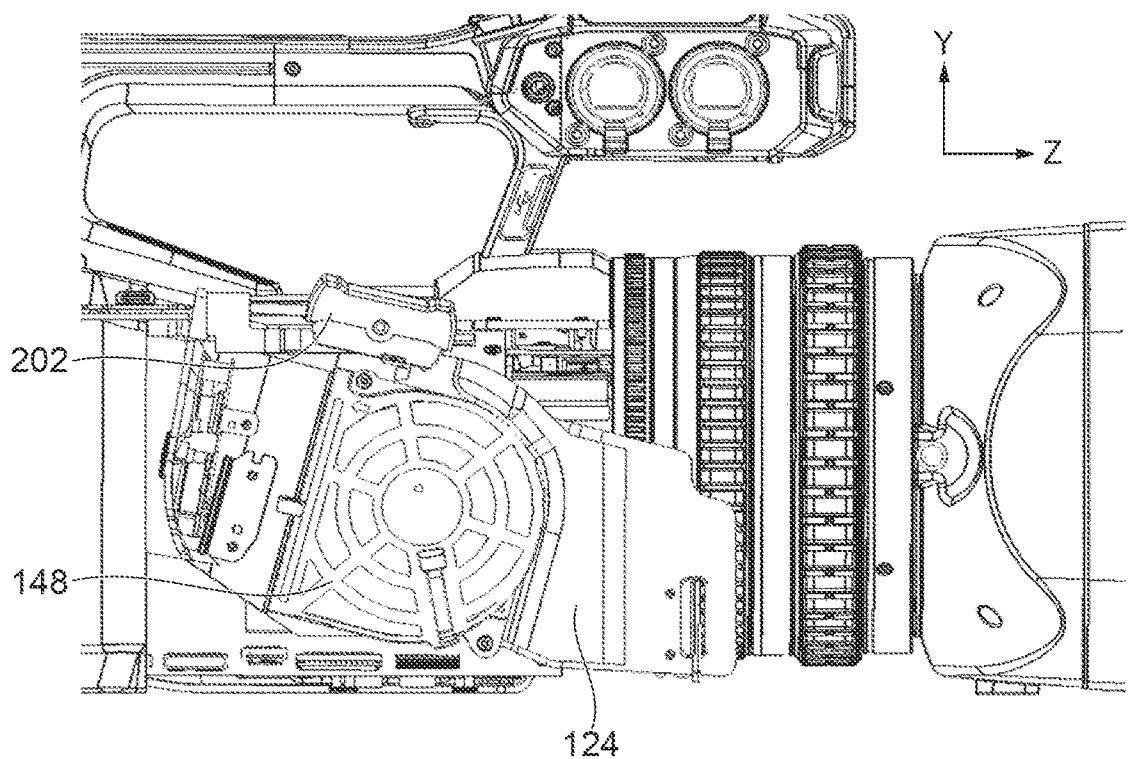
FIG. 29 is a side view of the image capturing apparatus in a state in which the gripping portion is removed.
Figure 30:
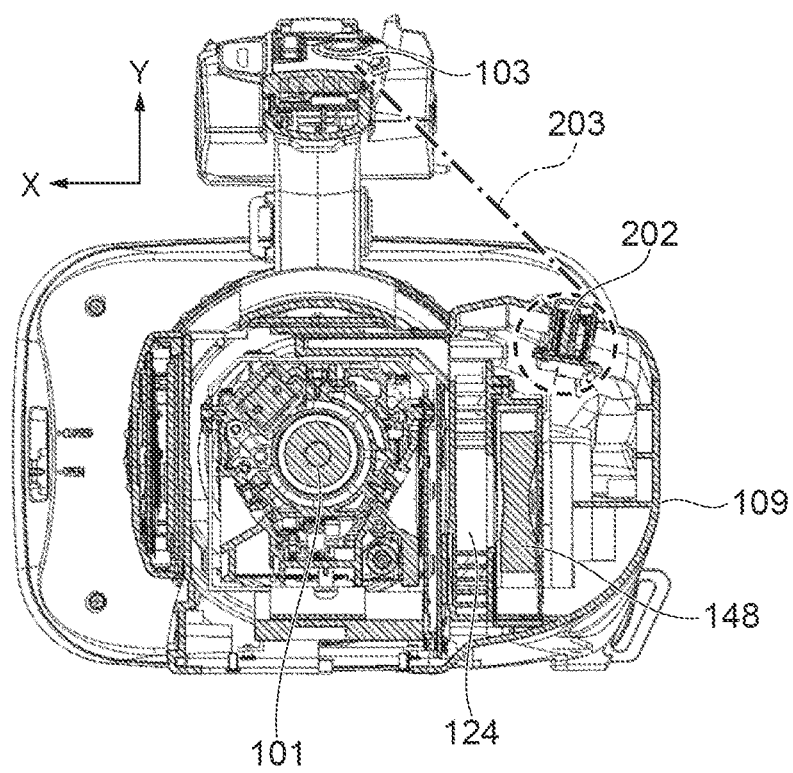
FIG. 30 is a cross-sectional view of a portion, where a zoom unit is arranged, of the image capturing apparatus, taken along an X-Y plane.

FIG. 29 is a side view of the image capturing apparatus 100 in a state in which the gripping portion 109 is removed. FIG. 30 is a cross-sectional view of a portion, where a zoom unit 202 is arranged, of the image capturing apparatus 100, taken along an X-Y plane. The zoom unit 202 is arranged at a location closer to the optical axis 184 than a line 203 connecting between vertexes of the outer shapes of the handle portion 103 and the gripping portion 109 is. Therefore, even when an external force is applied e.g. from a floor to the image capturing apparatus 100 e.g. due to an accident drop thereof, the impact is not directly applied to the zoom unit 202. Further, the zoom unit 202 is arranged at a location avoiding the main duct 124 and the rotary fan 148 (location where the zoom unit 202 does not overlap them, as viewed from the front). With this, heat dissipation from the body 100a is hardly obstructed.

Figure 31A:
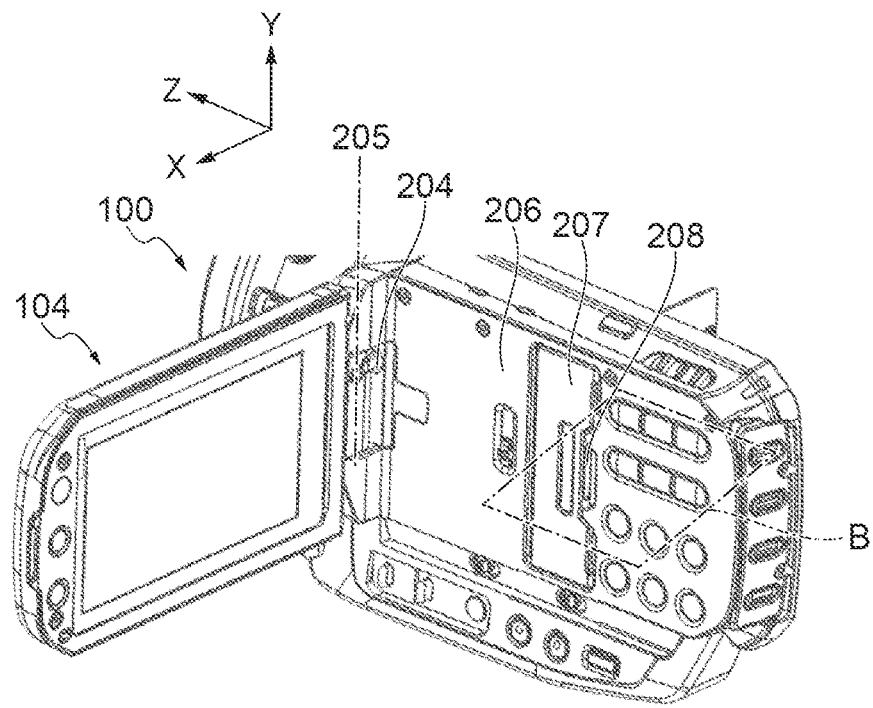
FIGS. 31A and 31B are perspective views of a right side of the image capturing apparatus in a state in which a display section is opened, as viewed from the rear right side.
Figure 31B:
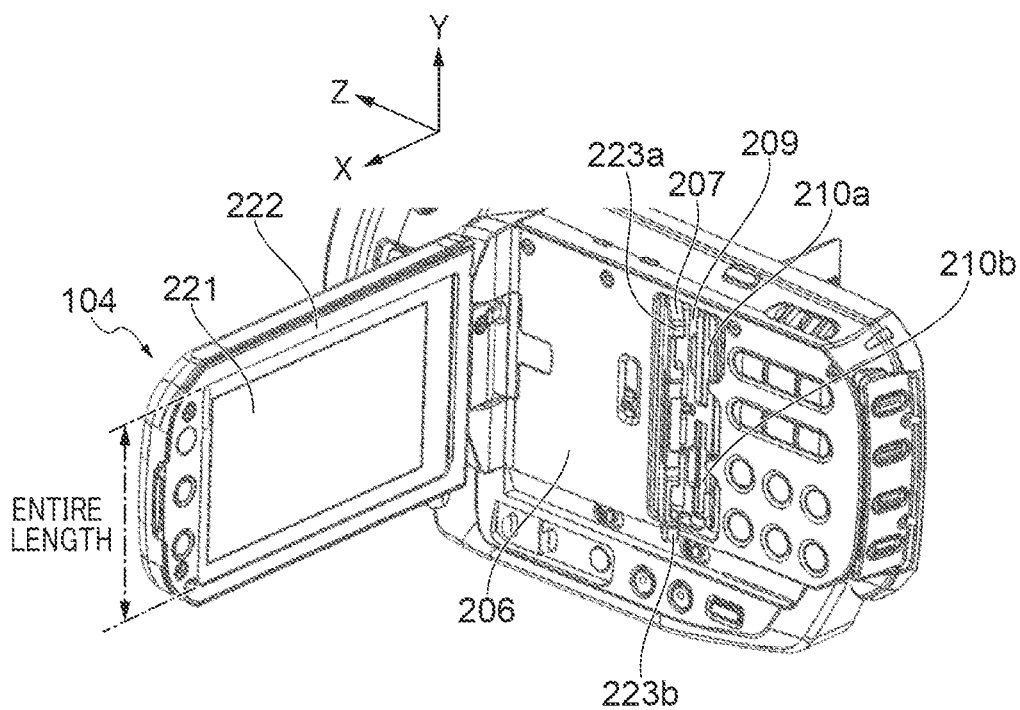

FIGS. 31A and 31B are perspective views of the right side of the image capturing apparatus 100 in a state in which the display section 104 is opened, as viewed from the rear right side. As shown in FIG. 31A, the display section 104 is disposed such that it can be opened and closed by rotation about a hinge rotational axis 205 of a hinge unit 204. An R cover 206 is attached to the right side of the body 100a, which is exposed to the outside when the display section 104 is opened. A card cover 207 which can be opened and closed is provided on the R cover 206. FIGS. 31A and 31B show a closed state and an open state of the card cover 207, respectively. A photographer can shift the card cover 207 from the closed state to the open state by performing an operation of hooking a finger on a finger hooking portion 208 of the card cover 207 and pulling out the card cover 207. By opening the card cover 207, the photographer can expose card openings 210a and 210b of a holder 209 and attach/remove the recording media 139 (see FIG. 12).

Figure 32:
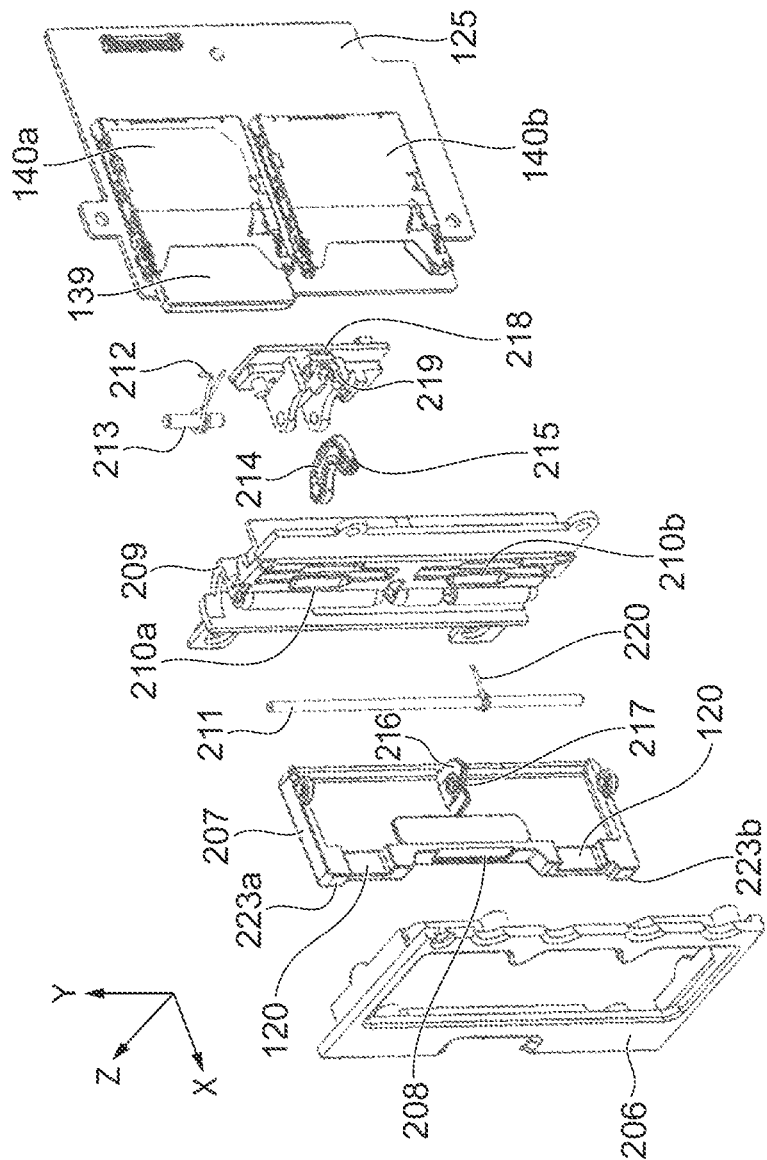
FIG. 32 is an exploded perspective view of a card cover and components therearound on the right side of the image capturing apparatus.

FIG. 32 is an exploded perspective view of the card cover 207 and component elements therearound on the right side of the image capturing apparatus 100. Inside the card openings 210a and 210b, the card holders 140a and 140b are mounted on the card circuit board 125, respectively. The card cover 207 is rotatable about a card cover rotational shaft 211 (arranged in substantially parallel to the hinge rotational axis 205) between a closed position for protecting the card openings 210a and 210b and an open position for exposing the card openings 210a and 210b. A locking member 214 that maintains the card cover 207 in the closed position is provided such that it is rotatable about a locking member rotational shaft 213.

Figure 33A:
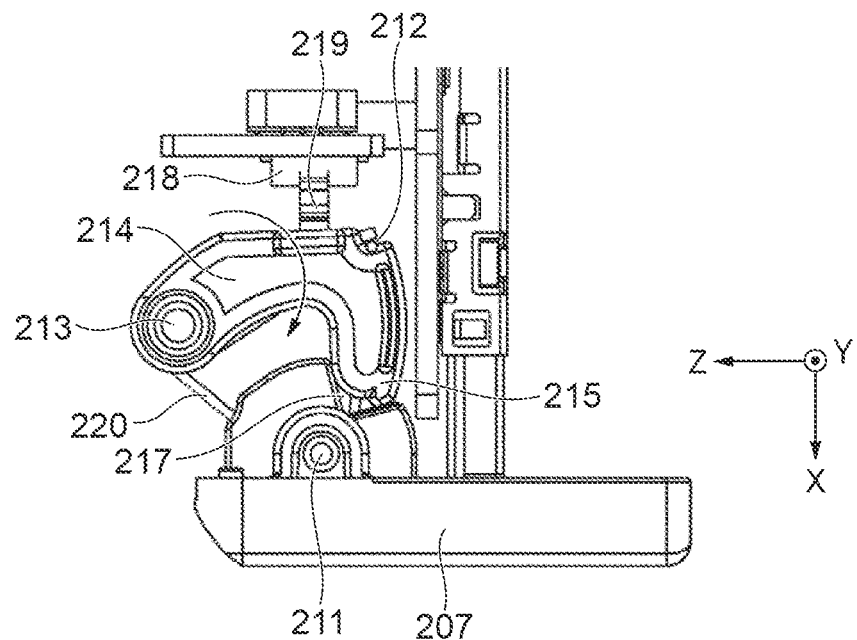
FIGS. 33A to 33C are views are views showing a structure of the card cover and members therearound.
Figure 33B:
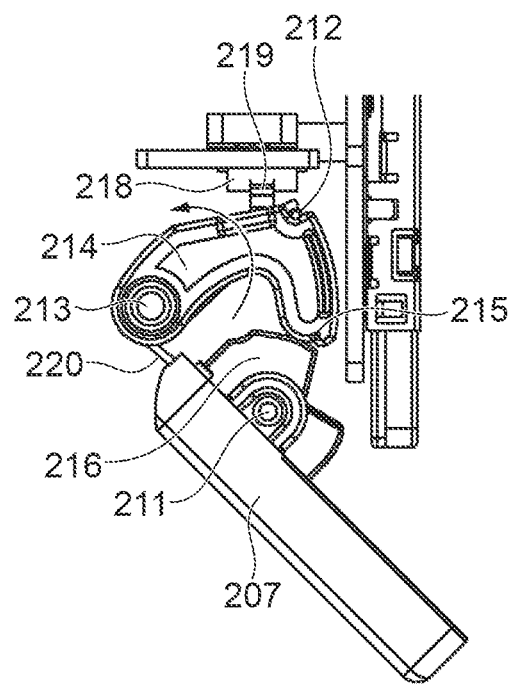
Figure 33C:
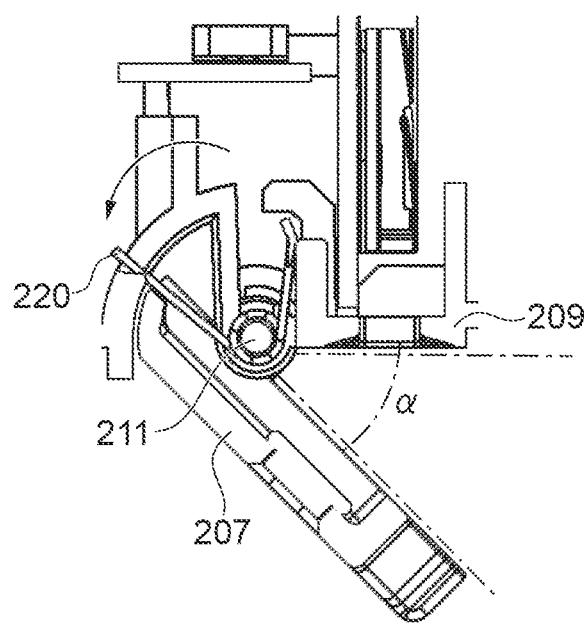

FIGS. 33A and 33B are views of essential parts of a card cover mechanism, as viewed from the +Y side. FIG. 33C is a cross-sectional view taken along a plane B in FIG. 31A. As shown in FIG. 33A, a torsion coil spring 212 urges the locking member 214 in a clockwise direction, as viewed from the +Y side. A card lock tip end 215 of the urged locking member 214 urges a cutout 217 of the card cover 207 to maintain the card cover 207 in the closed position.

When the card cover 207 is shifted from the closed state (see FIG. 33A) to the open state, a sector-shaped portion 216 of the card cover 207 urges the locking member 214 in an anticlockwise direction about the locking member rotational shaft 213, as viewed from the +Y side (see FIG. 33B). The urged locking member 214 pushes up a detection lever piece 219 of a detection switch 218 for detecting the open state of the card cover 207. With this, the image capturing apparatus 100 can detect that the card cover 207 is shifted to the open state. Further, the card lock tip end 215 of the urged locking member 214 pushes down the sector-shaped portion 216 with a reaction force to maintain the card cover 207 in the open position.

As shown in FIG. 33C, when an opening angle α of the card cover 207 becomes larger than a threshold value of 45 degrees, a torsion coil spring 220 urges the card cover 207 in the anticlockwise direction, as viewed from the +Y side. With this, even when the opening angle α of the card cover 207 becomes larger than 45 degrees, it is a temporal change and the opening angle is caused to be maintained at 45 degrees. Note that the opening angle of 45 degrees is set as the threshold value by way of example. Further, in a state in which the card cover 207 is closed, the detection lever piece 219 is not pushed up by the locking member 214, and hence the image capturing apparatus 100 can electrically determine the open/closed state of the card cover 207.

As shown in FIG. 31B, the display section 104 is provided with a display panel 221 on which an object image captured by the image capturing lens 101 is displayed and a panel cover 222 which covers the periphery of the display panel 221 and protrudes forward more than the panel surface of the display panel 221. An upper tip end and a lower tip end in the Y direction of the card cover 207 are provided with contact portions 223a and 223b each having a chamfered shape, respectively. The entire length of the card cover 207 in the Y direction is longer than the entire length of the display panel 221 in the Y direction. Assuming that the display section 104 is closed when the display section 104 is in the open state and when the card cover 207 is in the open state, the panel cover 222 is brought into contact with the contact portions 223a and 223b of the card cover 207, and then urges the card cover 207 in a closing direction. Thus, not only the display section 104 but also the urged card cover 207 is closed. When the display section 104 is closed, the card cover 207 is prevented from being brought into contact with the display panel 221 and damaging the display panel 221. Further, the card cover 207 is prevented from being sandwiched between the body 100a and the display section 104 and interfering with the closing operation of the display section 104.

Figure 34:
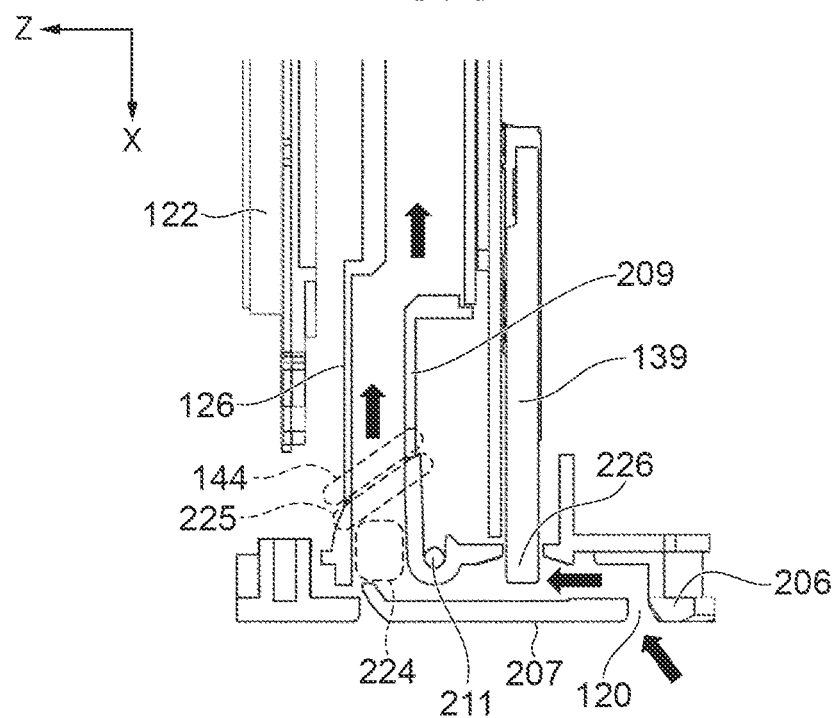
FIG. 34 is a cross-sectional view of essential parts of the card cover and components therearound.

FIG. 34 is a cross-sectional view of the card cover 207 and essential parts therearound. The heat dissipation structure around the recording media 139 will be described. Arrows appearing in FIG. 34 indicate air flows generated by the rotary fan 148. The fourth air inlet ports 120 are provided near the upper tip end and the lower tip end in the Y direction (the contact portions 223a and 223b) of the card cover 207. The fourth air inlet ports 120 are two gaps between two recessed portions (see FIG. 32) formed in a reverse side of the card cover 207 and the R cover 206.

As shown in FIG. 34, the holder 209 is provided with a cover retreating area 224, which is a space, so as not to interfere with the card cover 207 when the card cover 207 is in the open state. The cover retreating area 224 is provided with a card-side opening 225 so as to be connected to the third opening 144 of the sensor duct 126. The sensor duct 126, the holder 209, and the card cover 207 form a ventilation passage such that air does not leak therefrom. This ventilation passage is formed such that the sensor circuit board 122, the sensor duct 126, the card cover rotational shaft 211, the recording media 139, and the fourth air inlet ports 120 are positioned in the mentioned order in the Z direction, from the +Z side.

With this, air drawn in from the fourth air inlet ports 120 by the rotary fan 128 can efficiently dissipate heat from a pinching portion 226 of the recording medium 139, which is positioned in the ventilation passage formed between the holder 209 and the card cover 207. Further, by making effective use of the cover retreating area 224, which is a dead space, as the ventilation passage, it is possible to prevent increase in the size of the image capturing apparatus 100.

Figure 35:
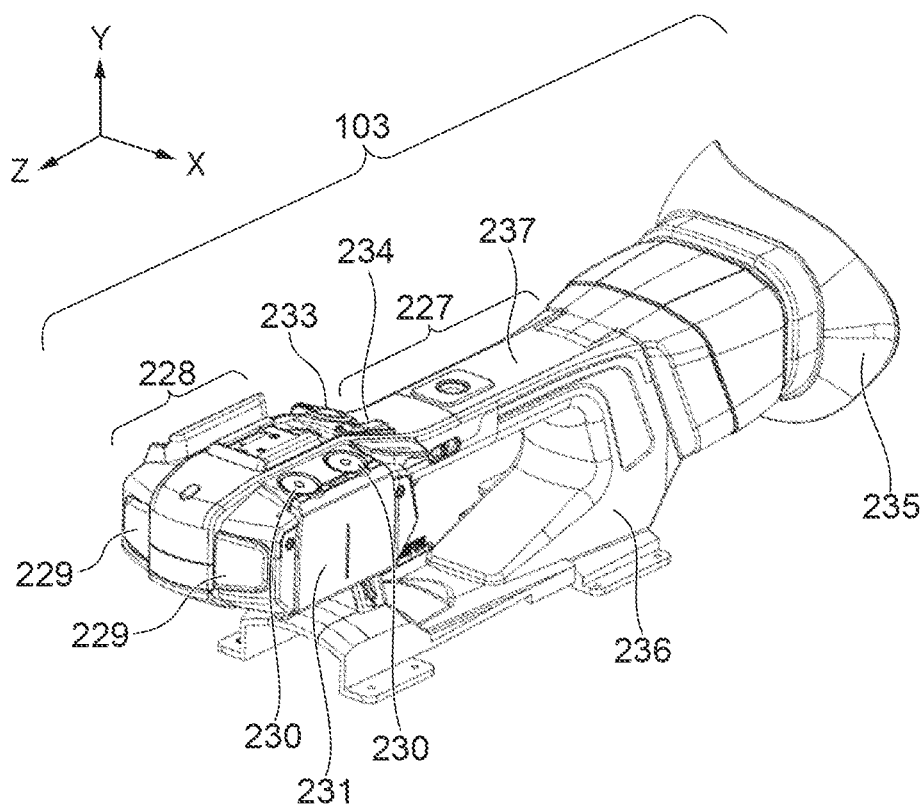
FIG. 35 is a perspective view of a handle portion.
Figure 36:
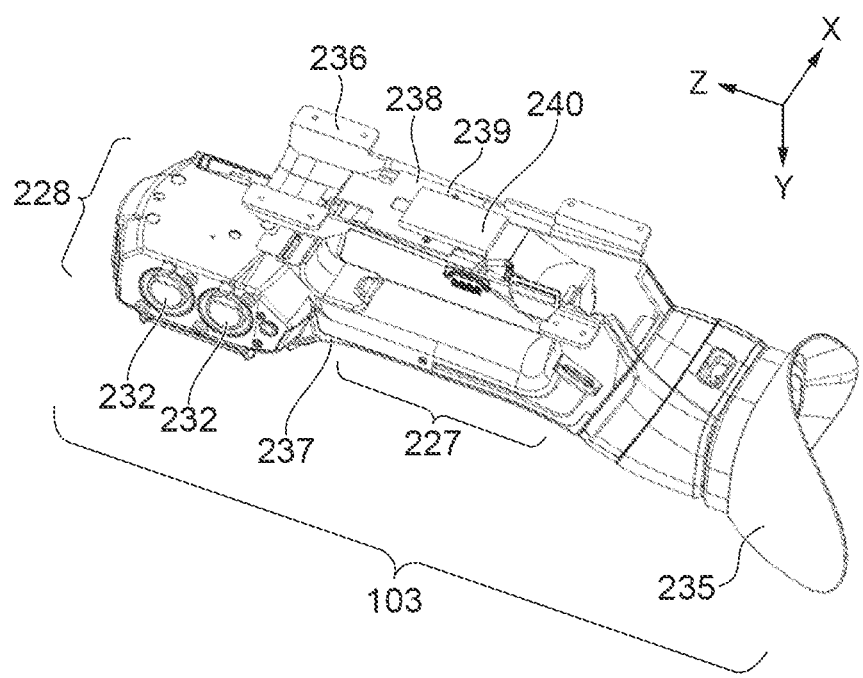
FIG. 36 is a perspective view of the handle portion.

FIGS. 35 and 36 are perspective views of the handle portion 103. An audio section 228 is provided on a front side (+Z side) of a handle gripping portion 227 of the handle portion 103. The audio section 228 includes built-in microphones 229 and adjustment knobs 230 for adjusting a recording level. Further, inside an audio cover 231, there are arranged various switches for switching external microphones connected to external microphone terminals 232 (see FIG. 36). In addition, the audio section 228 includes a start/stop button 233, a zoom switching lever 234, etc., related to shooting, and these are used when shooting is performed.

A finder section 235, which is pivotally rotatable, is arranged on a rear side (−Z side) of the handle gripping portion 227, and the photographer can check a shot image and various information using this finder section 235. The handle gripping portion 227 is formed by a handle lower cover 236 and a handle upper cover 237, and the handle lower cover 236 forms part of the exterior of the body 100a. As shown in FIG. 36, inside the handle lower cover 236, a handle plate 238 made of metal is fixed. The handle plate 238 has a handle flat portion 239 on a lower side (−Y side) toward the body 100a. A heat conduction sheet 240 made of a heat conductive material is arranged on the handle flat portion 239.

Figure 37:
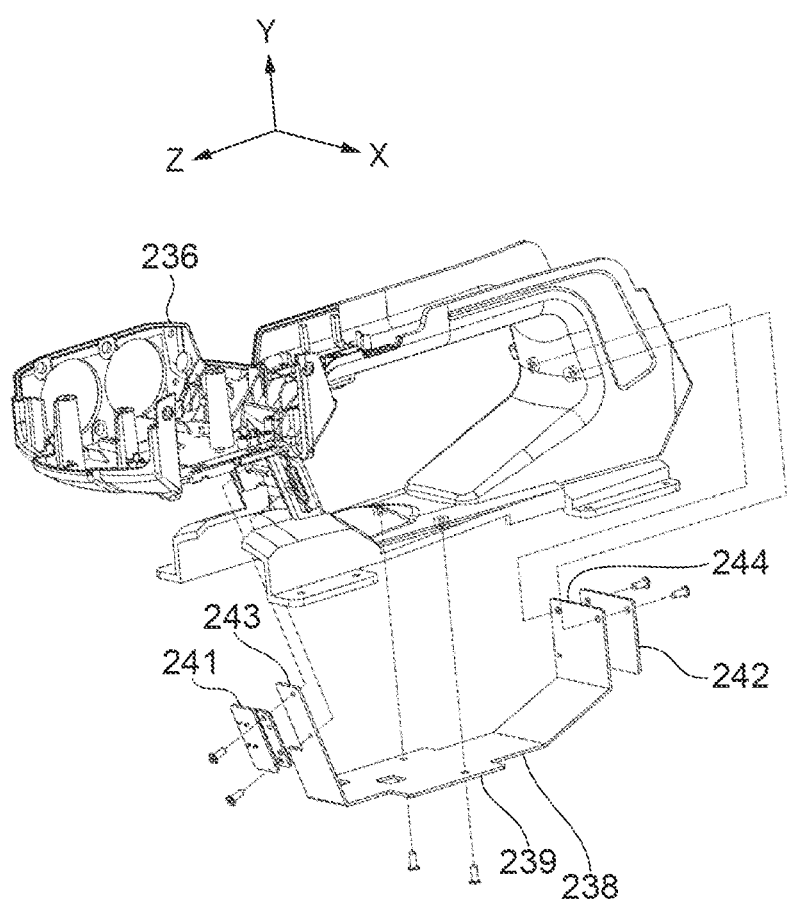
FIG. 37 is an exploded perspective view of a handle plate and components therearound.

FIG. 37 is an exploded perspective view of the handle plate 238 and components therearound. In FIG. 37, components of which omission of illustration does not hamper the description of how the handle plate 238 is attached are omitted from illustration. The handle plate 238 is shaped to extend upward from opposite ends of the handle flat portion 239 in the front-rear direction (Z direction) along the handle lower cover 236, while forming a plurality of bending portions. A front side (+Z side) and a rear side (−Z side) of the handle plate 238 are referred to as a front side end 243 and a rear side end 244, respectively. The handle plate 238 is fixed, together with a jack circuit board 241 and a handle circuit board 242, to the handle lower cover 236 with screws, whereby the handle plate 238 and the handle lower cover 236 are formed into an integral unit, thereby playing a role of maintaining the rigidity of the handle portion 103.

Figure 38:
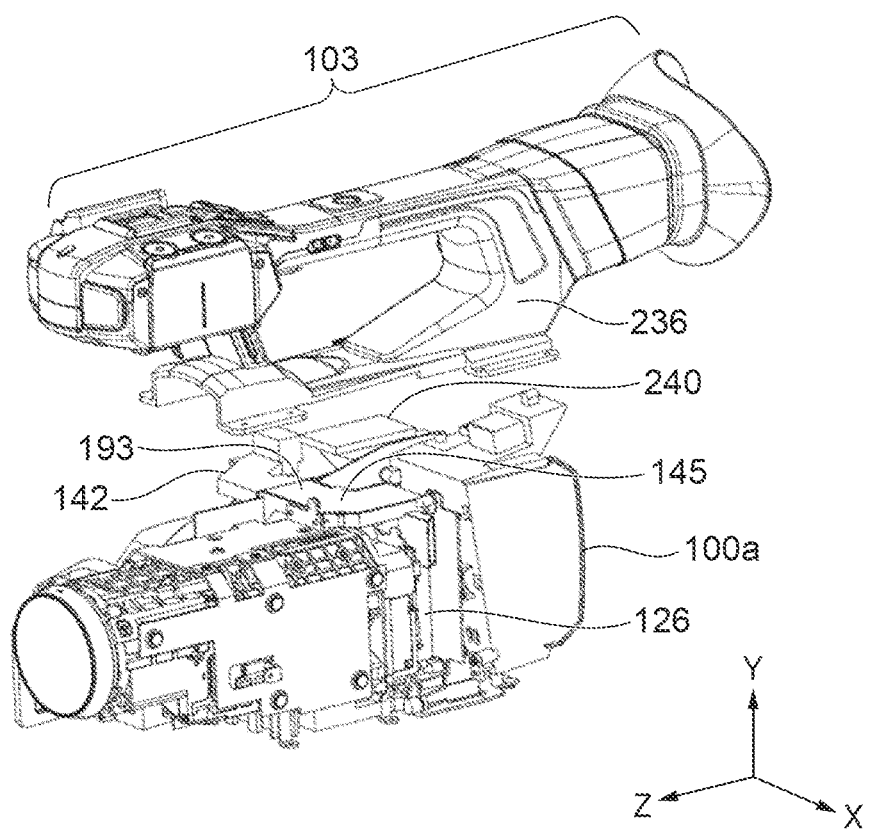
FIG. 38 is an exploded perspective view of an image capturing apparatus body and the handle portion.

FIG. 38 is an exploded perspective view of the body 100a and the handle portion 103. A coupling relationship between the handle portion 103 and the body 100a will be described. Note that components of which omission of illustration does not hamper the description are omitted from illustration. The handle portion 103 is fixed to the body 100a by the handle lower cover 236. At this time, the heat conduction sheet 240 is sandwiched and held between the sensor duct flat portion 145 (see also FIG. 26) of the card circuit board-fixing sheet metal 193 and the handle flat portion 239 (see FIG. 36) of the handle plate 238. Therefore, the sensor duct 126 is thermally engaged with the handle portion 103.

As described above, the image capturing apparatus 100 has a structure in which air flowing through the ducts receives heat from a plurality of heat sources to thereby dissipate the heat from the heat sources. In the sensor duct 126, air having received heat from the sensor circuit board 122 and the card circuit board 125 flows directly under the sensor duct flat portion 145 of the card circuit board-fixing sheet metal 193. Then, the air flows from the first opening 142 toward the main duct 124, to form the third intake air flow 180 (see FIG. 19). Then, the air of the third intake air flow 180 is mixed with the air of the first intake air flow 178 and the air of the second intake air flow 179, and the resulting air is discharged to the exhaust duct 162 by the rotary fan 148. At this time, the exhaust wind passes through the exhaust-side heat dissipation portion 166 (see FIG. 16) and receives heat from the rear heat generating element 138 (see FIG. 14).

Considering the heat dissipation efficiency of the main control circuit board 123, it is desirable to suppress increase in the temperature of air, caused by heat from the sensor circuit board 122 and the card circuit board 125, as much as possible. In the present embodiment, air having received heat from the sensor circuit board 122 and the card circuit board 125 transfers the heat from the sensor duct flat portion 145 of the card circuit board-fixing sheet metal 193 to the handle flat portion 239 of the handle plate 238 via the heat conduction sheet 240. Therefore, it is possible to reduce the temperature of air, once increased by the heat received from the sensor circuit board 122 and the card circuit board 125, before the air flows into the main duct 124.

Figure 39:
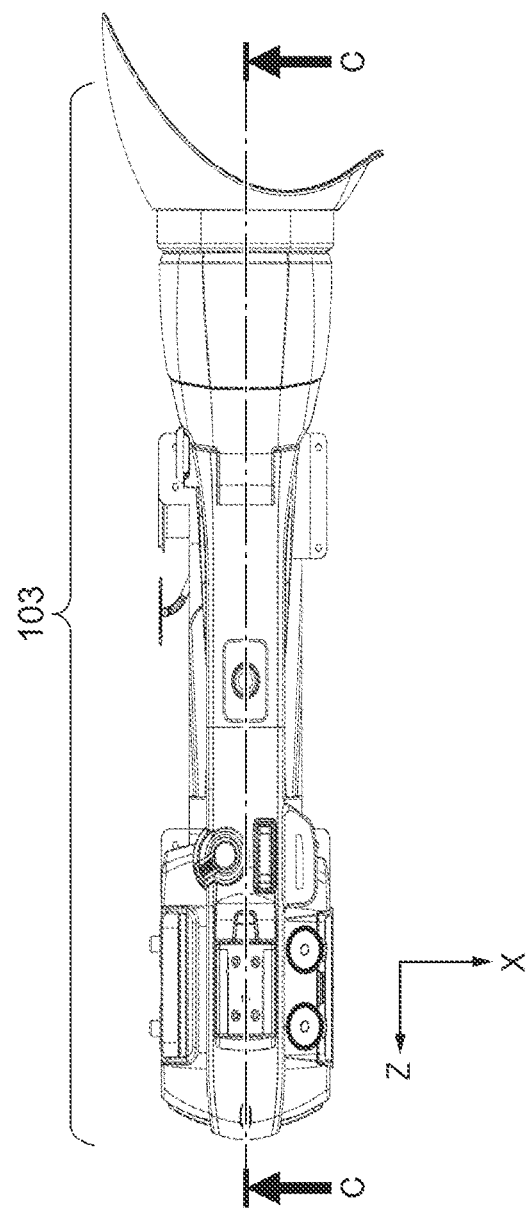
FIG. 39 is a top view of the handle portion.
Figure 40:
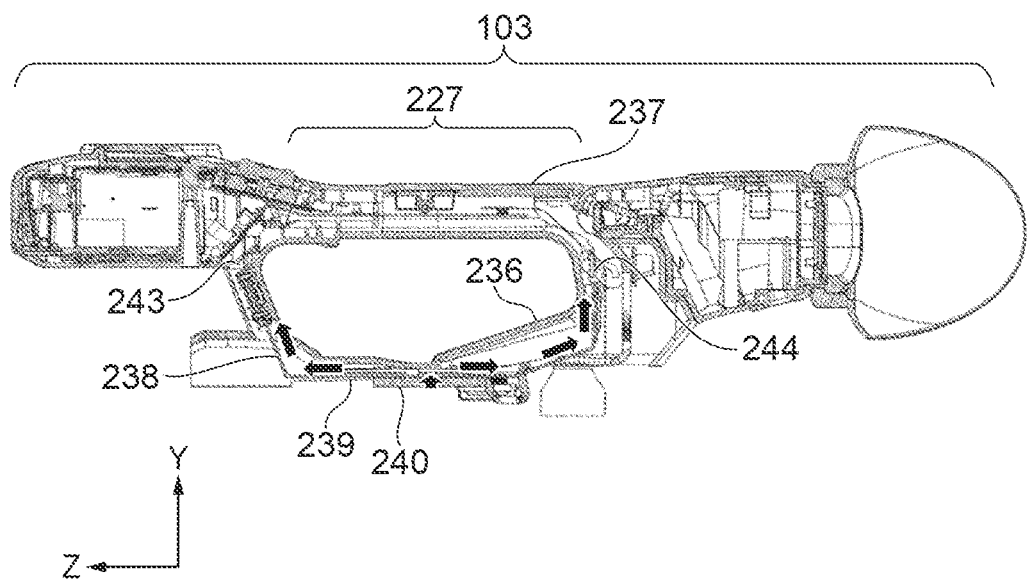
FIG. 40 is a cross-sectional view of the handle portion, taken along C-C in FIG. 39.

FIG. 39 is a top view of the handle portion 103. FIG. 40 is a cross-sectional view taken along C-C in FIG. 39. Heat transfer from the sensor duct flat portion 145 to the handle portion 103 will be described. Note that in FIG. 40, components of which omission of illustration does not hamper the description are omitted from illustration. Further, arrows appearing in FIG. 40 schematically represent how the heat is transferred.

As shown in FIG. 40, heat transferred from the body 100a is transferred to the handle flat portion 239 of the handle plate 238 via the heat conduction sheet 240, and this heat is transferred to the front side end 243 and the rear side end 244 of the handle plate 238. After that, the heat is transferred to the handle lower cover 236 and the handle upper cover 237 via screw fixing portions and air inside the handle portion 103, and is eventually diffused to the outside air. The heat is efficiently transferred to the inside of the handle portion 103 via the handle plate 238 made of metal and is then diffused. However, the handle plate 238 has the front side end 243 and the rear side end 244 arranged such that neither of them reach the handle gripping portion 227 of the handle portion 103. This makes it possible to suppress increase in the temperature of the handle gripping portion 227.

As described above, by the configuration of the duct for dissipating heat from the plurality of heat sources, heat received by air passing a heat source is transferred to the handle portion 103 before the air flows to the next heat source, thereby making it possible to increase the effect of cooling the next heat source. Further, while it is possible to efficiently diffuse heat transferred to the handle portion 103 to the inside of the handle portion 103, it is possible to suppress transfer of heat to the handle gripping portion 227. Note that in the present embodiment, the ends (243 and 244) of the handle plate 238 are not extended to the handle gripping portion 227 so as to suppress increase in the temperature of the handle gripping portion 227. However, the handle plate 238 may be extended to the handle gripping portion 227 depending on a manner of heat transfer and a situation of temperature increase.

According to the present embodiment, the lower heat dissipation fins 172 of the main duct 124 are arranged such that a projected shadow thereof overlaps the rotary fan 148, as viewed from the direction of the rotational axis 149, (see FIG. 18). Further, in a direction parallel to the center line 176, the first end position P1 of the lower heat dissipation fins 172 is at a location closer to the intake opening 163 than the end position Q1 of the rotary fan 148 is. Further, the second end position P2 of the lower heat dissipation fins 172 is at a location closer to the exhaust opening 167 than the end position Q2 of the rotary fan 148 is. Therefore, the lower heat dissipation fins 172 are formed in a range including the entire length of the rotary fan 148 (see FIG. 18). Further, in the intake duct 161, the intake opening 163 and the suction port 150 of the rotary fan 148 communicate with each other via the lower detour area 170 adjacent to the second end position P2. With these arrangements, it is possible to increase the heat dissipation efficiency while avoiding increase in the size of the image capturing apparatus 100.

Further, since the projected shadows of the intake duct 161 and the exhaust duct 162 overlap each other in a position on the downstream side of the discharge pot 151, as viewed from the axial direction of the rotational axis 149, this arrangement contributes to size reduction of the apparatus.

Further, the rotary fan 148 is arranged such that an flow rate of air discharged from the discharge port 151 becomes larger from the lower end 151a to the upper end 151b of the discharge port 151. Further, the cross-sectional area of the air flow passage in the detour area 164 becomes smaller from the lower end 151a to the upper end 151b of the discharge port 151, and the cross-sectional area of the air flow passage in the slope portion 165 becomes larger from the lower end 151a to the upper end 151b. This makes it possible to efficiently drawn in and discharge air by taking a difference in the flow rate of air into account.

Further, since the detour area 164 is partitioned by the first shield wall 169 into the upper detour area 171 and the lower detour area 170 (predetermined space), it is possible to prevent drawing of air of the third intake air flow 180 into the suction port 150 of the rotary fan 148 from being obstructed due to the influence of the first intake air flow 178.

Further, since the sensor duct 126 is thermally engaged with the handle portion 103 via the heat conduction sheet 240, before air which has been increased in temperature in the sensor duct 126 flows to the main duct 124, the temperature of the air is reduced, which contributes to improvement of the heat dissipation efficiency.

Further, since the grip duct base 187 is formed of a material which is low in thermal conductivity, air reaches the fan intake area 160 in a low-temperature state, which contributes to improvement of the heat dissipation efficiency.

Next a handle portion 103A which is a variation of the handle portion 103 will be described. The description is mainly given of shapes, components, and a function of the handle portion 103A different from those of the handle portion 103, and the same components are denoted by the same reference numerals, while omitting redundant description thereof.

Figure 41:
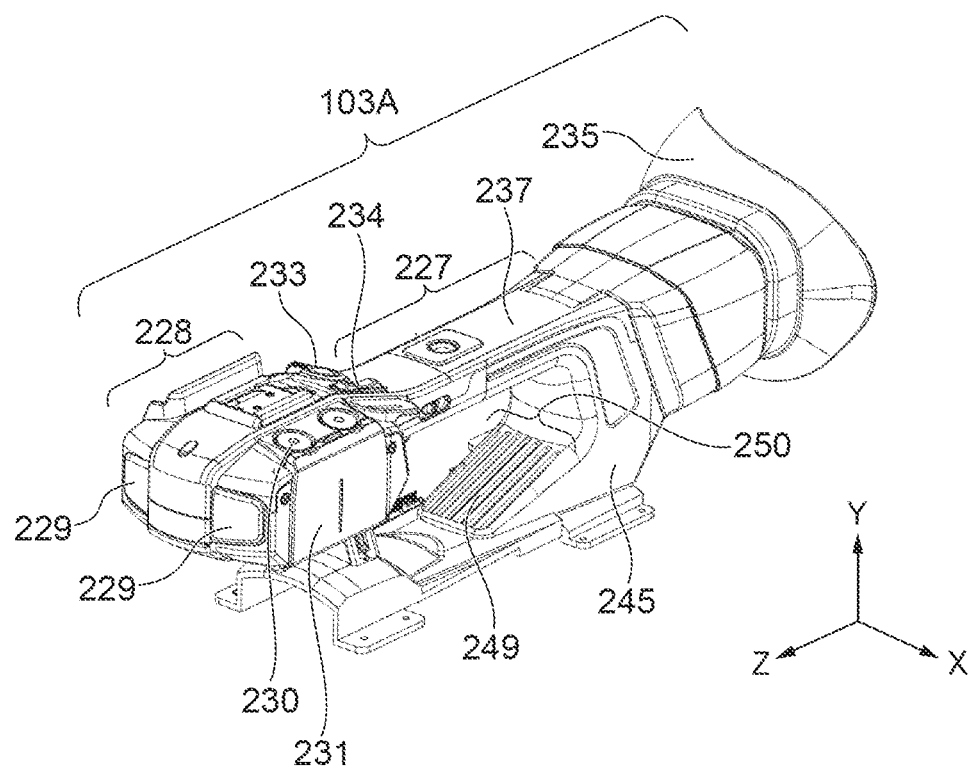
FIG. 41 is an appearance perspective view of a variation of the handle portion, as viewed obliquely from above.
Figure 42:
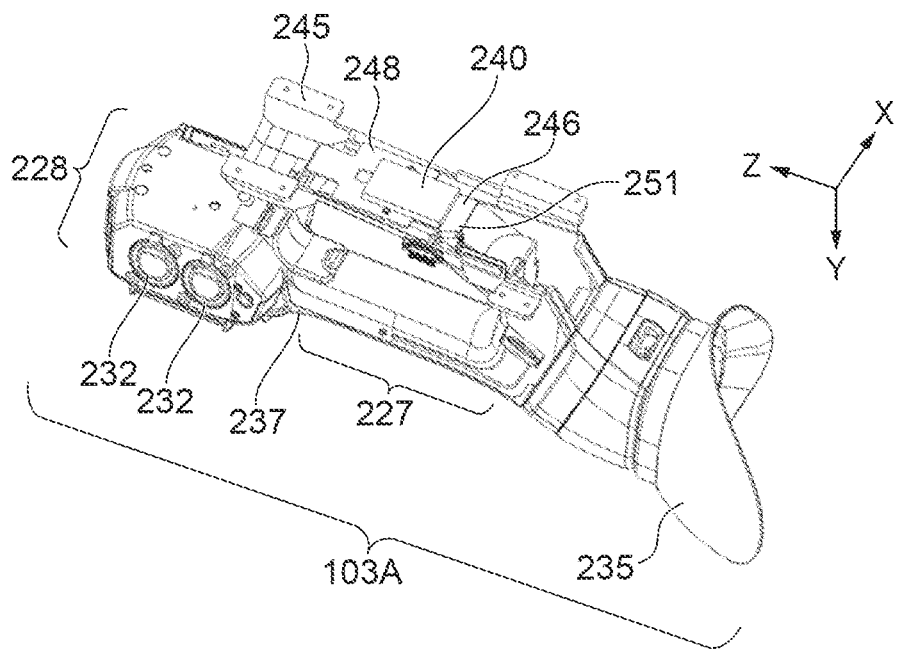
FIG. 42 is an appearance perspective view of the handle portion, as viewed obliquely from below.

FIGS. 41 and 42 are appearance perspective views of the handle portion 103A, as viewed obliquely from above and obliquely from below, respectively. A handle lower cover 245 is provided with a heat dissipation port 250 formed by a plurality of slit-shaped portions 249 which are through holes each having a long narrow shape, at a location below (−Y side of) the handle gripping portion 227. Further, as shown in FIG. 42, inside the handle lower cover 245, a handle plate 248 made of metal and a heat sink portion 246 made of metal are fixed. Further, a handle lower flat portion 251 is provided under (−Y side of) the heat sink portion 246, and the heat conduction sheet 240 is disposed on the handle lower flat portion 251.

Figure 43:
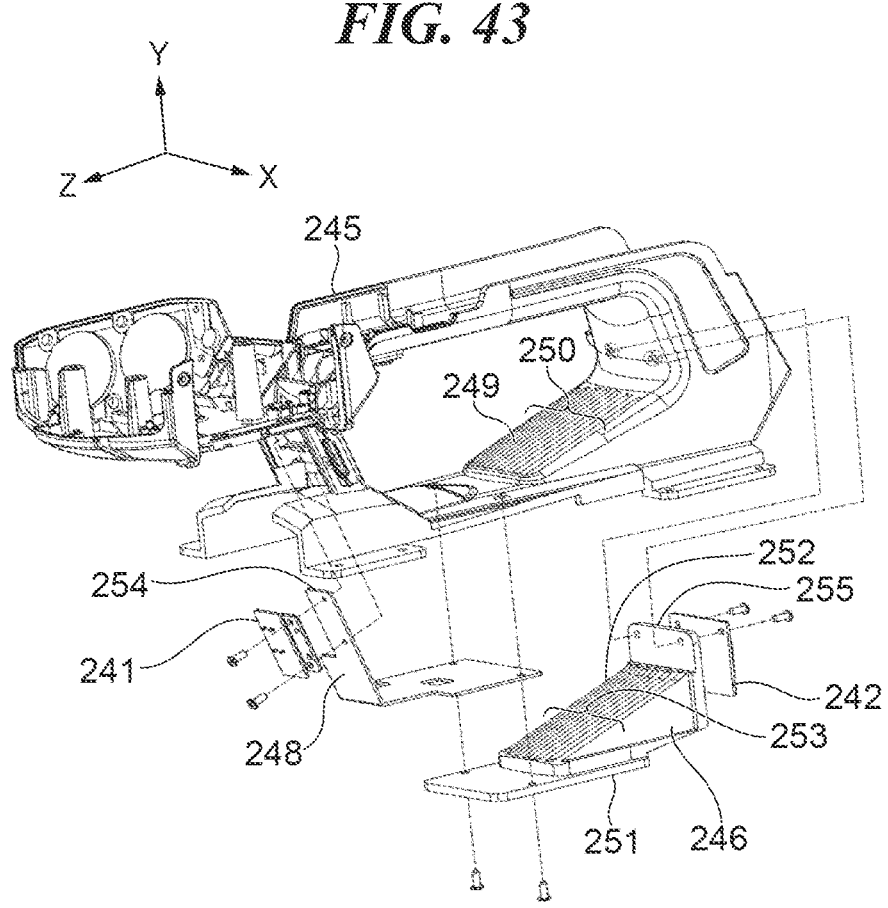
FIG. 43 is an exploded perspective view of the handle plate and components therearound.

FIG. 43 is an exploded perspective view of the handle plate 248 and components therearound. In FIG. 43, components of which omission of illustration does not hamper description of how the handle plate 248 is attached to the handle lower cover 245 are omitted from illustration. The heat sink portion 246 is provided with a handle heat dissipation portion 253 formed by a plurality of fin-shaped portions 252 so as to increase the surface area. The handle heat dissipation portion 253 is opposed to the heat dissipation port 250 of the handle lower cover 245. The handle plate 248 and the heat sink portion 246 are both fixed, together with the jack circuit board 241 and the handle circuit board 242, to the handle lower cover 245 with screws, whereby the handle plate 248, the heat sink portion 246, and the handle lower cover 245 are formed into an integral unit, thereby maintaining the rigidity of the handle portion 103A. The heat sink portion 246 and the handle plate 248 are also thermally connected to each other.

Figure 44:
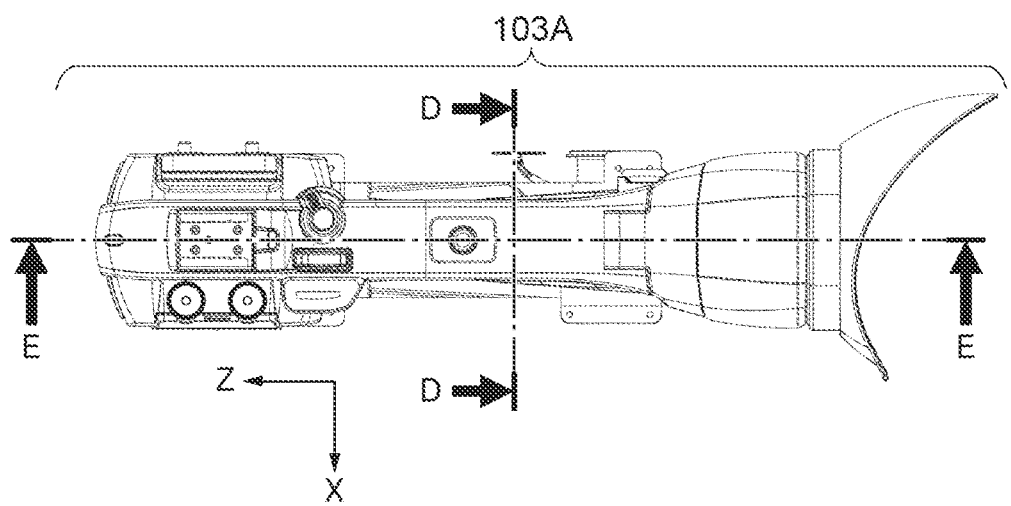
FIG. 44 is a top view of the handle portion.
Figure 45:
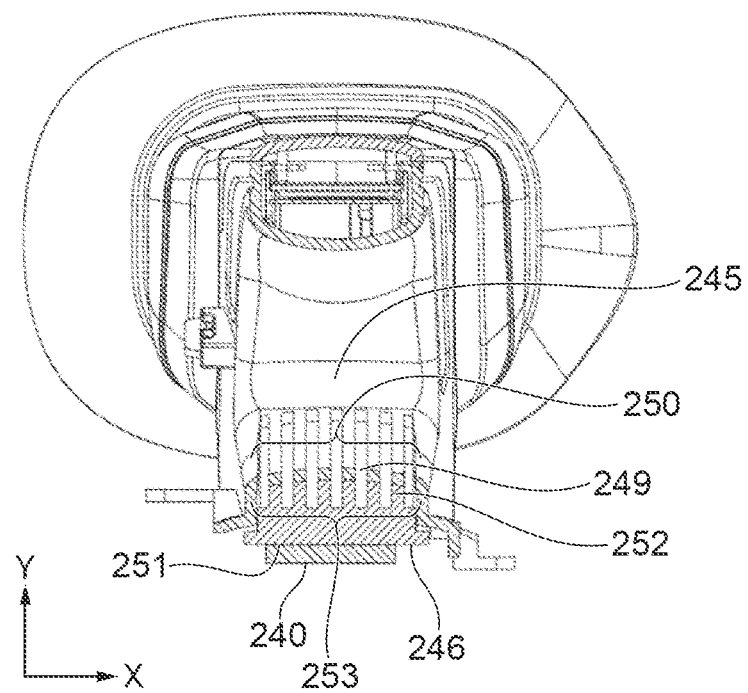
FIG. 45 is a cross-sectional view of the handle portion, taken along D-D in FIG. 44.
Figure 46:
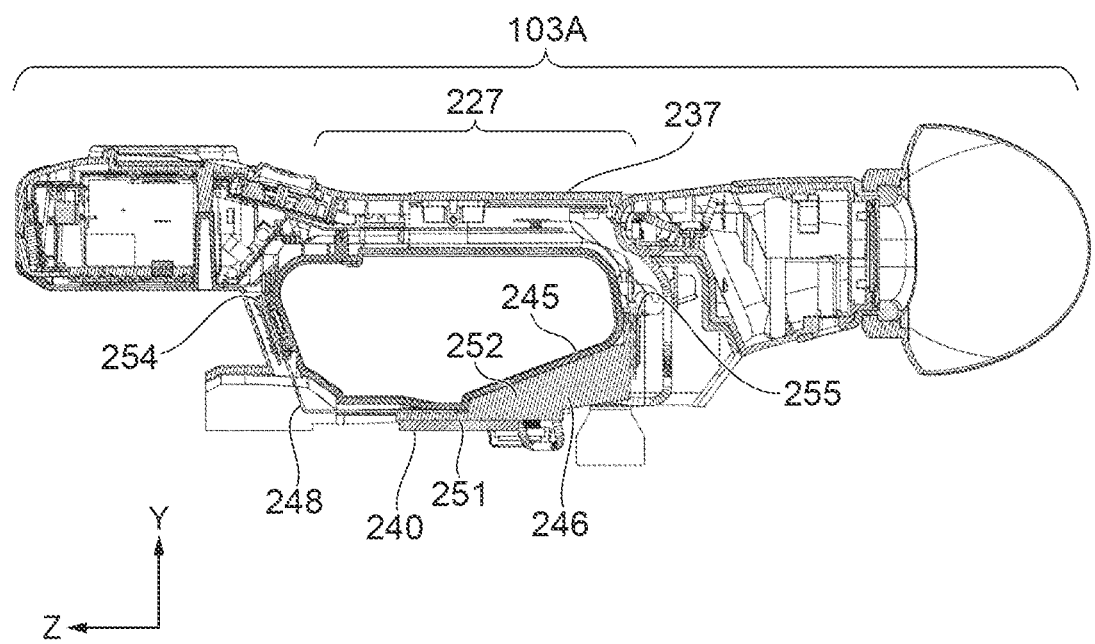
FIG. 46 is a cross-sectional view of the handle portion, taken along E-E in FIG. 44.

FIG. 44 is a top view of the handle portion 103A. FIG. 45 is a cross-sectional view taken along D-D in FIG. 44. FIG. 46 is a cross-sectional view taken along E-E in FIG. 44. Note that in FIGS. 45 and 46, components of which omission of illustration does not hamper the description are omitted from illustration.

As shown in FIG. 45, heat generated in the body 100a is mainly transferred to the handle lower flat portion 251 of the heat sink portion 246 via the heat conduction sheet 240, and is then transferred to the plurality of fin-shaped portions 252. The handle lower cover 245 is provided with the slit-shaped portions 249 formed in association with recess portions between the fin-shaped portions 252. The fin-shaped portions 252 can be brought into direct contact with the outside air, which makes it possible to efficiently dissipate heat to the outside through the heat dissipation port 250 formed by the plurality of slit-shaped portions 249. That is, heat is dissipated from the fin-shaped portions 252 included in the heat sink portion 246 thermally connected to the body 100a, through the heat dissipation port 250.

Note that it is desirable that the heat dissipation port 250 is disposed at a location where it is difficult for a photographer to touch the same. As shown in FIG. 41, the heat dissipation port 250 is disposed below (−Y side of) the handle gripping portion 227 and overlaps a shadow of the handle gripping portion 227 projected in the Y direction, and hence the photographer is prevented from touching the heat dissipation port 250. As shown in FIG. 41, the heat dissipation port 250 of the handle lower cover 245 is disposed above the fin-shaped portions 252 of the heat sink portion 246, as the appearance surface. This prevents a photographer from directly touching the handle heat dissipation portion 253 while bringing the handle heat dissipation portion 253 into direct contact with the outside air. However, depending on a temperature situation, the handle portion 103A may be configured such that the slit-shaped portions 249 of the handle lower cover 245 are formed as an opening to cause the heat sink portion 246 to directly appear in the appearance.

Note that to suppress increase in the temperature of the handle gripping portion 227, a handle front-side end 254 of the handle plate 248 and a handle rear-side end 255 of the heat sink portion 246 (see FIG. 43) are not extended to the handle gripping portion 227. However, the handle plate 248 and the heat sink portion 246 may be extended to the handle gripping portion 227 depending on a manner of heat transfer or a situation of temperature increase.

Figure 47:
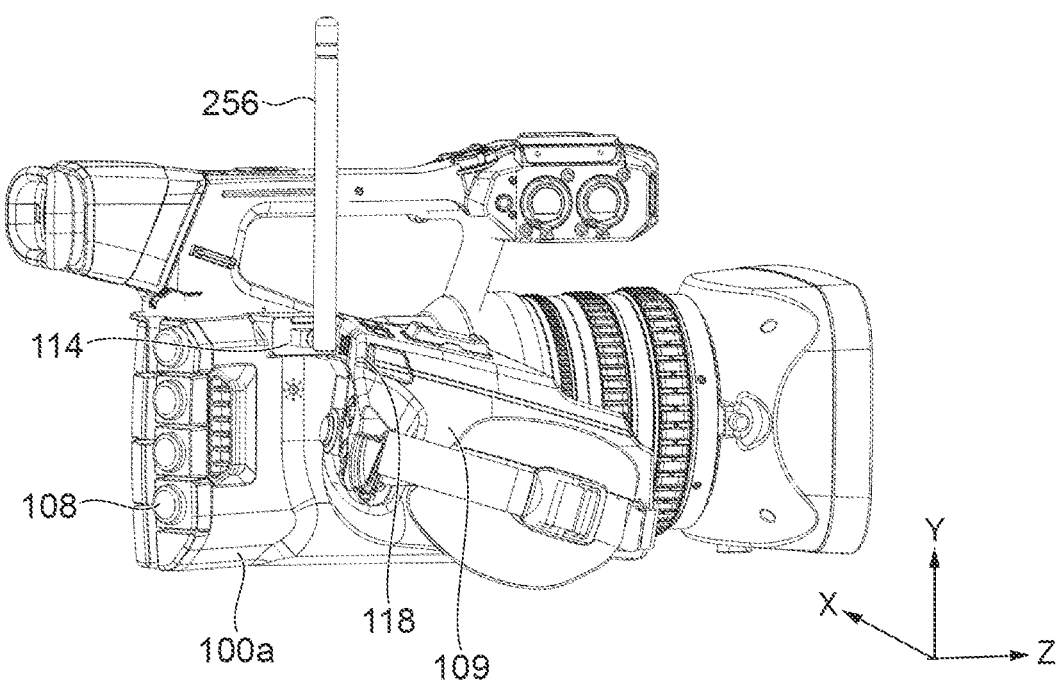
FIG. 47 is a perspective view of the image capturing apparatus in a state in which a mobile communication device is connected to a USB connector.
Figure 48:
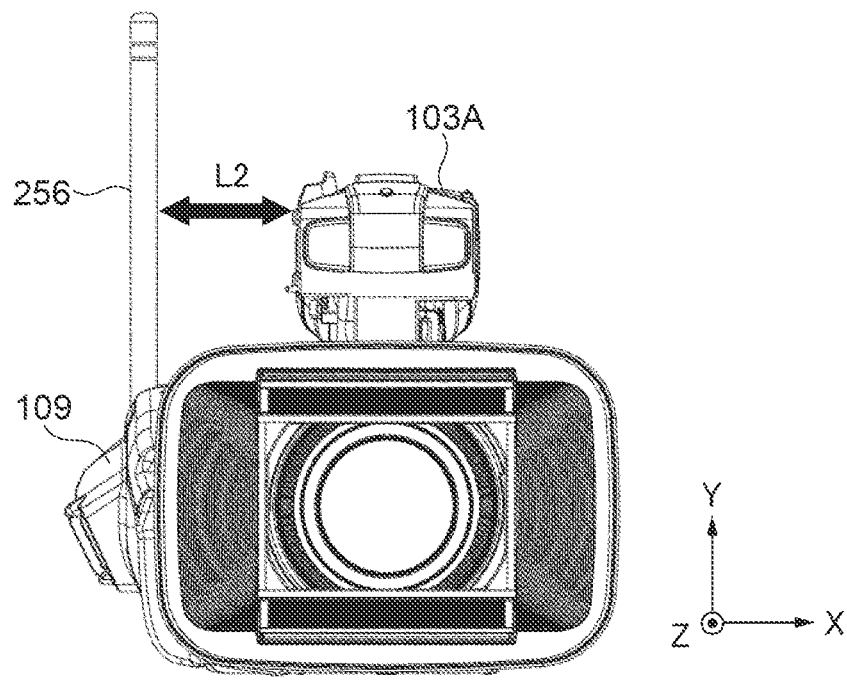
FIG. 48 is a front view of the image capturing apparatus in the state in which the mobile communication device is connected to the USB connector.

FIGS. 47 and 48 are a perspective view and a front view of the image capturing apparatus 100 in a state in which a mobile communication device 256 is connected. The construction of the USB connector 114 will be described with reference to FIGS. 47 and 48. The mobile communication device 256 can be connected to the USB connector 114 of the image capturing apparatus 100.

The mobile communication device 256 is e.g. a dongle capable of performing 5G standard high-speed data communication. When the mobile communication device 256 is connected to the image capturing apparatus 100, the image capturing apparatus 100 is capable of transferring a video recorded in the recording medium 139 or a video being shot to an external apparatus, such as a PC, via a public communication network. Note that although in FIGS. 47 and 48, the mobile communication device 256 is illustrated in a state in which an angle of an antenna of the mobile communication device 256 has been adjusted such that it extends upward so as to increase receiving sensitivity, the antenna may be set to extend straight to the left side of the image capturing apparatus 100 without adjusting the angle thereof.

As shown in FIG. 47, the USB connector 114 is arranged in a recessed area between the gripping portion 109 and the external connection terminal section 108, at a location adjacent to the rear side of the air inlet port arrangement surface 118, in a state in which its opening faces toward the left side. Further, as described above, the right-hand thumb is prevented from reaching the air inlet port arrangement surface 118 when operating the image capturing apparatus 100. That is, similar to the air inlet port arrangement surface 118, the right-hand thumb is also prevented from reaching the mobile communication device 256 when operating the image capturing apparatus 100, which provides excellent usability.

Further, as described above, the USB connector 114 is arranged in the recessed area between the gripping portion 109 and the external connection terminal section 108. That is, the USB connector 114 is arranged at a location close to the optical axis 184 in a direction orthogonal to the optical axis 184. On the other hand, the USB connector 114 is arranged at a location away from the handle portion 103 in a leftward direction, and hence the mobile communication device 256 connected to the USB connector 114 extends at a location away from the handle portion 103 by a distance L2. As a result, when the photographer grips the handle portion 103, a space is formed between the hand gripping the handle portions 103 and the mobile communication device 256. Therefore, even when the photographer grips the handle portion 103 while using the mobile communication device 256, the hand does not bump against the mobile communication device 256, providing excellent usability.

Figure 49A:
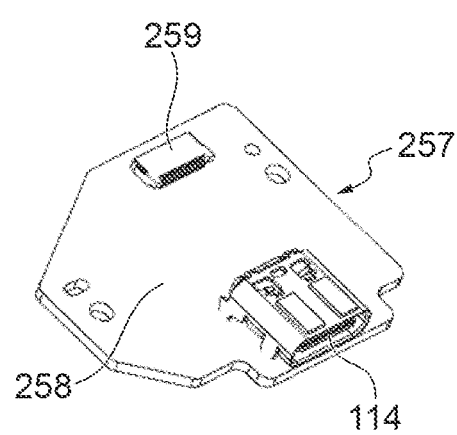
FIGS. 49A and 49B are respective perspective views of a front side and a revere side of a USB circuit board.
Figure 49B:
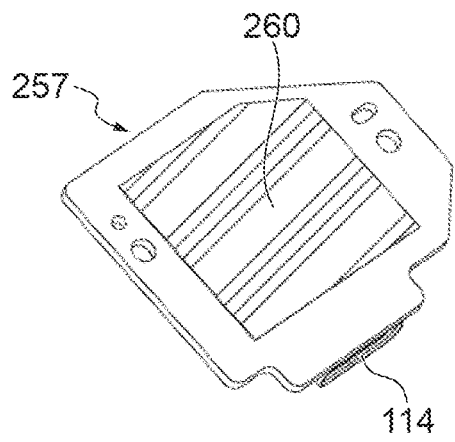

FIGS. 49A and 49B are perspective views of a front side and a reverse side of the USB circuit board 257, respectively. The USB connector 114 and a connection connector 259 are mounted on the front side of a base 258 of the USB circuit board 257. Wires, not shown, are connected to the connection connector 259, for enabling transmission and reception of electrical signals to and from the main control circuit board 123. The reverse side of the USB circuit board 257 has no electrical components mounted thereon, but is provided with a conductor exposed portion 260 from which internal conductors are exposed by removing an insulating protective film, not shown, from the USB circuit board 257.

Figure 50:
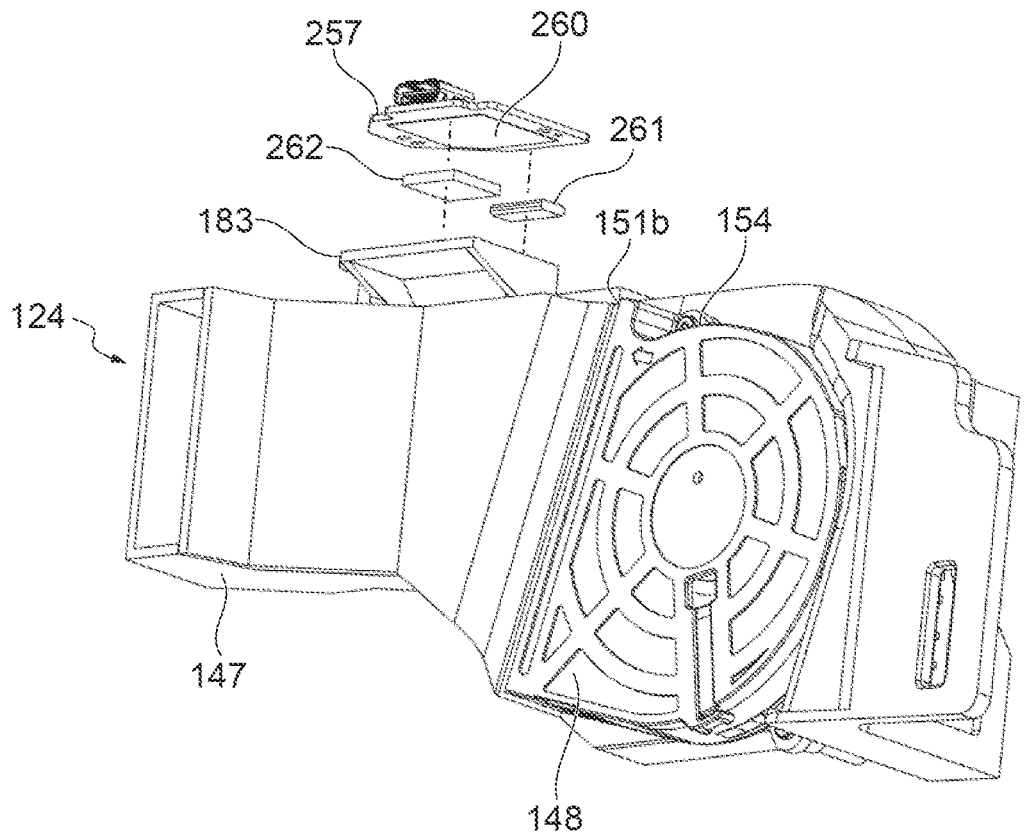
FIG. 50 is a perspective view of the USB circuit board and the main duct.

FIG. 50 is a perspective view of the USB circuit board 257 and the main duct 124. Electrical and thermal connection between the USB circuit board 257 and the main duct 124 will be described. Inside the image capturing apparatus 100, the USB circuit board 257 is arranged such that it is opposed to the USB connection wall portion 183 which is part of the main duct 124. An electrically conductive elastic member 261 and a thermally conductive elastic member 262 are sandwiched and held in a compressed state between the USB circuit board 257 and the USB connection wall portion 183.

The electrically conductive elastic member 261 is configured such that a core is made of a material which is very soft and highly elastic, such as an expanded EPDM (ethylene propylene diene) rubber, and conductive fibers enclose the periphery of the core. Therefore, it is possible to electrically connect between components without generating a large reaction force. The thermally conductive elastic member 262 is a member having elasticity, which is formed of substantially the same material as the above-mentioned heat dissipation rubbers and is capable of efficiently transferring heat. The electrically conductive elastic member 261 and the thermally conductive elastic member 262 are in close contact with the conductor exposed portion 260 provided on the reverse surface of the USB circuit board 257, and electrically and thermally connect the USB circuit board 257 to the main duct 124.

In general, a circuit board which transmits and receives signals at high speed is liable to output strong undesired radiation to the outside of the image capturing apparatus 100. In a case where a path from a circuit board as an undesired radiation-generating source to a main electric ground is longer and a looped route is formed, more undesired radiation is generated according to the theoretical characteristics of a dipole antenna. To cope with this problem, in the image capturing apparatus 100, undesired radiation is reduced by connecting the USB circuit board 257 to the main duct 124 which is the main electric ground by a shortest distance.

Further, the USB connection wall portion 183 is arranged at a location in the vicinity of an upper portion of the exhaust-side heat dissipation portion 166 (see FIG. 16) (in the vicinity of the upper end 151b of the discharge port 151). This location is on a side toward to the second outer wall 154 of the rotary fan 148, i.e. on a side where the flow rate of exhaust wind air is larger. Therefore, the USB connection wall portion 183 is arranged in an area where the heat dissipation efficiency is highest in the exhaust-side heat dissipation portion 166, and hence a high cooling effect can be obtained.

Figure 51:
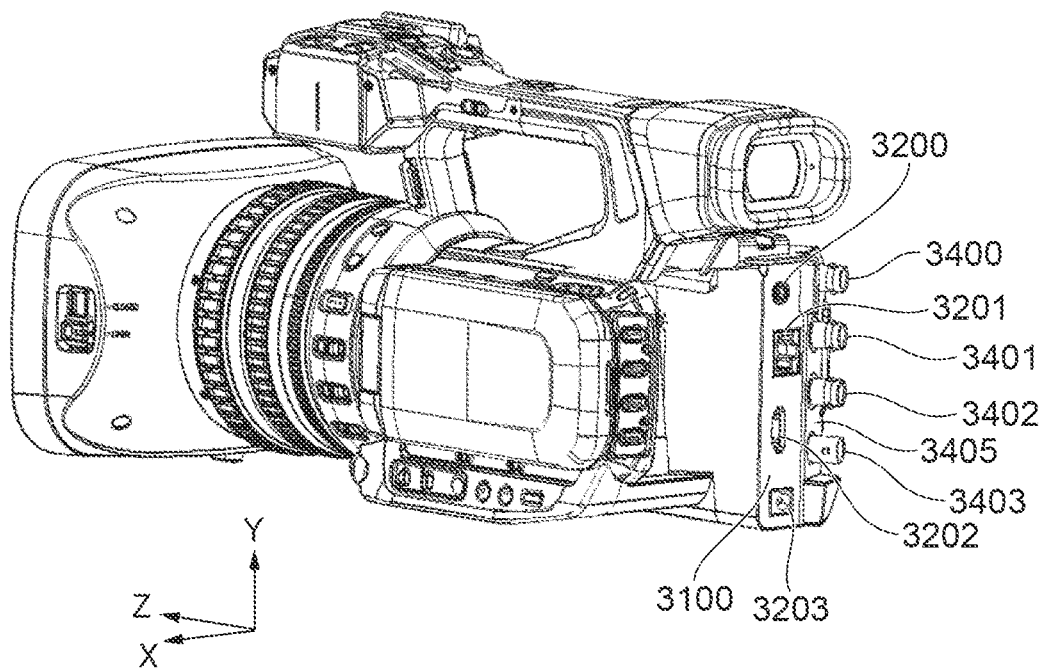
FIG. 51 is a perspective view of a conventional image capturing apparatus.
Figure 52A:
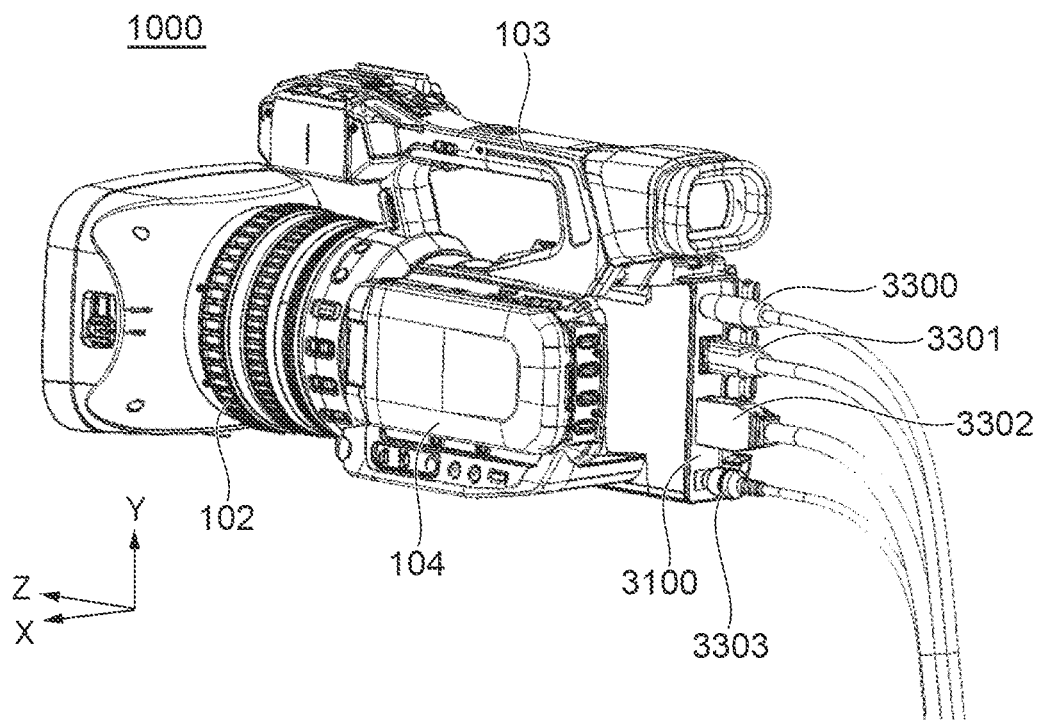
FIGS. 52A and 52B are views showing a right side of the conventional image capturing apparatus.
Figure 52B:
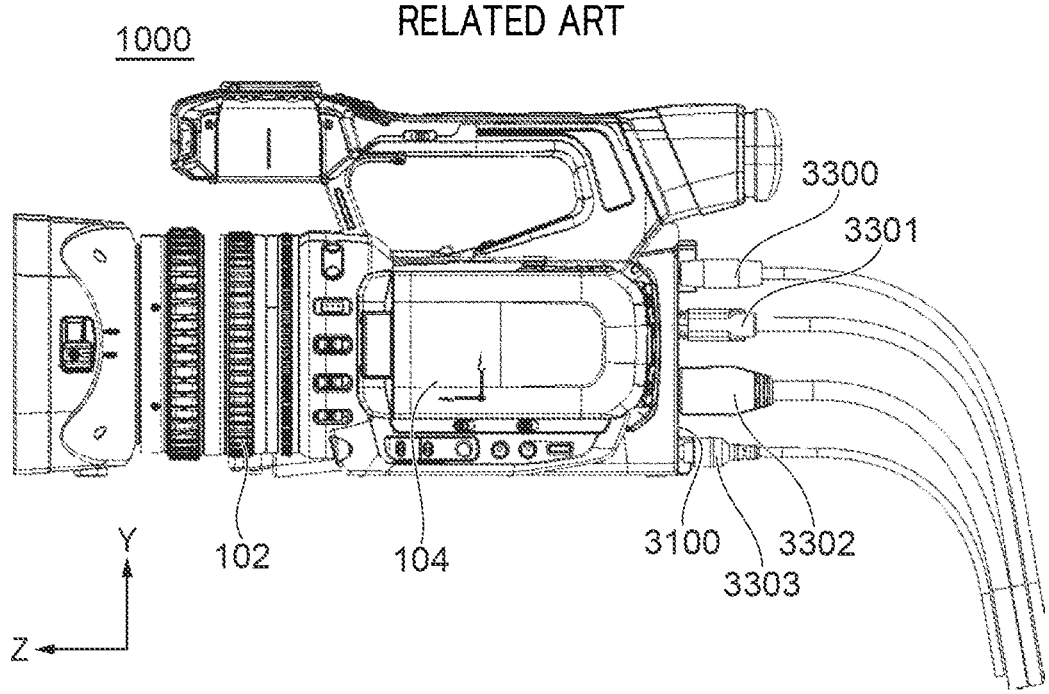

The arrangement of the external connection terminal section 108 will be described with reference to FIGS. 51, 52A, and 52B. FIGS. 51 and 52A are perspective views of a conventional image capturing apparatus 1000. FIG. 52B is a right side view of the conventional image capturing apparatus 1000. FIGS. 52A and 52B show a state in which connection cables are attached to external connection terminals.

The rear side of the image capturing apparatus 1000 is provided with a first terminal arrangement surface 3100 which is parallel to an X-Y plane, and a plurality of external connection terminals are arranged on the first terminal arrangement surface 3100. Specifically, on the first terminal arrangement surface 3100, there are arranged an audio connector 3200, a LAN connector 3201, an HDMI (registered trademark) connector 3202, and a power supply connector 3203. Further, the rear side of the image capturing apparatus 1000 is provided with a second terminal arrangement surface 3405 inclined with respect to the X-axis. The second terminal arrangement surface 3405 faces rearward and obliquely leftward. A plurality of connectors are arranged on the second terminal arrangement surface 3405 as well. Specifically, there are arranged SDI connectors 3400, 3401, 3402, and 3403.

When the image capturing apparatus 1000 is used by a photographer, image capturing is performed by connecting the cables to the plurality of connectors, in a state in which the image capturing apparatus 1000 is placed on a shoulder of the photographer, or in a state in which the photographer is moving while holding the image capturing apparatus 1000 with his/her hand, or in a state in which the image capturing apparatus 1000 is placed on a tripod. For this reason, it is important to make the handling size of the image capturing apparatus 1000 small. As shown in FIGS. 52A and 52B, connection cables 3300, 3301, 3302, and 3303 are connected to the connectors 3200, 3201, 3202, and 3203, respectively. In this state of connection, the cables largely protrude rearward owing to the stiffness of the cables themselves before the cables hang down by gravity. As a result, the handling size of the image capturing apparatus 1000, including the cables, becomes large.

Figure 53:
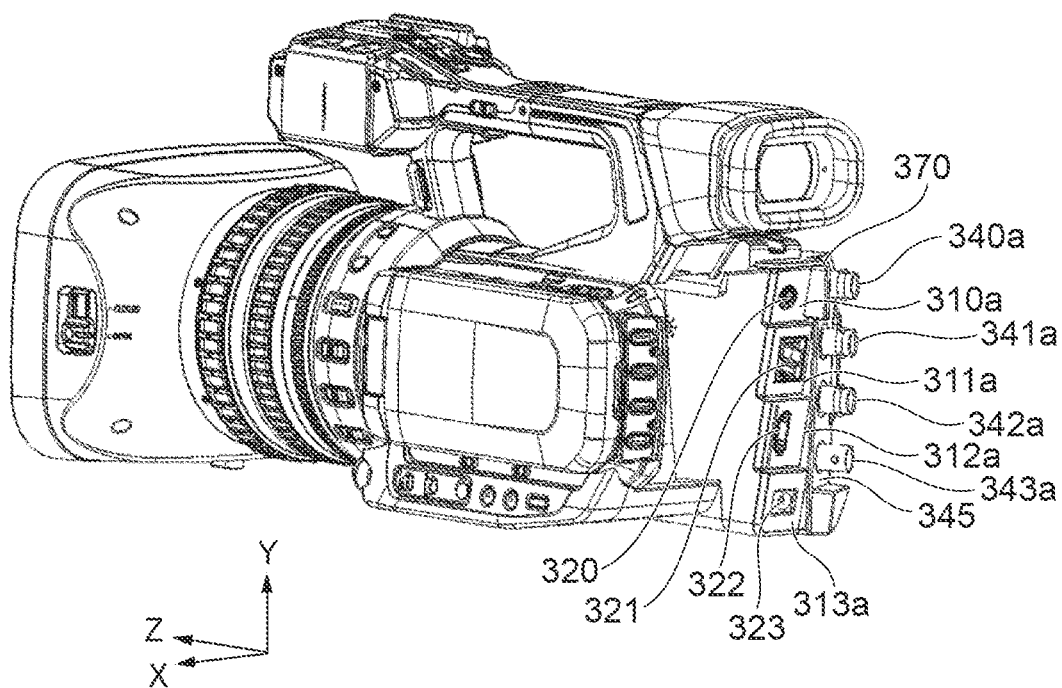
FIG. 53 is a perspective view of the image capturing apparatus according to the present embodiment.
Figure 54A:
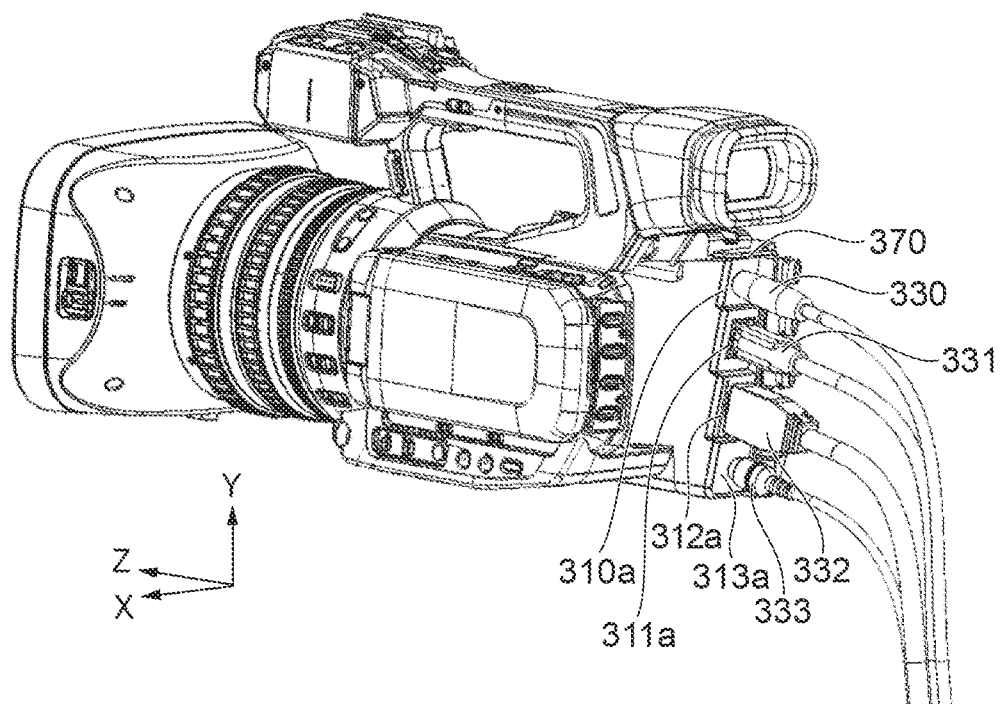
FIGS. 54A and 54B are a perspective view and a right side view of the image capturing apparatus according to the present embodiment.
Figure 54B:
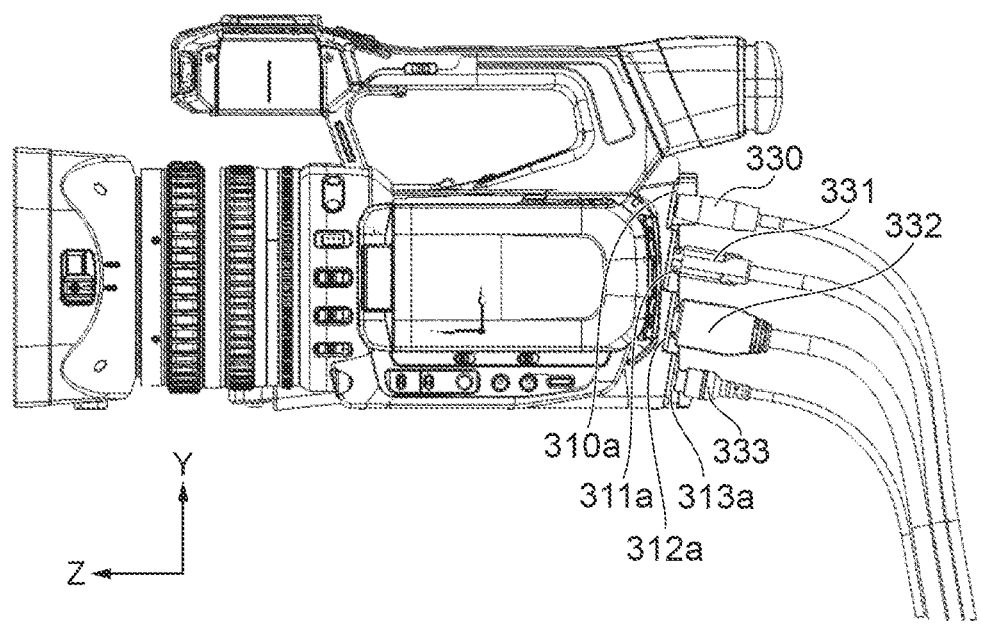

FIGS. 53 and 54A are perspective views of the image capturing apparatus 100 according to the present embodiment. FIG. 54B is a right side view of the image capturing apparatus 100 according to the present embodiment. Note that the arrangement of the external connection terminal section 108 is common between the image capturing apparatuses including the handle portion 103 and the handle portion 103A as the variation thereof, respectively. FIGS. 54A and 54B show a state in which connection cables are attached to the external connection terminal section 108.

The rear side of the image capturing apparatus 100 is provided with connector arrangement surfaces 310a, 311a, 312a, and 313a. The connector arrangement surfaces 310a to 313a are surfaces which are rotated about the X-axis with respect to an X-Y plane and face obliquely downward. The connector arrangement surfaces 310a to 313a are aligned in the Y direction and are substantially parallel to each other. On the connector arrangement surfaces 310a to 313a, there are arranged an audio connector 320, a LAN connector 321, an HDMI connector 322, and a power supply connector 323, respectively.

Further, the rear side of the image capturing apparatus 100 is provided with a second terminal arrangement surface 345 inclined with respect to the X-axis. The second terminal arrangement surface 345 faces rearward and obliquely leftward. The second terminal arrangement surface 345 also has a plurality of connectors arranged thereon. Specifically, there are arranged SDI connectors 340a, 341a, 342a, and 343a. The types and order of the connectors as the external connection terminals are not limited to the illustrated examples.

Figure 55:
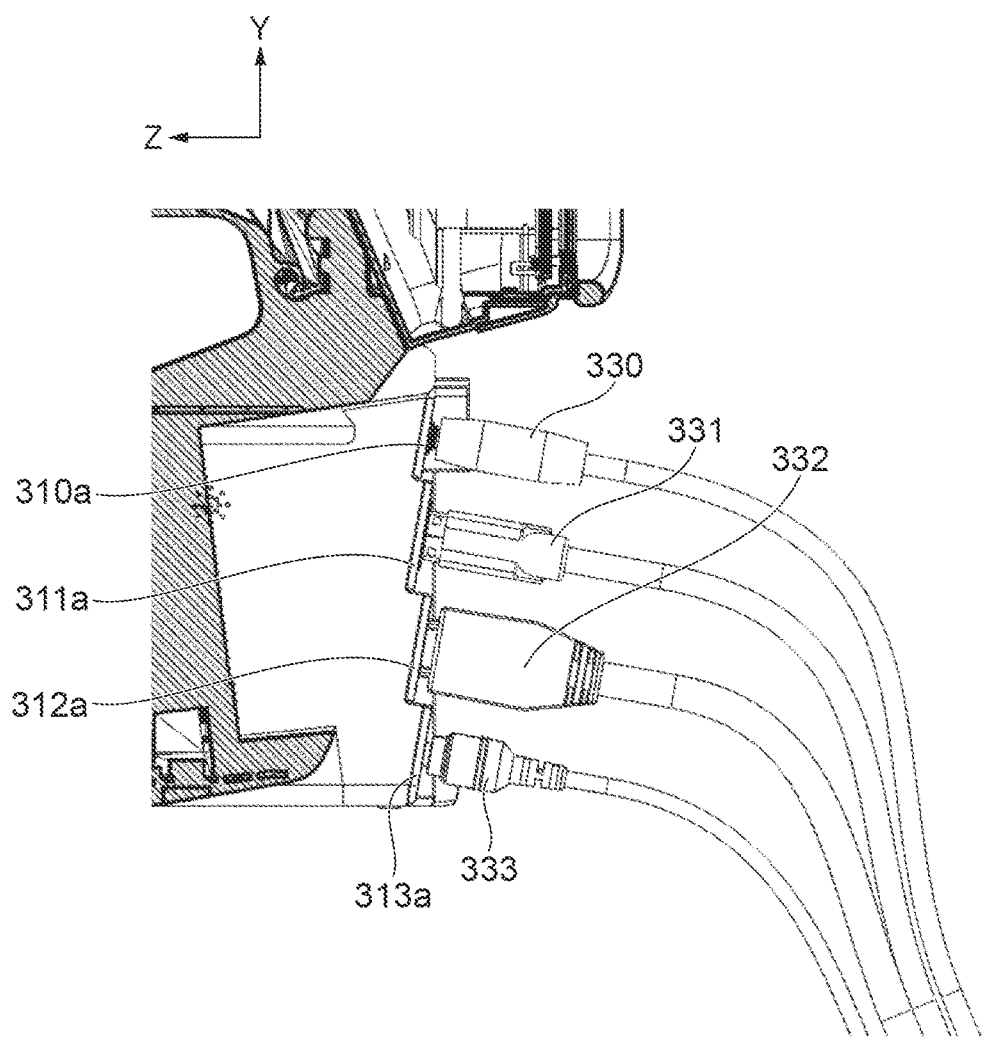
FIG. 55 is a side view, partly in cross-section, of the rear of the image capturing apparatus in a state in which cables are connected.

FIG. 55 is a side view, partly in cross-section, of the rear of the image capturing apparatus 100, to which cables are connected. Since the connector arrangement surfaces 310a to 313a face obliquely downward, connection cables 330, 331, 332, and 333 each have a shape that protrudes obliquely downward and then hangs down due to the gravity from a position on its extended line.

Figure 56:
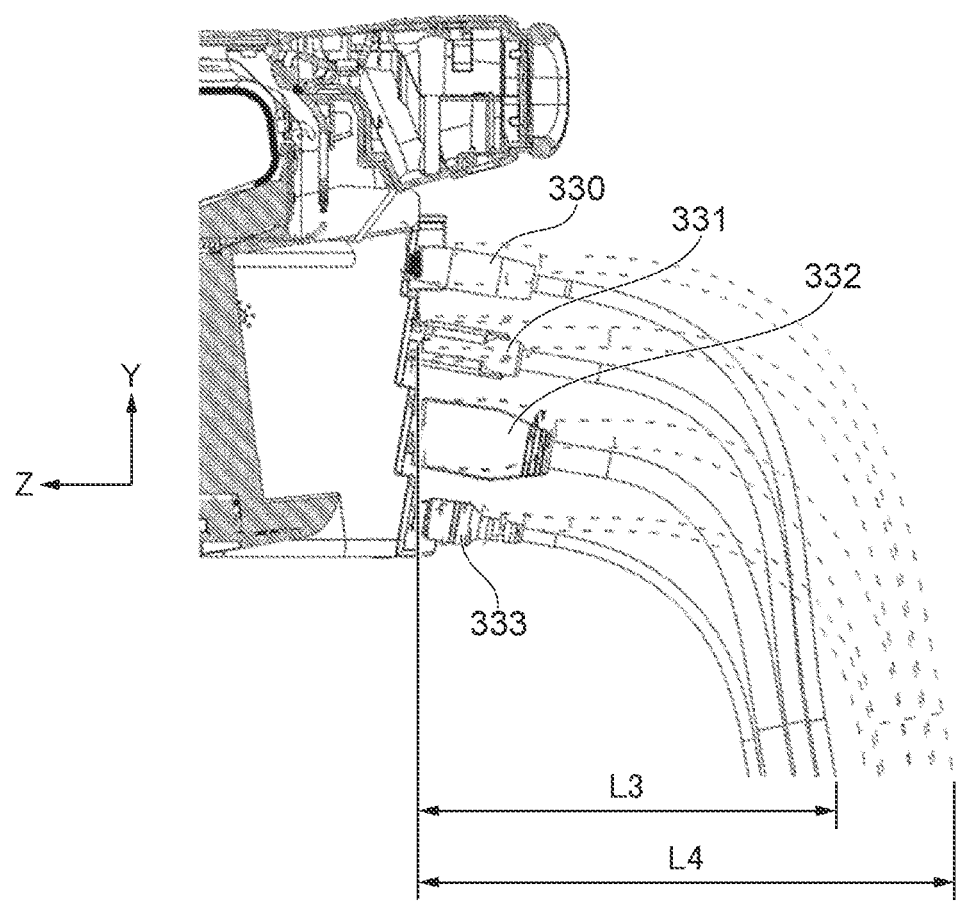
FIG. 56 is a side view, partly in cross-section, of the rear of the image capturing apparatus, additionally illustrating cables connected to the conventional image capturing apparatus, in a superimposed state.

FIG. 56 is a side view, partly in cross-section, of the rear of the image capturing apparatus 100, additionally illustrating cables connected to the conventional image capturing apparatus 1000, in a superimposed state. Assuming that a protruding amount of the connection cables 330 to 333 from the rear surface of the image capturing apparatus 100 at a certain height is represented by 'L3', and a protruding amount of the connection cables 3300 to 3303 from the rear surface of the image capturing apparatus 1000 as the comparative example at the certain height is represented by 'L4', a relationship represented by L3<L4 holds. This indicates that the image capturing apparatus 100 according to the present embodiment is smaller in the protruding amount of the cables than the comparative example. Thus, the handling size is made smaller.

Further, as shown in FIG. 54A, the image capturing apparatus 100 is provided with a terminal peripheral rib 370 on an upper side of the connector arrangement surface 310a to 313a to protect the connectors from impact caused by falling and invasion of rainwater. In addition to this, since the connector arrangement surfaces 310a to 313a are inclined downward, even in a case where raindrops fall on the image capturing apparatus 100 from the above, such as a case where the image capturing apparatus 100 is used e.g. under a rainy condition, the raindrops fall downward along the connection cables 330 to 333, and hence it is possible to prevent the raindrops from entering the inside of the image capturing apparatus 100.

Figure 57:
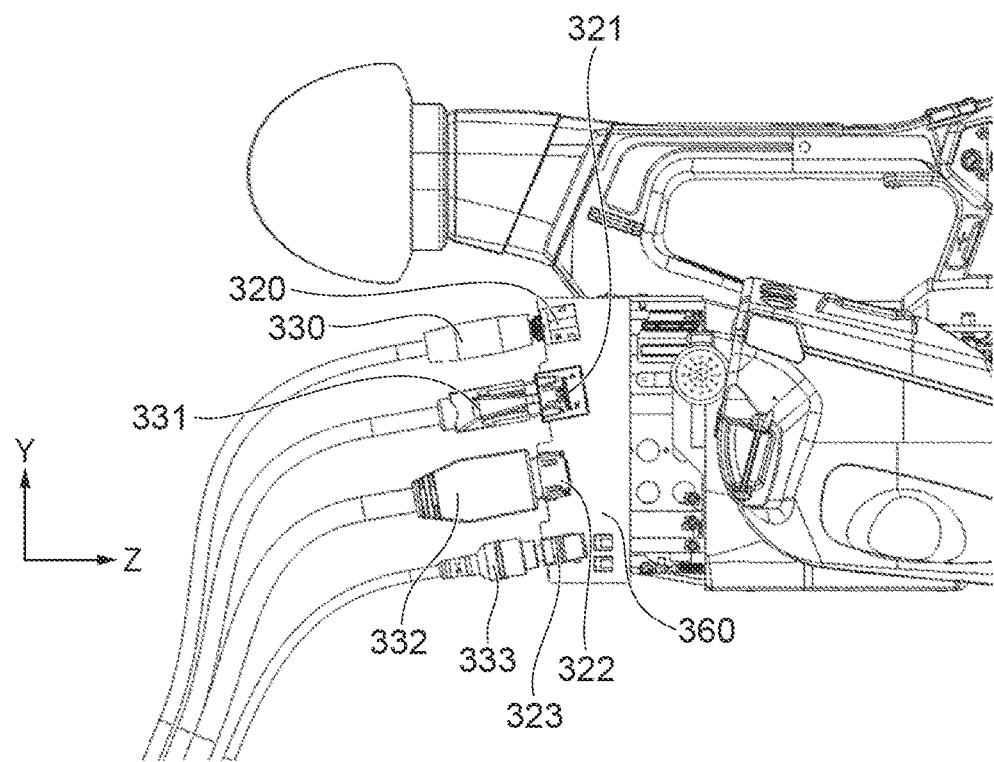
FIG. 57 is a side view, partly in cross-section, of the rear of the image capturing apparatus including a circuit board on which external connection terminals are mounted.

FIG. 57 is a side view, partly in cross-section, of the rear of the image capturing apparatus 100 including a circuit board on which external connection terminals are mounted. The audio connector 320, the LAN connector 321, the HDMI connector 322, and the power supply connector 323 are mounted on the same connector circuit board 360. This makes it possible to reduce the handling size when using the image capturing apparatus 100 without increasing the costs.

Figure 58:
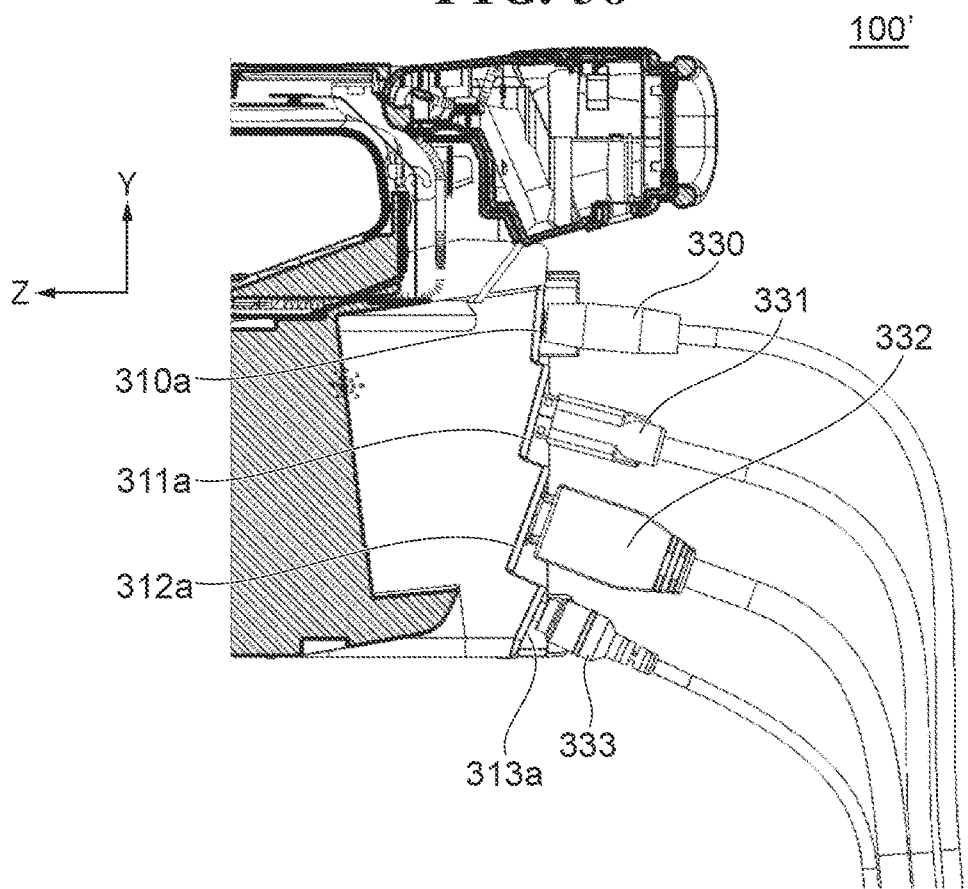
FIG. 58 is a side view, partly in cross-section, of the rear of the image capturing apparatus including connector arrangement surfaces of a variation of an external connection terminal section.
Figure 59:
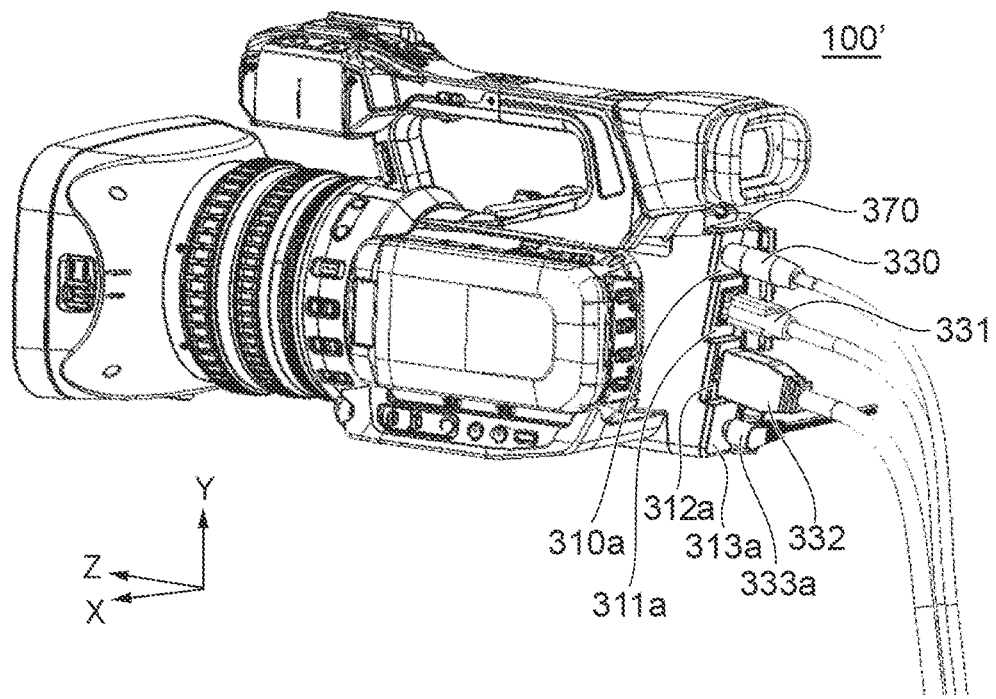
FIG. 59 is a perspective view of the image capturing apparatus including the connector arrangement surfaces of the variation of the external connection terminal section.

A variation of the external connection terminal section 108 will be described with reference to FIGS. 58 and 59. FIGS. 58 and 59 are a side view, partly in cross-section, and a perspective view of the rear of an image capturing apparatus 100' including connector arrangement surfaces 310a to 313a of the variation of the external connection terminal section 108, respectively. As shown in FIG. 58, the connector arrangement surfaces 310a to 313a are not arranged at substantially the same angle, but arranged such that the inclination angle gradually becomes larger as the connector arrangement surface is lower. This arrangement makes it easier to remove the connection cables 330 to 333. Further, as shown in FIG. 59, to the first connector arrangement surface 313a on the bottom most side, there may be connected a connection cable 333a having an L-type insertion portion, which is easy to be handled even when the image capturing apparatus 100 is placed e.g. on a table.

Figure 60:
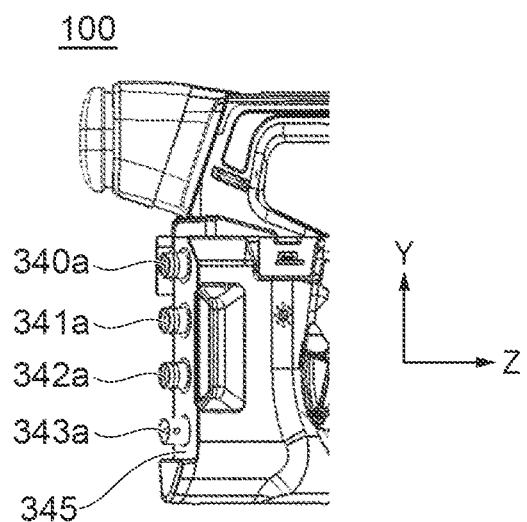
FIG. 60 is a left side view of the rear of the image capturing apparatus according to the present embodiment.
Figure 61:
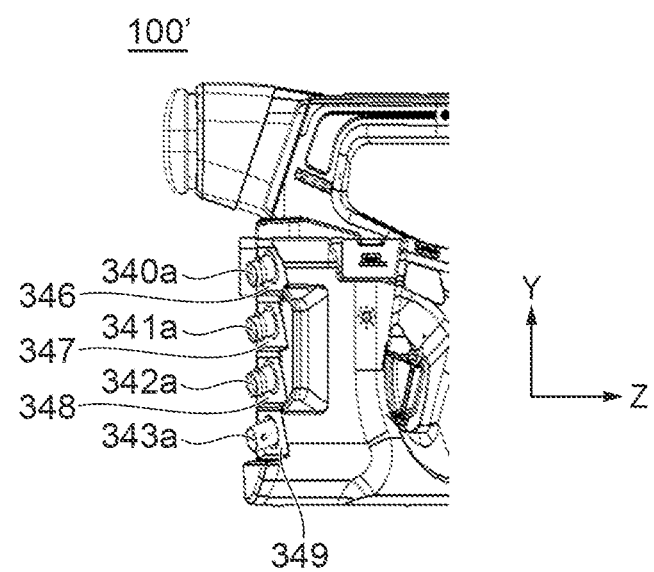
FIG. 61 is a left side view of the rear of the image capturing apparatus including the variation of the external connection terminal section.
Figure 62:
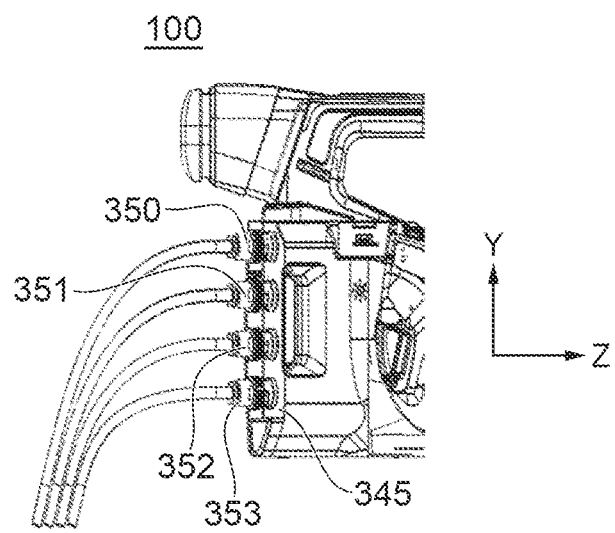
FIG. 62 is a left side view of the rear of the image capturing apparatus according to the present embodiment, illustrating connection cables connected to SDI connectors of the external connection terminal section.
Figure 63:
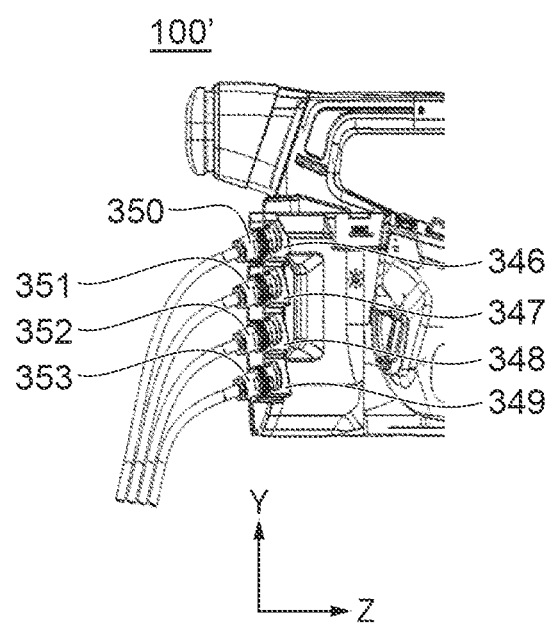
FIG. 63 is a left side view of the rear of the image capturing apparatus, illustrating the connection cables connected to the SDI connectors of the variation of the external connection terminal section.

The variation of the external connection terminal section 108 will further be described with reference to FIGS. 60 and 64. FIGS. 60 and 62 are left side views of the rear of the image capturing apparatus 100 according to the present embodiment, described with reference to FIG. 53. FIGS. 61 and 63 are left side views of the rear of the image capturing apparatus 100' including the variation of the external connection terminal section 108. FIGS. 62 and 63 show a state in which connection cables 350, 351, 352, and 353 are attached.

As shown in FIG. 61, second connector arrangement surfaces 346, 347, 348, and 349 may be provided in place of the second terminal arrangement surface 345. The second connector arrangement surfaces 346 to 349 face not only rearward and obliquely leftward, but also obliquely downward, similar to the connector arrangement surfaces 310a to 313a, by being rotated about the X-axis with respect to an X-Y plane. The second connector arrangement surfaces 346 to 349 are aligned in the Y direction and substantially parallel to each other.

Figure 64:
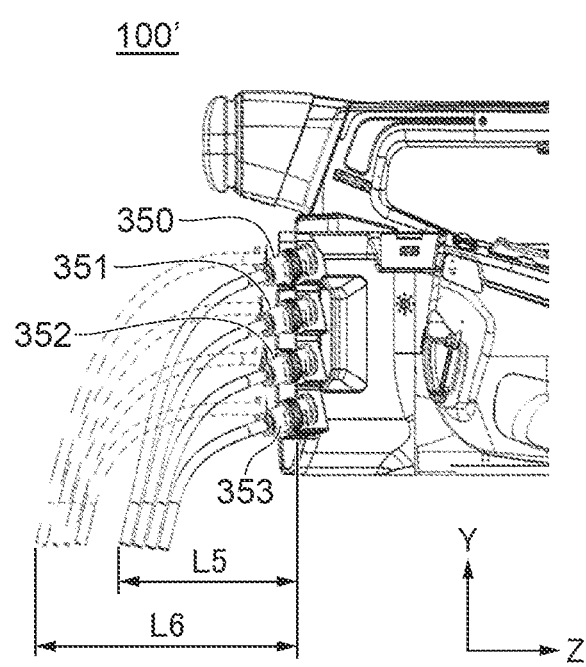
FIG. 64 is a side view of the rear of the image capturing apparatus, illustrating the connected connection cables in FIG. 63 and the connected connection cables in FIG. 62, depicted in broken lines, in a superimposed state

FIG. 64 is a side view of the rear of the image capturing apparatus, illustrating the connected connection cables in FIG. 63 and the connected connection cables in FIG. 62, depicted in broken lines, in a superimposed state. Assuming that a protruding amount of the connection cables 350 to 353 from the rear surface of the image capturing apparatus 100' is represented by 'L5', and a protruding amount of the connection cables 350 to 353 from the rear surface of the image capturing apparatus 100 is represented by 'L6', a relationship represented by L5<L6 holds. That is, the image capturing apparatus 100' as the variation shown in FIGS. 61 and 63 is smaller in the protruding amount of the cables than the image capturing apparatus 100 shown in FIGS. 60 and 62. This makes it possible to reduce the handling size.

Note that in the present embodiment, an addition of a term of degree "substantially" does not mean exclusion of "completely". For example, the phrases of "substantially parallel" and "substantially the same" include "completely parallel" and "completely the same".

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-213303 filed Nov. 26, 2019, which is hereby incorporated by reference herein in its entirety.

What is claimed is:

1. An image capturing apparatus comprising:
a rotary fan that includes a suction port and a discharge port and is rotated to draw air from the suction port and discharge air from the discharge port;
a processing circuit board on which heat generating elements are mounted; and
a heat dissipation duct for cooling the processing circuit board, the heat dissipation duct including an intake opening, an exhaust opening, and intake-side fins, and including an intake-side duct portion that communicates between the intake opening and the rotary fan and an exhaust-side duct portion that communicates between the exhaust opening and the rotary fan,
wherein projected shadows of at least part of the intake-side fins and at least part of the rotary fan overlap each other, as viewed from a direction of a rotational axis of the rotary fan,
wherein in a discharge direction of air from the discharge port, a first end position of the intake-side fins toward the intake opening is located closer to the intake opening than an end position of the rotary fan toward the intake opening is, and in the discharge direction, a second end position of the intake-side fins toward the exhaust opening is located closer to the exhaust opening than an end position of the rotary fan toward the exhaust opening is, and
wherein the intake-side duct portion has a predetermined space adjacent to the second end position of the intake-side fins, and the intake opening and the suction port of the rotary fan communicate with each other via the predetermined space.

2. The image capturing apparatus according to claim 1, wherein projected shadows of at least part of the intake-side duct portion and at least part of the exhaust-side duct portion overlap each other, as viewed from the direction of the rotational axis, at a location downstream of the discharge port.

3. The image capturing apparatus according to claim 2, wherein an amount of air discharged from the discharge port is made larger from a first end toward a second end of the discharge port in a direction orthogonal to the discharge direction, and
wherein in a range in which projected shadows of the intake-side duct portion and the exhaust-side duct portion overlap each other, as viewed from the direction of the rotational axis, a cross-sectional area of an air flow passage in the intake-side duct portion becomes smaller from the first end to the second end, and a cross-sectional area of an air flow passage in the exhaust-side duct portion becomes larger from the first end to the second end.

4. The image capturing apparatus according to claim 3, wherein the exhaust-side duct portion includes a plurality of exhaust-side fins which are substantially parallel to the discharge direction, and
wherein the length of each of the plurality of exhaust-side fins is formed such that a fin arranged at a location closer to the second end is longer than a fin arranged at a location closer to the first end.

5. The image capturing apparatus according to claim 4, wherein at least one of the heat generating elements mounted on the processing circuit board is arranged such that a projected shadow thereof overlaps the exhaust-side fins, as viewed from the direction of the rotational axis.

6. The image capturing apparatus according to claim 3, further comprising a circuit board that is thermally connected to the heat dissipation duct and is arranged in the vicinity of the second end.

7. The image capturing apparatus according to claim 1, wherein at least one of the heat generating elements mounted on the processing circuit board is arranged such that a projected shadow thereof overlaps the intake-side fins, as viewed from the direction of the rotational axis.

8. The image capturing apparatus according to claim 1, wherein the heat dissipation duct has a connection opening into which air flows from a sensor duct for cooling a sensor circuit board,
wherein a shield wall is formed in the intake-side duct portion,
wherein air flowing in from the intake opening flows through the predetermined space, and
wherein air flowing in from the connection opening flows into a space partitioned from the predetermined space by the shield wall, and then merges with air flowing in from the intake opening.

9. The image capturing apparatus according to claim 8, wherein the sensor duct is thermally engaged with a handle portion.

10. The image capturing apparatus according to claim 1, wherein the heat dissipation duct is arranged at a location closer to a body of the image capturing apparatus than an outline of a gripping portion which is gipped when shooting is performed.

11. The image capturing apparatus according to claim 10, wherein a gripping portion intake duct is arranged inside the gripping portion,
wherein air flowing in from the gripping portion intake duct merges with air flowing in from the intake opening, at a location upstream of the suction port, and
wherein an air flow passage in the gripping portion intake duct is formed by a member having a lower thermal conductivity than a base portion of the heat dissipation duct.

12. The image capturing apparatus according to claim 1, further comprising a heat sink that is thermally connected to a body of the image capturing apparatus, and
wherein heat is dissipated from fin-shaped portions included in the heat sink through a heat dissipation opening formed in the handle portion.

13. The image capturing apparatus according to claim 1, wherein a body of the image capturing apparatus is provided with a plurality of connector arrangement surfaces, and
wherein the plurality of connector arrangement surfaces are formed at such an angle that cables connected thereto protrude obliquely downward.

\* \* \* \* \*